United States Patent [19]
Abe et al.

[11] Patent Number: 6,057,938
[45] Date of Patent: May 2, 2000

[54] FACSIMILE APPARATUS

[75] Inventors: Shintaro Abe, Fujisawa; Hiroshi Nobuta, Yokohama; Toshiaki Saito, Tokyo, all of Japan

[73] Assignee: Canon Kabushiki Kaisha, Tokyo, Japan

[21] Appl. No.: 08/371,614

[22] Filed: Jan. 12, 1995

Related U.S. Application Data

[63] Continuation of application No. 07/715,019, Jun. 13, 1991, abandoned, which is a continuation of application No. 07/330,826, Mar. 30, 1989, abandoned.

[30] Foreign Application Priority Data

| Mar. 31, 1988 | [JP] | Japan | 63-76168 |
| May 11, 1988 | [JP] | Japan | 63-114089 |
| May 11, 1988 | [JP] | Japan | 63-115769 |

[51] Int. Cl.$^7$ .................................................. H04N 1/00
[52] U.S. Cl. ........................ 358/400; 358/403; 358/407; 358/440; 358/468
[58] Field of Search .................... 358/400, 402, 358/403, 405, 407, 434, 440, 468; 379/100

[56] References Cited

U.S. PATENT DOCUMENTS

| 4,207,598 | 6/1980 | Reich et al. ........................... 358/407 |
| 4,352,012 | 9/1982 | Verderber et al. ....................... 358/403 |
| 4,586,086 | 4/1986 | Ohzeki ................................... 358/407 |
| 4,607,289 | 8/1986 | Kurokawa ............................... 358/440 |
| 4,622,592 | 11/1986 | Ikehata et al. ........................... 358/440 |
| 4,654,718 | 3/1987 | Sueyoshi ................................. 358/440 |
| 4,785,355 | 11/1988 | Matsumoto ............................ 358/434 |
| 4,893,333 | 1/1990 | Baran et al. ............................ 358/468 |
| 4,918,722 | 4/1990 | Duehren et al. ........................ 379/100 |
| 4,941,170 | 7/1990 | Herbst ................................... 358/402 |

FOREIGN PATENT DOCUMENTS

| 56-103571 | 8/1981 | Japan . | |
| 58-179048 | 10/1983 | Japan . | |
| 59-167141 | 9/1984 | Japan . | |
| 60-96071 | 5/1985 | Japan | 358/440 |
| 60-160262 | 8/1985 | Japan | 358/468 |
| 62-107565 | 5/1987 | Japan . | |
| 62-213467 | 9/1987 | Japan . | |

*Primary Examiner*—Thomas D. Lee
*Attorney, Agent, or Firm*—Fitzpatrick, Cella, Harper & Scinto

[57] ABSTRACT

The facsimile apparatus of this invention performs recognition processing by storing image data received from a transmitting terminal and by decoding the image data stored. The image data received is relayed and transmitted to multiple destinations on the basis of the result of this recognition.

37 Claims, 41 Drawing Sheets

| SERVICE INFORMATION AREA | |
|---|---|
| TYPE OF TRANSIT INSTRUCTING STATION | 6-F |
| NUMBER OF TRANSIT INSTRUCTING STATION | 6-G |
| STATUS OF RUNNING STATE | 6-H |
| ADDRESS OF TRANSIT INFORMATION | 6-J |

FIG. 6C

| PAGE INFORMATION TABLE | | |
|---|---|---|
| ADDRESS OF SUBSEQUENT PAGE INFORMATION | STORAGE POSITION IN HARD DISK 2-Q | CODING SCHEME |
| | | M R |
| | | M R |
| --- | --- | --- |
| NULL | NULL | NULL |
| 6-K | 6-L | 6-M |

FIG. 6D

| TRANSIT INFORMATION | |
|---|---|
| NUMBER OF TRANSIT STAGES | 6-Q |
| NUMBER OF SECONDARY TRANSIT STATION | 6-R |
| REGISTRATION TABLE NUMBER OF DESTINATIONS | 6-S |
| ADDRESS OF INDIVIDUALLY SPECIFIED DESTINATION INFORMATION | 6-T |

FIG. 6E

| | ADDRESS OF INDIVIDUALLY SPECIFIED DESTINATION INFORMATION | |
|---|---|---|
| ADDRESS OF SUBSEQUENT PAGE INFORMATION | NUMBER OF DESTINATION | TYPE OF LINE |
| | 123-4567 | G 3 |
| | 7654321 | G 4 |
| - - - | - - - | - - - |
| NULL | NULL | NULL |
| 6-U | 6-V | 6-W |

FIG. 7

| | 1 | 2 | 3 | 4 | 5 | 6 | 7 | 8 | 9 | 10 | 11 | 12 | 13 | 14 | 15 | 16 | 17 | 18 | |
|---|---|---|---|---|---|---|---|---|---|---|---|---|---|---|---|---|---|---|---|
| ← | C | | 1 | | | | | | | | | | O | 1 | | | | | 1 |
| | 3 | | 1 | 2 | 3 | – | 4 | 5 | 6 | 7 | | | | | | | | | 2 |
| | 4 | | 7 | 6 | 5 | 4 | 3 | 2 | 1 | | | | | | | | | | 3 |
| | | | | | | | | | | | | | | | | | | | 4 |
| | | | | | | | | | | | | | | | | | | | 5 |
| | | | | | | | | | | | | | | | | | | | 6 |
| | | | | | | | | | | | | | | | | | | | 7 |
| | | | | | | | | | | | | | | | | | | | 8 |
| | | | | | | | | | | | | | | | | | | | 9 |

FIG. 8

| | C | | 1 | | | | | | | | | | O | 1 | | | | |
|---|---|---|---|---|---|---|---|---|---|---|---|---|---|---|---|---|---|---|
| ← | | | | | | | | | | | | | | | | | | |
| | 3 | | 1 | 2 | 3 | – | 4 | 5 | 6 | 7 | | | | | | | | |
| | 4 | | 7 | 6 | 5 | 4 | 3 | 2 | ? | | | | | | | | | |
| | | | | | | | | | | | | | | | | | | |

FIG. 9

| | C | | 1 | | | | ? | | | | | | O | 1 | | | | |
|---|---|---|---|---|---|---|---|---|---|---|---|---|---|---|---|---|---|---|
| ← | | | | | | | | | | | | | | | | | | |
| | 3 | | 1 | 2 | 3 | – | 4 | 5 | 6 | 7 | | | | | | | | |
| | 4 | | 7 | 6 | 5 | 4 | 3 | 2 | 1 | | | | | | | | | |
| | | | | | | ? | | | | | | | | | | | | |
| | | | ? | | | | | | | | | | | | | | | |
| | | | | | | | | | | | | | | | | | ? | |

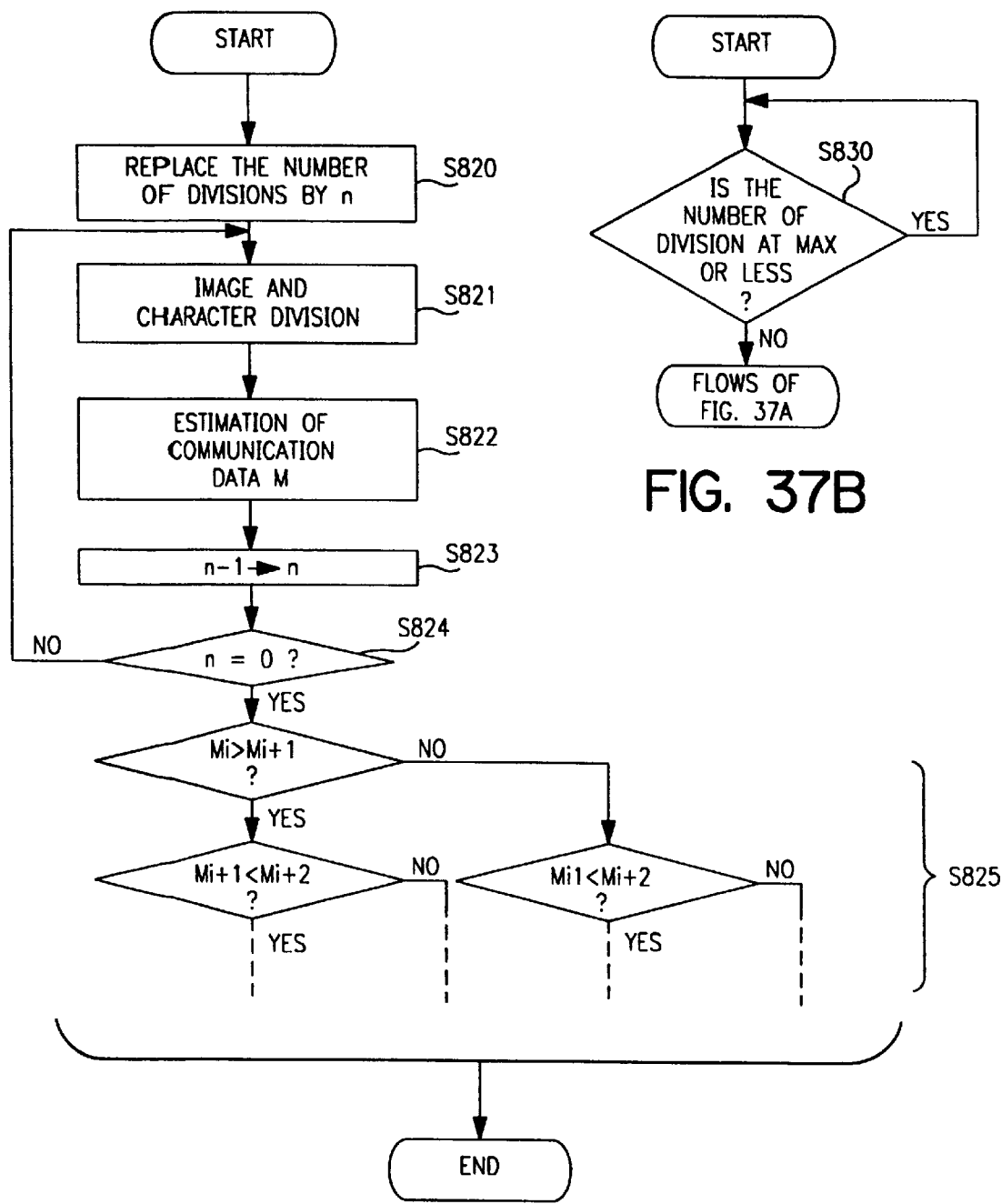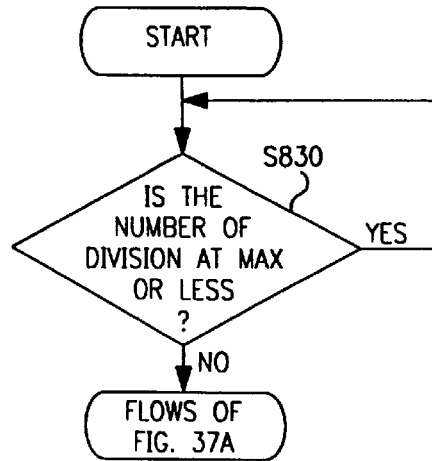
FIG. 37A
FIG. 37B

FACSIMILE APPARATUS

This application is a continuation of application Ser. No. 07/715,019 filed Jun. 13, 1991, now abandoned which is a continuation of application Ser. No. 07/330,826 filed Mar. 30, 1989, abandoned.

BACKGROUND OF THE INVENTION

1. Field of the Invention

The present invention relates to a facsimile apparatus such as a facsimile apparatus that performs transit/multi-address communications.

2. Description of the Related Art

Conventionally, the transit/multi-address function of a facsimile communication system has been regarded as particularly important as an element of the in-house communications networks of large-scale enterprises as it offers the possibility of reductions in overall communications expenses and facilitates facsimile communications between heterogeneous networks. An Example of such heterogeneous networks is a network consisting of G3 facsimile machines connected to a telephone line and G4 facsimile machines connected to a private line. A transit instruction is given to a facsimile machine having the transit/multi-address communication function using the "own mode" or the tone signal of a pushbutton phone as the procedure for facsimile transmission. The "own mode" is a facsimile procedure used only for communications between facsimile terminals manufactured by the same manufacturer.

However, the conventional transit/multi-address communications network for use with facsimile apparatus has the following disadvantages:

(1) Even if an expensive facsimile machine having the transit/multi-address communication function is introduced, a transit instruction can only be given from a facsimile machine manufactured by the same manufacturer. Further, even if the facsimile machine from which a transit instruction is given is one manufactured by the same manufacturer, it must be one provided with the transit instruction function. Thus, existing facsimile machines may not be utilized in a transit/multi-address communications system.

(2) A transit instruction can be given from a pushbutton phone only through an analog line, not through a digital line.

(3) In order to give a transit instruction, an operator is required to do a special operation to implement the transit, in addition to a normal transmission operation, which is a troublesome task for the operator.

(4) It is also troublesome for the operator to have to check the contents of each transit instruction, and this causes operator fatigue.

SUMMARY OF THE INVENTION

An object of the present invention is to eliminate the aforementioned problems.

Another object of the present invention is to construct a facsimile communications network which enables existing facsimile terminals to be utilized with respect to a facsimile communication function that has not yet been internationally standardized.

Another object of the present invention is to improve the man-machine interface involved when an operator operates a facsimile machine.

Another object of the present invention is to enable a transit/multi-address communication instruction to be given easily and transit/multi-address communication to be efficiently and reliably.

To this end, the present invention provides, in one of its aspects, a facsimile apparatus which comprises: a storage means for storing image data received from a transmitting terminal; a decoding means for decoding the image data stored in the storage means; recognition means for performing recognition processing on the image data decoded by the decoding means; and a transmission means for transmitting the image data stored in the storage means to multiple destinations on the basis of the recognition result of said recognition means.

The present invention provides, in another of its aspects, a facsimile apparatus which comprises: a registration means for registering in advance the destinations to which image data may be transmitted; a reception means for receiving the image data to be relayed from a transmitting terminal; a decoding means for decoding the image data received by the reception means; recognition means for recognizing the destinations of the received image on the basis of the image data decoded by the decoding means; and a transmission means for transmitting the image data received by the reception means to the destinations recognized by the recognition means, wherein the image data recognized by the recognition means is an image representing a sheet used for recognition, the sheet containing an area for destinations registered by the registration means and an area where any desired destinations are written.

The present invention provides, in another of its aspects, a facsimile apparatus which comprises a storage means for storing the image data received from a transmitting terminal; a decoding means for decoding the image data stored in the storage means; and a recognition means for performing recognition processing on the image data decoded by the decoding means, the recognition means performing recognition processing only on the image data corresponding to a first page received.

The present invention provides, in another of its aspects, a facsimile apparatus which comprises a storage means for storing the image data received from a transmitting terminal; a decoding means for decoding the image data stored in the storage means; a recognition means for performing recognition processing on the image data decoded by the decoding means, and a detection means for detecting a predetermined types of decoding error generated during the transmission of the image data by the decoding means, wherein in a case where the generation of the predetermined decoding error is detected, recognition processing is not executed on the basis of the decoded image data.

The present invention provides, in another of its aspects, a facsimile apparatus which comprises a storage means for storing the image data received from a transmitting terminal; a decoding means for decoding the image data stored in the storage means; and a recognition means for performing recognition processing on the image data decoded by the decoding means, wherein the image data on which recognition processing has been performed is not transmitted when the image data received is relayed and transmitted to multiple destinations on the basis of the result of the recognition processing.

The present invention provides, in another of its aspects, a facsimile apparatus which comprises a storage means for storing the image data received from a transmitting terminal; a decoding means for decoding the image data stored in the storage means; and a recognition means for performing recognition processing on the image data decoded by the decoding means, wherein in a case where the page of the image data received does not exceed a predetermined number, the recognition processing is not executed on the image data received.

The present invention provides, in another of its aspects, a facsimile apparatus which comprises: a registration means for registering the terminals which can command transit transmission in advance; a storage means for storing the image data received from a transmitting terminal; a decoding means for decoding the image data stored in the storage means; a recognition means for performing recognition processing on the image data decoded by the decoding means; and a retrieval means for retrieving the transmitting terminal identification among the terminals registered by the registration means, wherein if the transmitting terminal is not a previously registered, the image data received is output without performing recognition processing thereon.

BRIEF DESCRIPTION OF THE DRAWINGS

FIG. 3 shows an example of an OCR sheet;

FIGS. 6A to 6E illustrate a file registration table;

FIGS. 7, 8 and 9 show examples of recognition of the OCR(Optical Character Reader) sheet;

FIGS. 11 to 22A and 22B are flowcharts of the control operation of a control unit 2-A of the facsimile apparatus of FIG. 2;

FIG. 37A is a flowchart of the control operation conducted when the text is divided into areas;

FIG. 37B is a flowchart of the modified example of the flowchart of FIG. 37A;

DETAILED DESCRIPTION OF THE PREFERRED EMBODIMENTS

The present invention will be described below by way of example with reference to the accompanying drawings.

First, a first embodiment of the present invention will be described with reference to FIG. 1 which shows a facsimile system, FIG. 2 which is a block diagram of an example of a transit station in the facsimile system shown in FIG. 1, and FIG. 3 which shows an example of an OCR sheet used in the system of FIG. 1.

Figure 1:
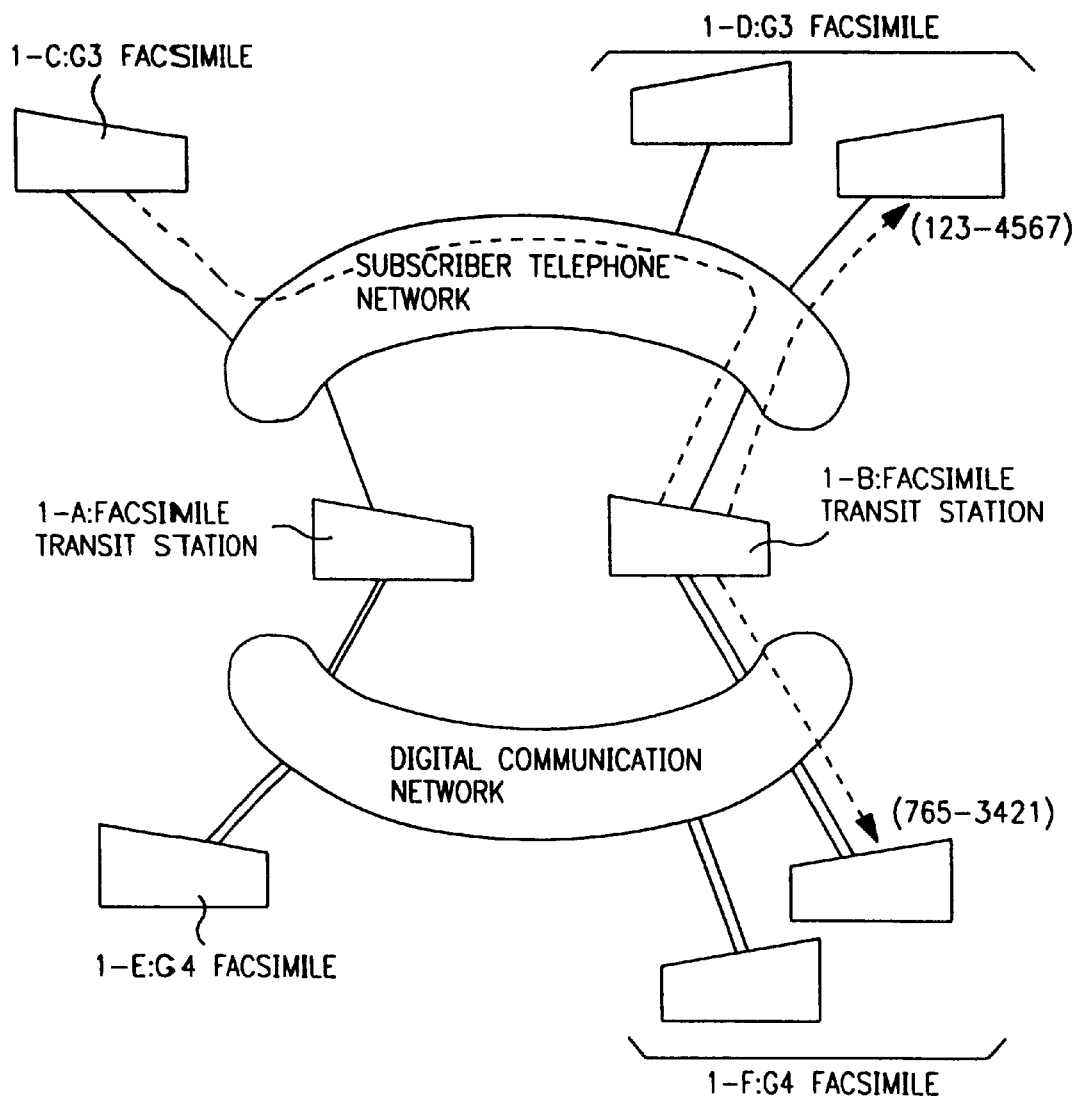
FIG. 1 shows a system to which a first embodiment of the present invention is applied.

In FIG. 1, reference symbols 1-A and 1-B denote facsimile transit stations which have an interface to both the subscriber's telephone network (analog communication network)3 and the digital communication network 6. The G3/G4 facsimile machines used in this embodiment respectively have the group 3 function recommended by CCITT (International Telegraph and Telephone Consultative Committee) on the analog line and the group 4 function (class 1) recommended by CCITT on the digital line. Reference symbols 1-C and 1-D respectively designate existing G3 facsimile machines and an existing G3 facsimile machine group which are connected to the analog line, 1-E and 1-F respectively designate an existing G4 facsimile machines and an existing G4 facsimile machine group which are connected to the digital line. In FIG. 1, assuming that the facsimile machines 1-C, 1-A and 1-E are installed in city A, while the facsimile machine 1-B and the facsimile machine group 1-D and 1-F are set up in city B, which is remote from city A, direct multi-address transmission cannot generally be conducted efficiently from the facsimile machine 1-C to the facsimile machine group 1-D or the facsimile machine group 1-F because of the high cost involved. In that case, generally, the facsimile machine 1-C makes a transit request to the facsimile machine 1-A. Upon receipt of this request, the facsimile machine 1-A conducts transit to the facsimile machine 1-B. Finally, the facsimile machine 1-B conducts the transit/multi-address transmission to the facsimile machine group 1-D or the facsimile machine group 1-F. This is called two-stage transit/multi-address communication. Alternatively, the facsimile machine 1-B makes a transit request to the facsimile machine 1-B, and the facsimile machine 1-B conducts transit/multi-address transmission to the facsimile machine group 1-D or the facsimile machine group 1-F in city B. This is called one-stage transit/multi-address communication.

In this system, both two-stage transit and one-stage transit are possible even when the facsimile machines 1-C, 1-E, 1-D and 1-F are existing facsimile machines, that is, even when these facsimile machines are manufactured by different manufacturers who did not produce the facsimile machines 1-A and 1-B which are the transit stations.

Figure 3:
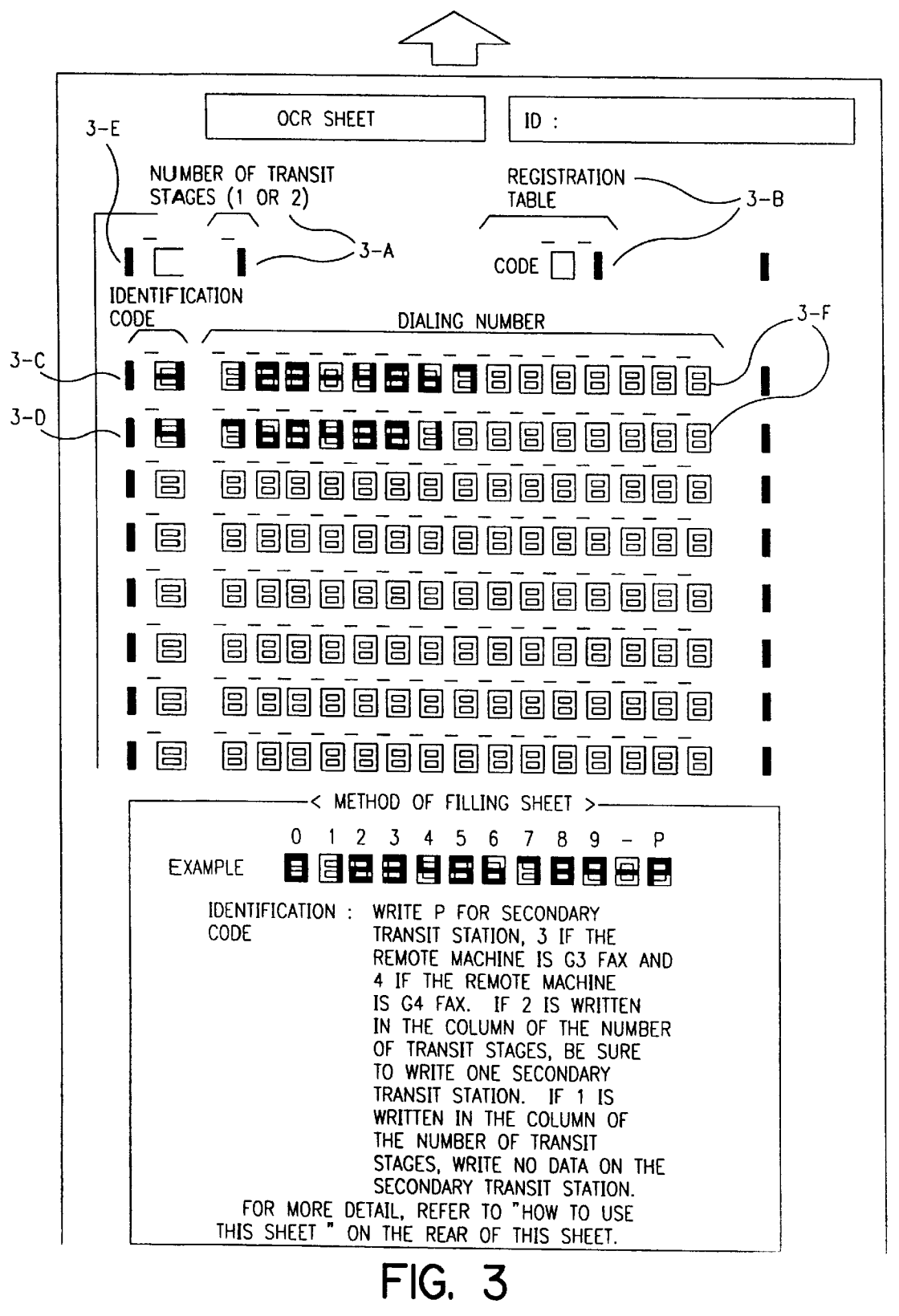

FIG. 3 shows an example of the OCR sheet used to make a transit request in this system. In FIG. 3, 7 segments 3F formed into a FIG. 8 (the portion of the sheet on which an identification code and a dialing number are written) are in drop out color. These 7 segments 3F serve as the guidelines for the person who fills in the sheet. Thus, the OCR sheet shown in FIG. 3 is a handwritten OCR sheet provided with guidelines. A reference symbol 3-A denotes a column in which the number of transit stages is written, 3-B; a column in which a number that selects the transit/multi-address table registered in the transit facsimile machine at the final stage is written, 3-C, 3-D are respectively columns in which the numbers that individually specify the addresses to which multi-address communication are performed are written, and 3-E is a column in which a symbol C that denotes that the transmitted document is an OCR sheet is written. This sheet (the handwritten OCR sheet provided with guidelines) is affixed to the first page of the document to be transmitted and is transmitted together with the document to the transit station (at the first stage). An example of a OCR sheet shown in FIG. 3 indicates a request for a onestage transit/multi-address transmission. It requests a transit/multi-address transmission to the stations in the 01 table 3-B registered in the transit facsimile machine as well as to the G3 facsimile machine having the dialing number 123-4567 and the G4 facsimile machine having the dialing number 765-4321 and 765-4322(see FIG. 5).

The OCR sheet shown in FIG. 3 is described in detail below with reference to FIG. 1.

The facsimile machine 1-C shown in FIG. 1 transmits the document preceded by the completed OCR sheet shown in FIG. 3 to the facsimile machine 1-B. The facsimile machine 1-B analyzes the first page received. If it detects that the first page is the OCR sheet (C of 3-E in FIG. 3), it reads the contents of the sheet. The facsimile machine 1-B then transmits the document to the stations entered in the transit (address) registration table registered in the facsimile 1-B machine and to the G3 facsimile machine having the dialing number 123-4567 and the G4 facsimile machine having the dialing number 765-4321 which are specified by the OCR sheet. In this transmission, the facsimile machine 1-B transmits the document received starting with the second page (the first page is the OCR sheet). When the facsimile machine 1-B receives the document from the facsimile machine 1-C, it collates the transit instruction station numbers registered in facsimile machine 1-B with the identification number of the call originating terminal sent by the facsimile machine 1-C to facsimile machine 1-B in the transmission procedure. If the collation fails, the facsimile machine 1-B prints out the whole of the document received without analyzing the OCR sheet.

Figure 2:
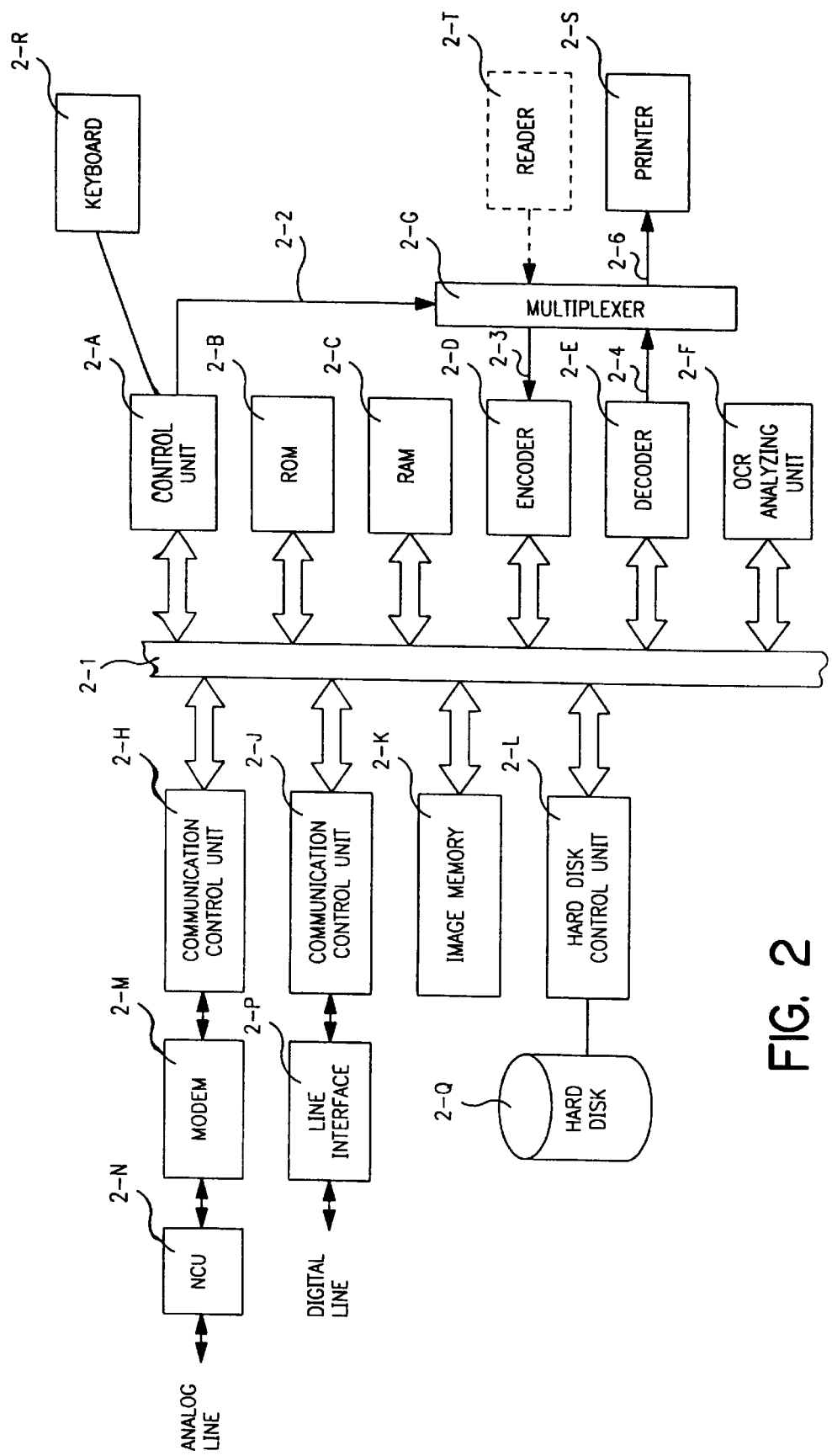
FIG. 2 is a block diagram of a facsimile apparatus, showing a first embodiment of the present invention.

FIG. 2 is a block diagram of a transit station used in the facsimile system of this embodiment. The transit station includes: a control unit 2-A constituted by a 16-bit microprocessor 80286 and its peripheral large scale integrations (hereinafter referred to as as LSIs) for controlling the entire operation of the transit station; a ROM 2-B for storing a program (which causes the control unit 2-A to operate in correspondence with the flow charts shown in FIGS. 11 to 22(a) and (b) which are described later) of the control unit 2-A; a RAM 2-C used for temporary storage of the control unit 2-A; a key board 2-R constituted by various function keys and 10 numeric keys; and an interface cable 2-5 conforming to RS-232-C. The control unit 2-A is connected to the key board 2-R through the interface cable 2-5. An encoder 2-D encodes the image data. The encoder 2-D is a known LSI that encodes the image data in conformity with three facsimile coding schemes including the modified MR coding scheme, the modified READ coding scheme and the modified Huffman coding scheme. A decoder 2-E is a known decoder which converts the data encoded by the coding scheme,e.g, MMR, MR or MH coding schemes, into black and white pixel data. In the decoder 2-E, the serial output mode to a bus line 2-4 and the parallel output mode to an analyzing unit 2-F can be selected by the control unit 2-A. A printer 2-S is a known printer which uses plain paper. The printer 2-S receives the black and white pixel data (image data) from a bus line 2-6 and prints it out on recording paper at a resolution of 200 pixels per inch (hereinafter referred to as a ppi). The data multiplexer 2-G is a known circuit which outputs the image data delivered from the decoder 2-E to a bus line 2-3 or to the bus line 2-6. When a bus line 2-2 assumes the high level, the multiplexer 2-G outputs the image data to the bus line 2-3. When the bus line 2-2 is at the low level, the output of the multiplexer 2-G is switched over to the bus line 2-6. An OCR analyzing unit 2-F analyzes an OCR image. The OCR analyzing unit 2-F is constituted of a 16-bit CPU 8086, its peripheral LSIs, a ROM and a RAM. The CPU 8086 incorporated in this OCR analyzing unit 2-F is a slave CPU which is operated simply as an I/O port as viewed from the control unit 2-A. The OCR analyzing unit 2-F receives the image data from the decoder 2-E through the parallel port of the decoder 2-E, accumulates the image data corresponding to one page in the RAM incorporated therein, and then performs OCR analysis. After the OCR analysis, the OCR analyzing unit informs the control unit 2-A of the result of the analysis through a system bus 2-1.

A communication control unit 2-H is a known G3 facsimile communication control unit which constitute of a 16-bit CPU 8086, its peripheral LSIs, a ROM and a RAM. The communication control unit 2-H exchanges the data required for the G3 procedure (CCITT recommended T. 30) with the control unit 2-A through the system bus 2-1. Also, it transfers the encoded image data transmitted or received to an image memory 2-K and from the image memory through the system bus 2-1. The transit station also includes a MODEM 2-M for the G3 facsimile, and a known network control unit (NCU) 2-N.

A communication control unit 2-J is a known G4 facsimile communication control unit which constitute of an 8-bit CPU 6809, its peripheral LSIS, a ROM and a RAM. The communication control unit 2-J exchanges data required for the G4 procedure (including the CCITT recommended X. 21, X. 25, T. 70, T. 62, T. 73 and so on) with the control unit 2-A through the system bus 2-1. Also, it transfers the encoded image data transmitted or received to the image memory 2-K and from the image memory through the system bus 2-1. A digital line interface 2-P is a known circuit unit that conforms to the CCITT recommended V. 11 and V. 28.

The image memory 2-K constitute of a dynamic RAM. The image memory 2-K is used to temporarily store the image data received or to be transmitted. A hard disk control unit 2-L is a known LSI that conforms to the small computer systems interface.(SCSI) standard. A hard disk 2-Q is used to store the image data temporarily stored in the image memory 2-K through the hard disk control unit 2-L.

In the first embodiment, the G4 mode employs the MMR coding scheme in which the document is scanned in the horizontal direction at a resolution of 200 ppi and in the vertical direction at 200 ppi. A4 is used as the image size. The G3 mode uses the MR or MH coding scheme. A resolution and an image size which are the same as those in the G4 mode are used in the G3. However, other resolutions and other coding schemes may also be used in the present invention.

FIGS. 11 to 22A and 22B are flowcharts of the control operation of the control unit 2-A of this system. The operation of this control unit 2-A will now be described with reference to the flowcharts in FIGS. 11 to 22A and 22B.

Figure 11:
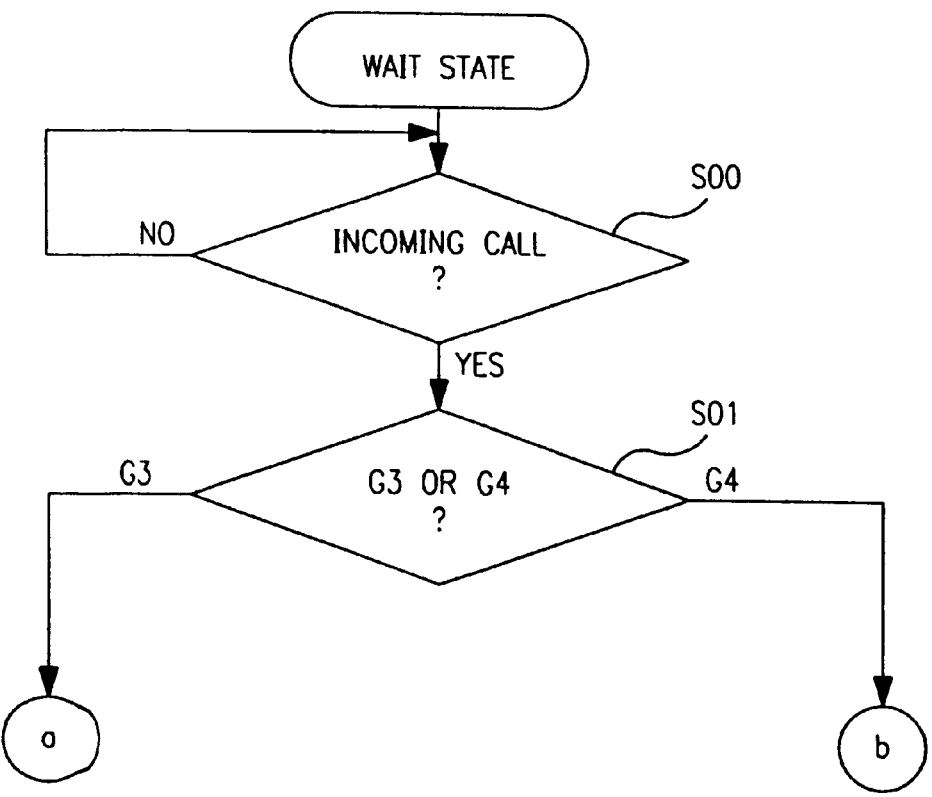
Figure 12:
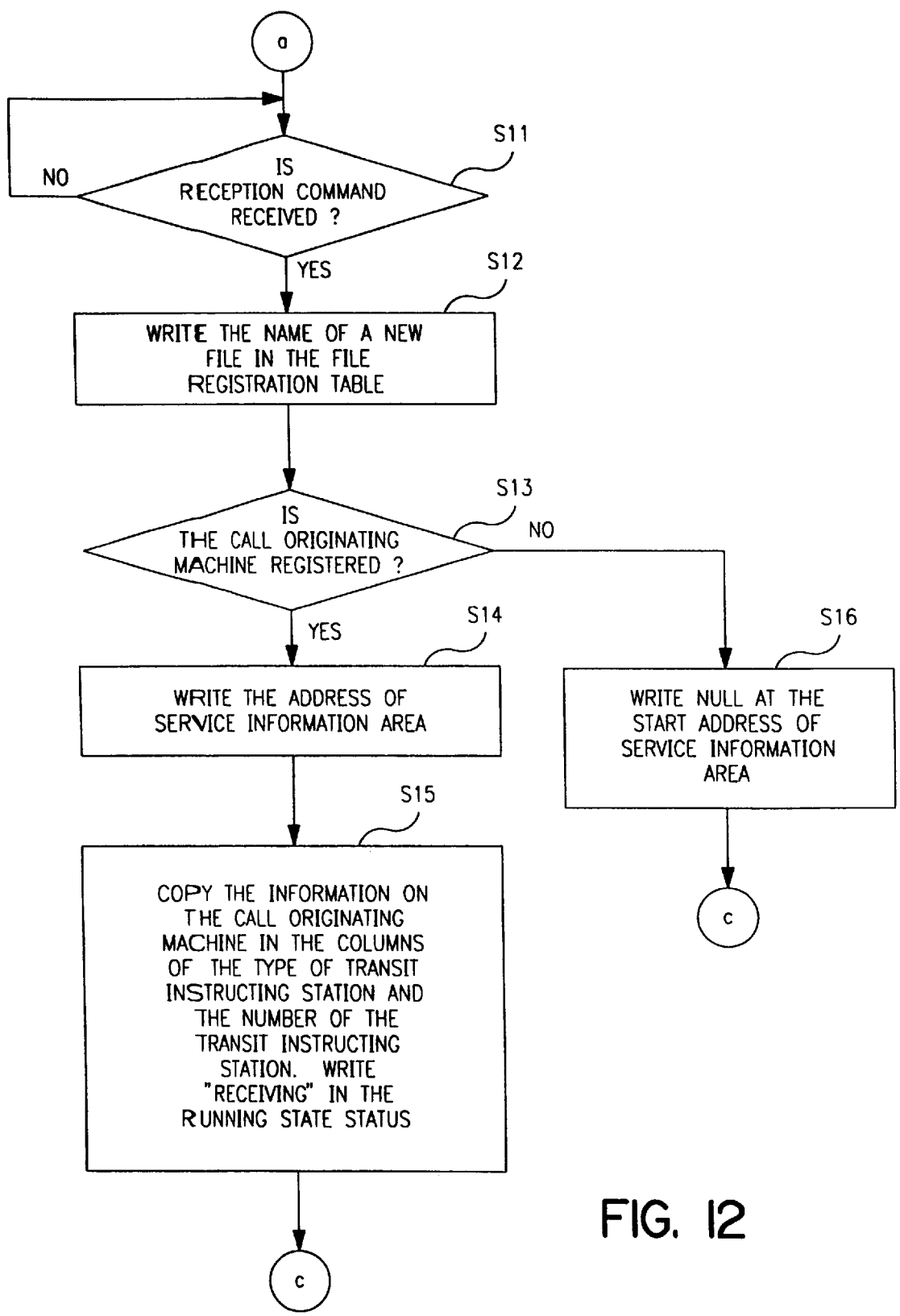
Figure 13:
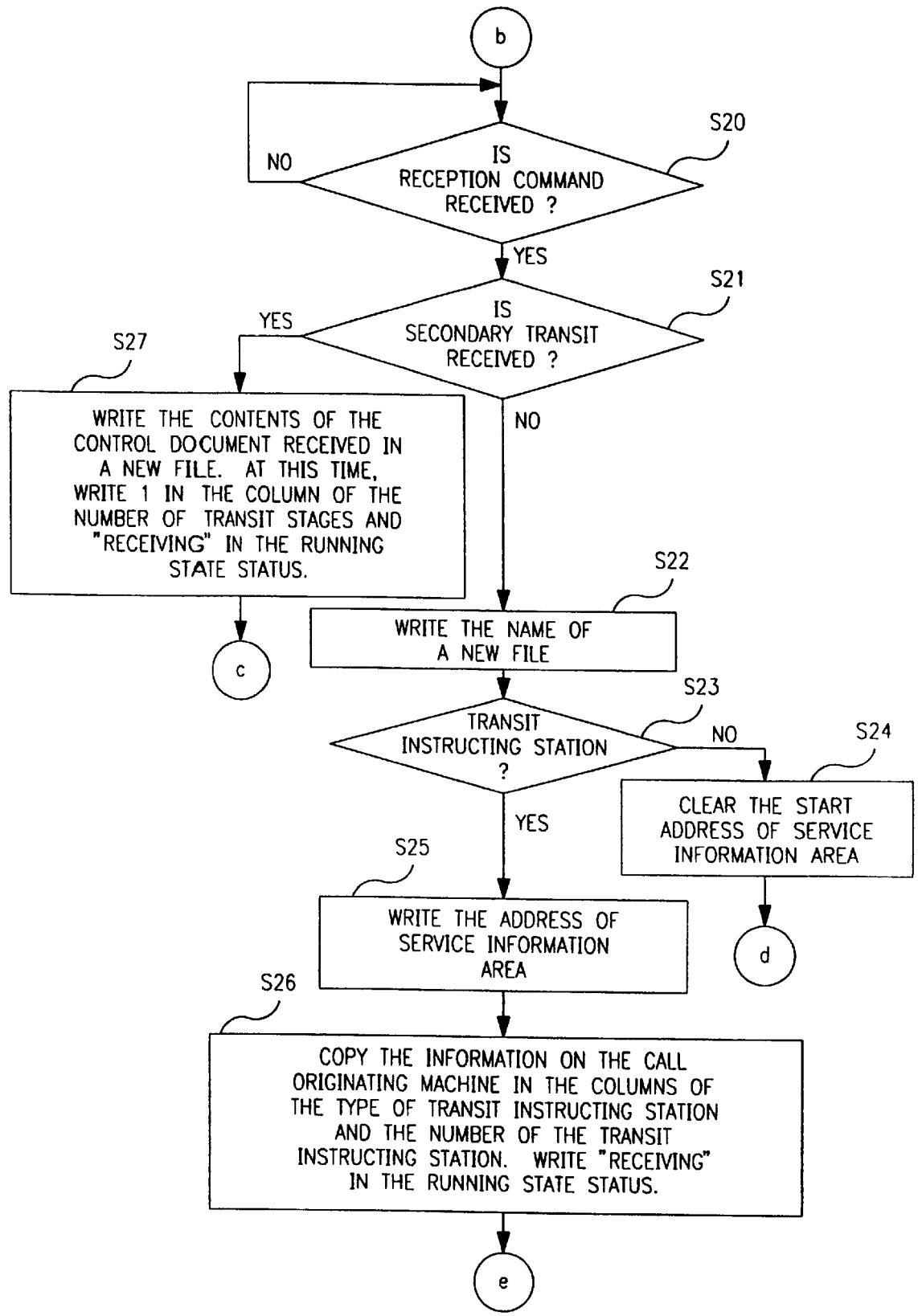

In the case where there is an incoming call on the NCU 2-N through the analog line, the communication control unit 2-H of the G3 facsimile machine detects the incoming call on the NCU 2-N, and acquires the analog line. Concurrently with this, the communication control unit 2-H notifies the control unit 2-A of the fact that there is an incoming call on the G3 line (FIG. 11). The control unit 2-A thereby detects this incoming call (in steps S00 and S01), and the process then goes to step S11 (FIG. 12). Alternatively, in the case where there is an incoming call on the communication control unit 2-J of the G4 facsimile machine through the digital line, the communication control unit 2-J notifies the control unit 2-A of the fact that there is an incoming call on the G4 (in steps S00 and S01). When the control unit 2-A detects the incoming call, the process proceeds to step S21 (FIG. 13). When the analog line is used for communication, the communication control unit 2-H transmits a digital identification signal (hereinafter referred to as a "DIS") to a call originating terminal, declaring that the present machine is capable of MH or MR coding and decoding data and that it employs a paper size of A4 and a fine mode (a resolution equivalent to 200 ppi).

In step S11, the control 2-A waits for a transmitting subscriber identification (hereinafter referred to as a "TSI") signal or a digital command signal (hereinafter referred to as a DCS), which is delivered from a call originating machine as a reception command. Once the reception command is received from the communication control unit 2-H (in step S11), the control unit 2-A creates a new file in file registration table 6 shown in FIGS. 6(a) to (e) (in Step S12). Thereafter, the control unit 2-A searches the column of file name 6-C for the area whose contents indicated in start address 6-A are null. The new file is managed by writing the file name such as "REC01" in the retrieved area in the column of file name 6-C.

Figure 4:
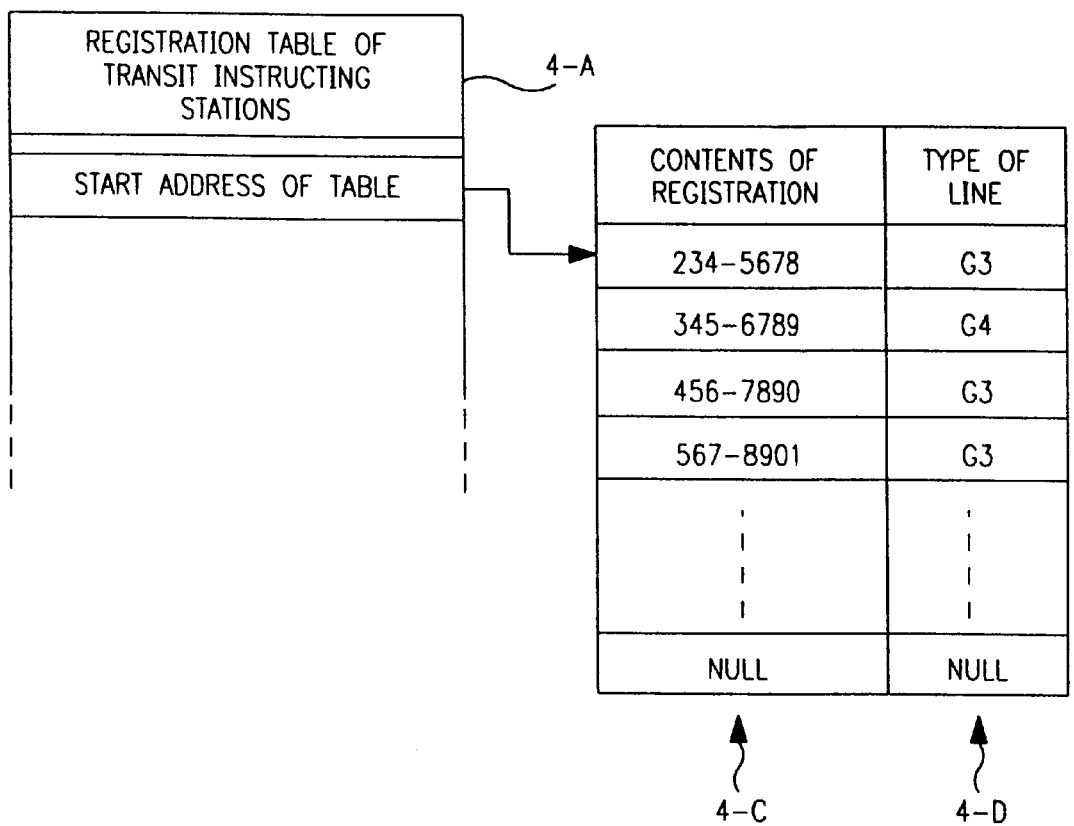
FIG. 4 illustrates a transit instruction station registration table.

Next, it is checked whether or not the call originating machine is registered in the present machine as a transit instructing station (in step S13). To perform this checking, the present machine contains a transit instruction station registration table 4 such as that shown in FIG. 4. In this transit instruction station registration table 4 are listed dialing numbers of the remote terminals which can give a transit instruction to the present machine (the transit station) and types of line for the individual remote machines. Dialing numbers are written in the column of registration contents 4-C, and types of line are registered in the column of type of line 4-D. Since the control unit 2-A is informed of the identification number of the remote machine when it receives the reception command (a TSI signal) from the communication control unit 2-H, it compares this identification number with the contents of the instruction station registration table 4-A shown in FIG. 4, and determines whether or not the remote machine is a transit instruction station. If the determination result is negative, null indicating "empty" is written in start address 6-D of the service information area of file "REC01" in the file registration table 6-A shown in FIGS. 6(a) to (e), and transit service is inhibited(in step S16). In that case, the process goes to step S110 shown in FIGS. 14(a) and (b).

If the remote machine is a transit instruction station, the address of the service information area of the file name "REC01" is written in the start address 6-D of the service information area (in step S14), and the service information is created.

Figure 14A:
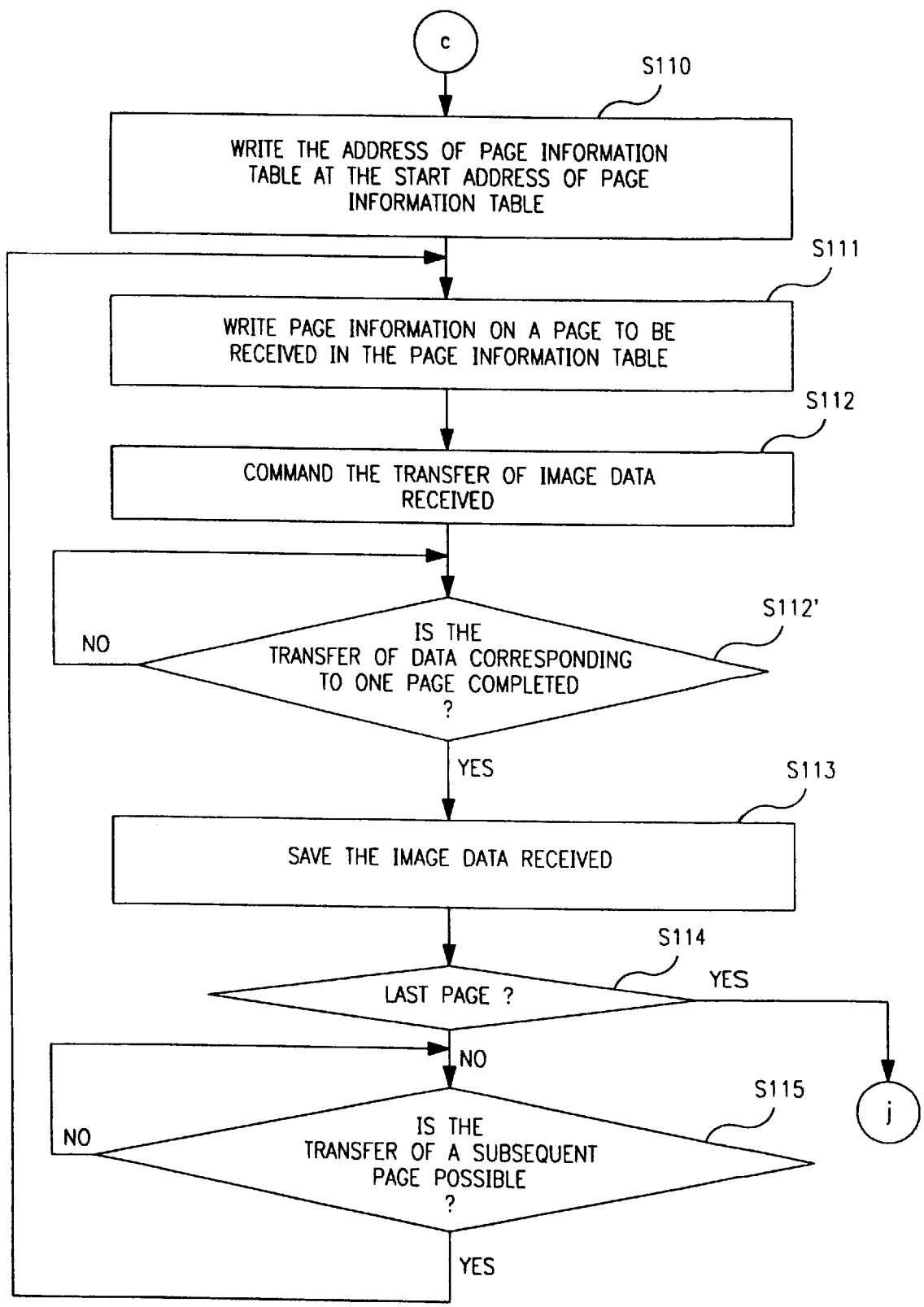
Figure 14B:
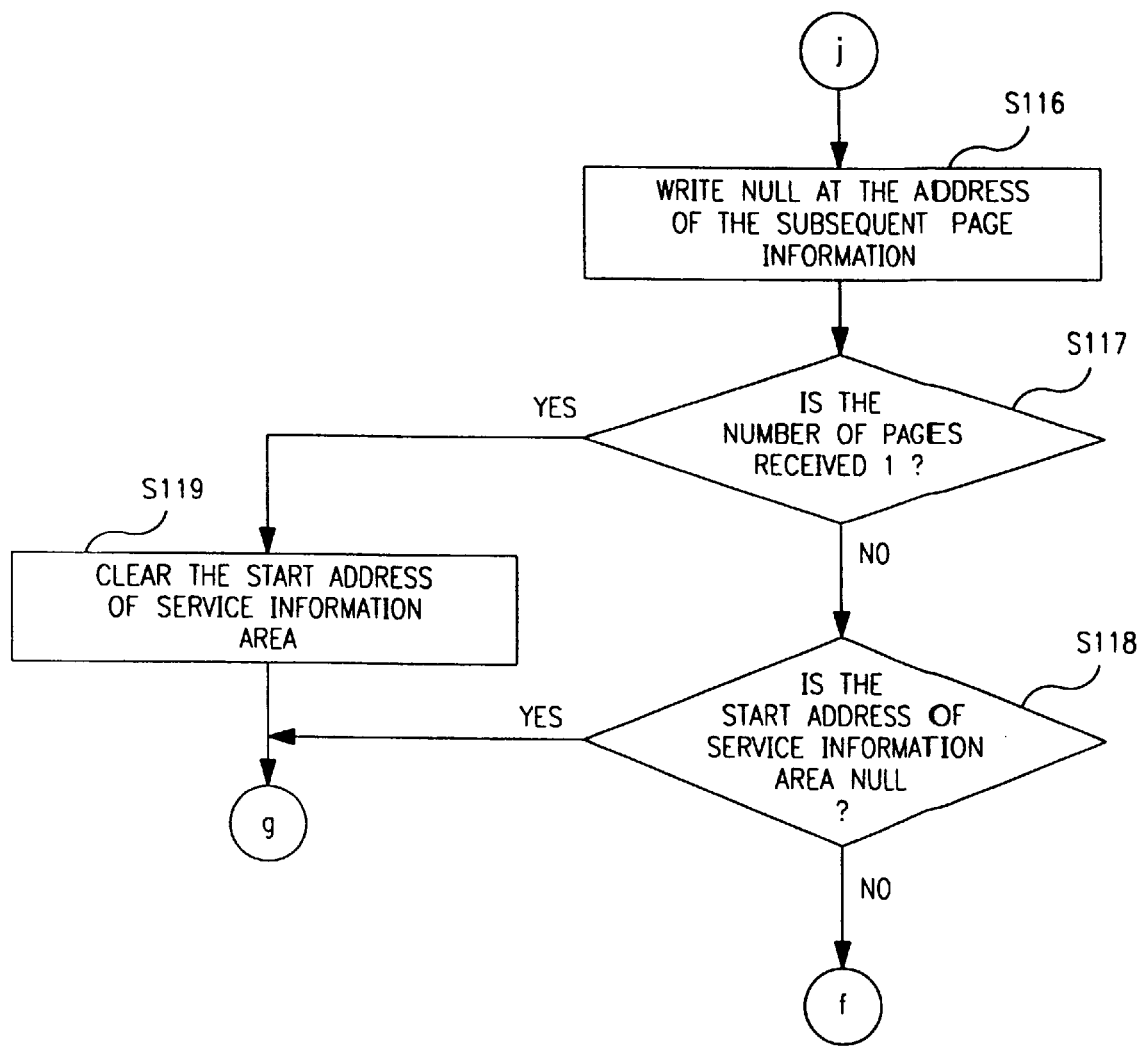

In the service information shown in FIGS. 6(a) to (e), the type of transit instruction station ("G3" in this case), the number of the transit instruction station, and the running state status are respectively written (in step S15), and the process proceeds to step S110 shown in FIGS. 14A and 14B. In step S110, the address of the page information table is written in the start address 6-E of the page information table of file "REC01" shown in FIGS. 6(a) to (e), and the page information table is all cleared (in step S110). The page information table lists the stored position within the hard disk 2-Q for each page which is to be received from now on and the coded data thereon. After the data on the first page to be received has been written (in step S111), the control unit 2-A commands the communication control unit 2-H to transfer the received image data to the image memory 2-K. Thereafter, the image data on the first page received by the communication control unit. 2-H is transferred to the image memory 2-K, and is then stored in the hard disk 2-Q (in steps S112 to S113). Thereafter, if the communication control unit 2-H is receiving a subsequent page, the processing returns to step S111 so as to process the second page (in step S115). The same processing is repeated until after the nth page has been received. If it is determined in step S114 that the last page has been received, "null" is written at the address 6-K of the subsequent page information in the page information table where the information on the last page is to be written, indicating that the present page is the last page (in step S116).

At this time, if the number of pages of the document received is 1, it is determined that a transit service request with the OCR sheet has not been made(in step S117). If the number of pages is 2 or more, it is determined that a transit service request with the OCR sheet have been made(in step S117). In consequence, when the number of pages received is 1, "null" is written at the start address of the service information area of file "REC01" shown in FIGS. 6(a) and (b), and the transit service is inhibited (in step S119), the processing then proceeding to step S310 shown in FIG. 18. Further, even when the number of pages received is 2 or more, if "null" exists at the start address of the service information area of file '"REC01", the processing also goes to S310 shown in FIG. 18 (in step S118). In the case where the number of pages received is 2 or more, only when "null" does not exist at the start address of the service information area of file "REC01", the process goes to step S120 shown in FIGS. 15A and 15B.

Figure 10:
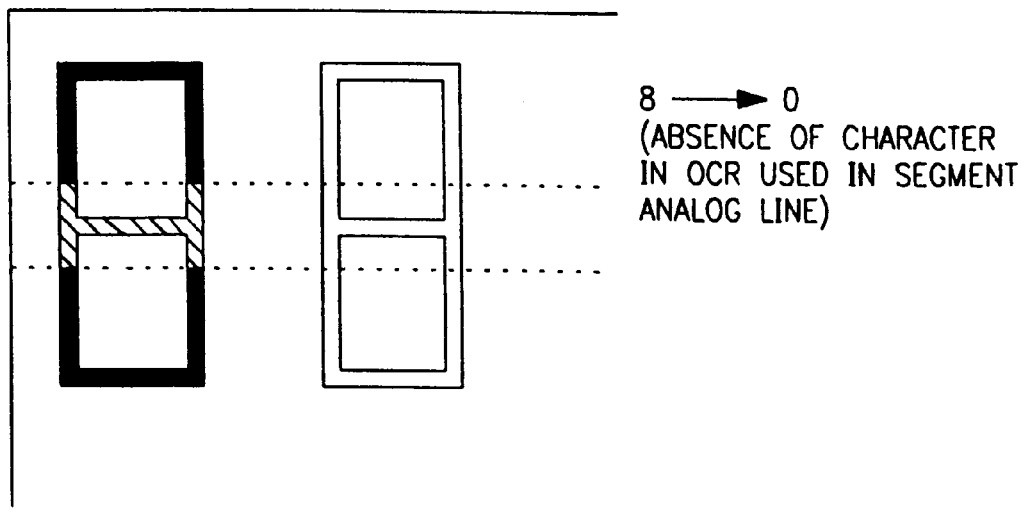
FIG. 10 illustrates an absence of a segment occurring due to a decoding error.

In step S120 and subsequent steps, the image data on the first page received is transferred to the OCR analyzing unit, and OCR analysis is then performed. First, the image data on the first page received is transferred from the hard disk 2-Q to the image memory 2-K (in step S121). The storage position 6-L within the hard disk 2-Q of file "REC01" shown in FIGS. 6(a) and (b) is referred to when the image data is read out from the hard disk 2-Q. Next, the decoder 2-E is set in the parallel output mode in which decoded data is output to the OCR analyzing unit 2-F (in step S122), and an encoding scheme is set in the decoder 2-E by referring to the page information table 6-E (MR is set in the decoder 2-E in this case). Thereafter, the image data on the first page stored in the image memory 2-K is transferred to the decoder 2-E (in step S123), and concurrently with this, image transfer to the OCR analyzing unit 2-F is commanded (in step S124). In consequence, the image data transferred from the image memory 2-K to the decoder 2-E is decoded by the decoder 2-E in the MR coding scheme, that is, it is converted to a pixel signal at a resolution of 200 ppi, and the converted pixel signal is then transferred to the OCR analyzing unit 2-F. In the OCR analyzing unit, once the image data on one page has been decoded, OCR analysis is performed on the pixel signal transferred (in step S125). The result of the OCR analysis by the OCR analyzing unit 2-F is notified to the control unit 2-A in the form of a character pattern (a portion where no character exists is a space) such as that shown in FIG. 7 (in step S126). The character pattern example shown in FIG. 7 represents the example of an OCR sheet shown in FIG. 3. As shown in FIG. 8, a mark "?" is sent for the character which cannot be recognized. If the starting character is a character other than "C" which identifies the sheet as an OCR sheet, it is determined that the received sheet is not an OCR sheet. Further, if an decoding error occurs during the decoding of the image data by the decoder 2-E, it is also determined that the sheet is not an OCR sheet (in step S126'), and this prevents the OCR analyzing unit recognizing characters erroneously due to the absence of segments caused by line errors, as shown in FIG. 10. If it is recognized that the sheet on the first page received is not an OCR sheet (in step S127'), the start address of the service information area in file "REC01" is cleared, and the transit service is inhibited. The process then goes to step S310 shown in FIG. 18.

If it is determined that the sheet on the first page received is an OCR sheet (in step S127'), all the information required for the multi-address transmission is completed, including the number of transit stages 6-Q, the address number of the secondary transit station 6-R, the destination registration table number 6-S and the address of the individually specified destination 6-T which are written in the transit information address 6-J of the service information area 6-D shown in FIGS. 6(*a*) and (*b*), as well as the subsequent information address 6-U, the address number 6-V and the type of line 6-W which are written in the address of the individually specified destination 6-T. Concurrently with this, the start address of the page information area of the second page received is written at the start address 6-E of the page information table so as to allow the second page received to be regarded as the first page on the file registration table 6. This prevents the OCR sheet from being transmitted.

It is now assumed that the character pattern shown in FIG. 7 is sent to the control unit 2-A. In that case, 1 is written as the number of transit stages 6-Q, "null" is written as the address number of the second transit station 6-R, 01 is written as the destination registration table number 6-S, and "123-4567", "G3" and "765-4321", "G4" are written as 6-V and 6-W (in step S128). Thereafter, the data on the first page is deleted from the page information table (in step S128'), and the running state statue 6-H is replaced from "OCR analyzing" to "waiting for transmission" (in step S129). Thereafter, the process goes to step S40.

Figure 19:
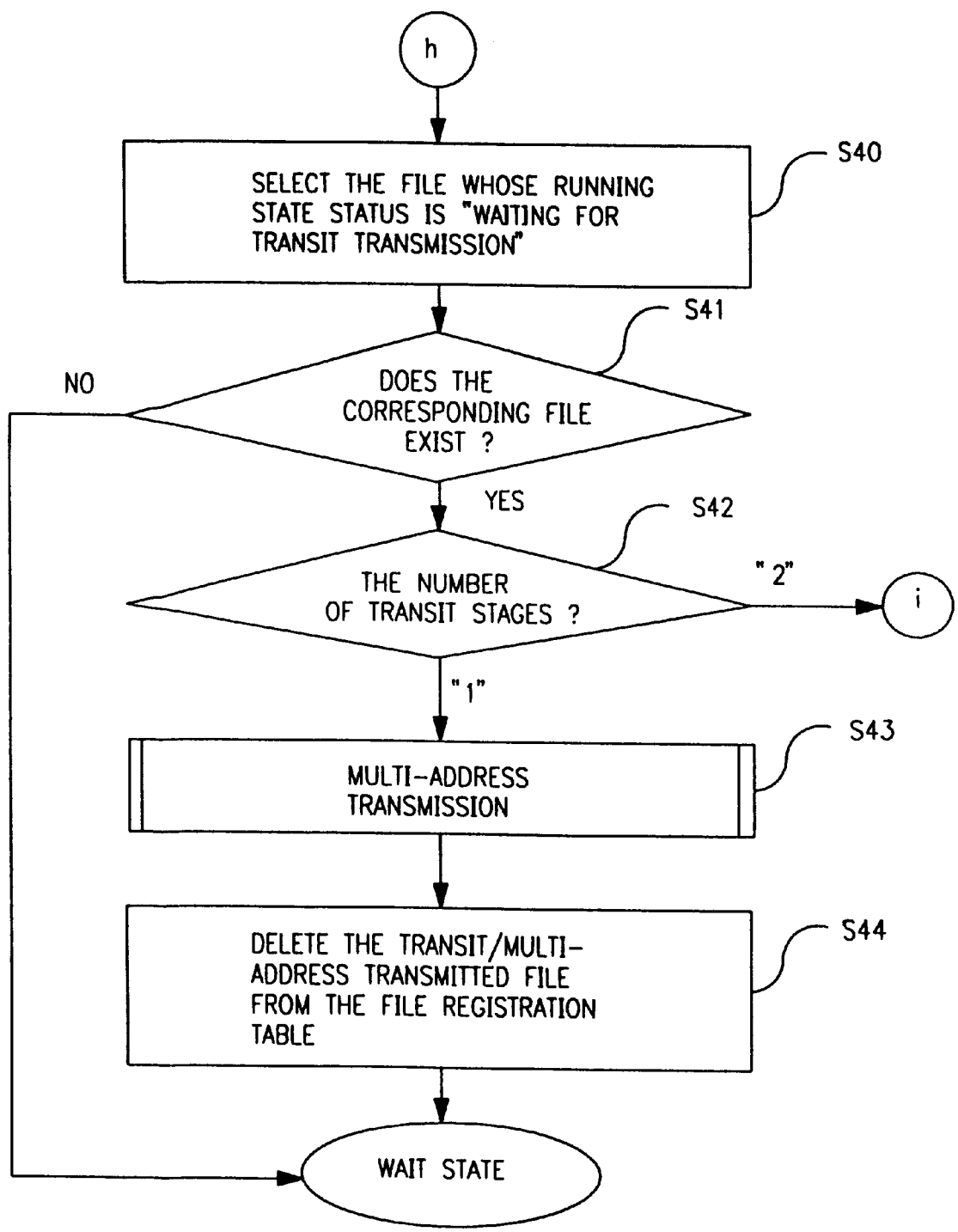

In step S40 shown in FIG. 19 and subsequent steps, files that wait for transit transmission are searched for, and then determination as to whether or not the number of transit stages of the detected file is 1 is made. First, the control unit 2-A searches the file registration table 6 shown in FIGS. 6(*a*) to (*e*) for files whose running state statuses 6-H are listed as "waiting for transit; transmission". At this time, file "REC01" is found (in step S41). Next, the control unit 2-A checks the number of transits by referring to the number of transit stages 6-Q. If it is determined that the number of transit stages 6-Q is 1 (a primary transit), multi-address transmission is started (in step S43). If the number of transit stages is 2 (a secondary transit), the process goes to step S50 shown in FIG. 20 to execute the secondary transit. In the case of the number of transit stages 1, after the transit/multi-address transmission has been completed, the executed file is cleared in the file registration table 6 shown in FIGS. 6(*a*) to (*e*), that is, the area of file "REC01" is all cleared (in step S44).

Figure 20:
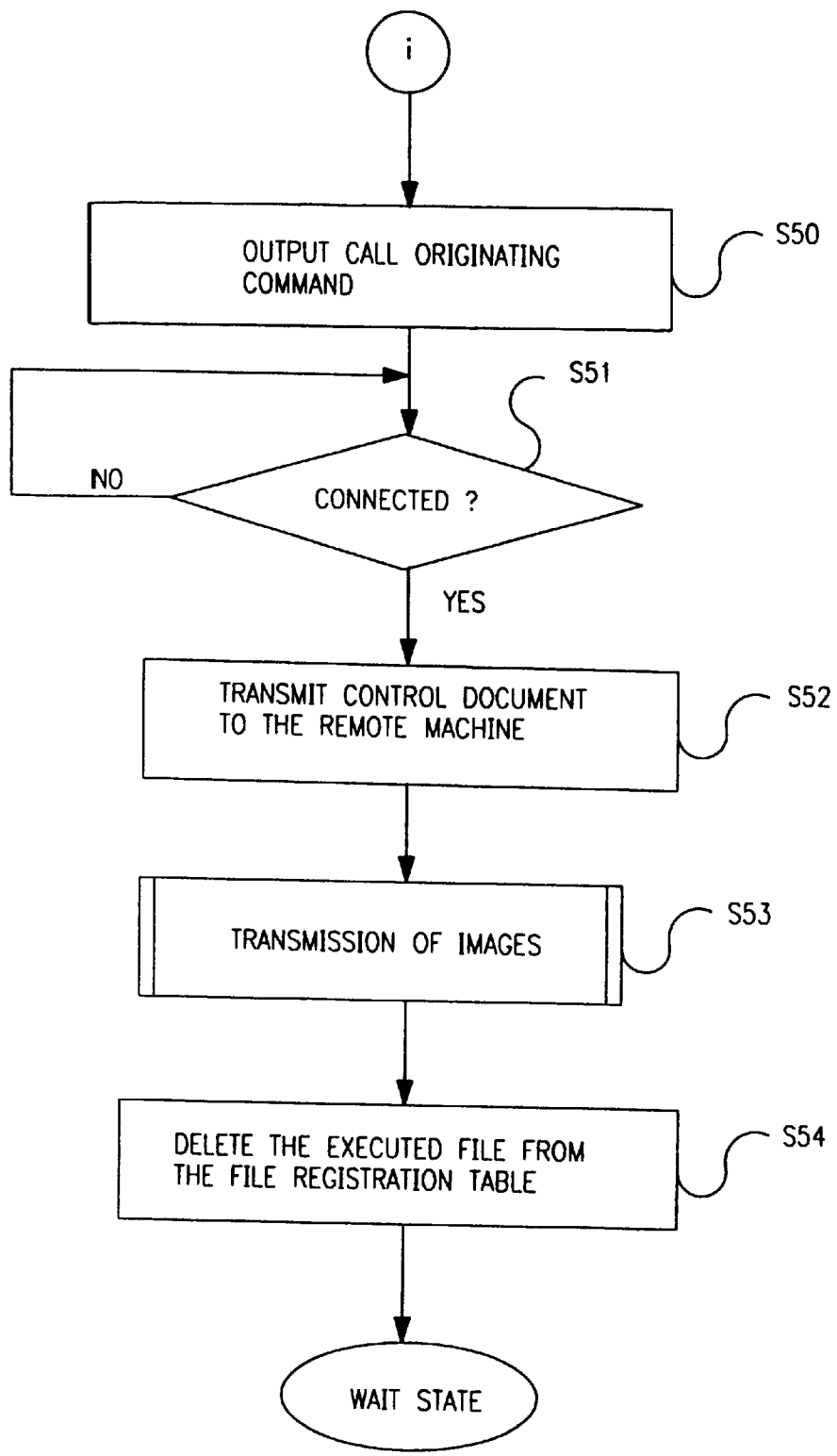

If it is determined that the number of transit stages is 2 in step S42, the process goes to step S50 shown in FIG. 20 in which the images received are relayed from the present machine which is the primary transit station to the secondary transit station. In step S50, the address number of the secondary transit station 6-R is given to the communication control unit 2-J, and a calling command is then issued. Upon receipt of this calling command, the communication control unit 2-J calls the secondary transit station, and connects the secondary transit station with the present machine. The connection is confirmed in step S51, and in step S52 the communication control unit 2-J receives the copied information on the destination registration table number 6-S, the address number 6-V, and the type of line 6-W and then transmits the information received to the secondary transit station as the control document. After the transmission of the control document, the images received from the transit instruction station are successively transmitted (in step S53). When all the images have been transmitted, the process returns to wait state (in step S54).

On the other hand, when the process goes to step S20 shown in FIG. 13 as the result of the G4 communication on the digital line, receipt of the CDS signal from the call originating machine is checked. Once the receipt of this signal is confirmed, it is determined whether or not the contents of the CDS signal are a simple receipt or a secondary transit instruction (in step S21). When it is determined that the contents of the signal are a secondary transit instruction, the CDUI(Command of Document User Information) information received first represents the control document containing the control information required for the secondary transit transmission, no the image signal. When it is determined that the contents of the signal are a simple receipt, the CDUI information received first represents the image signal.

If it is determined in step S21 that the receipt command is in the form of a simple receipt, a new file is created in the file registration table 6 shown in FIGS. 6(*a*) to (*e*) (in step S22). Next, it is checked whether or not the call originating machine has been registered as the transit instruction station in this machine (in step S23). If the answer is negative, no transit is performed, and the process goes to step S24 in which the start address of the service information area 6-D is cleared, the processing then proceeding to step S200 shown in FIG. 16. On the other hand, if it is determined that the call originating machine has been registered as the transit instruction station (in step S23), the process goes to step S25 in which the address of the service information area corresponding to a new file is written at the start address of the service information area 6-D and service information is created (in step S26). Thereafter, the process goes to step S210 shown in FIGS. 17A. If the secondary transit instruction is confirmed in step S21, the process goes to step S27 in which the CDUI information received first is interpreted and a new file is created in the file registration table 6. The CDUI information contains, as the control information on the secondary transit destination, the address number of the secondary transit station, the destination table number, and the number of the destination. At this time, "1" is written as the number of transit stages 6-Q, and the copied contents of the received control document are written in the destination table number 6-S and the address of the individually specified destination 6-T. Thus, the new file is apparently created in the same manner as that in which the primary transit operation is executed. Thereafter, the process goes to step S110 shown in FIGS. 14A arid 14B.

In a case where the call originating machine is not registered as a transit instruction station, the image data (CDUI) corresponding to one page which is received by the communication control unit 2-J is transferred to the image memory 2-K in step S200. Once one page has been transferred (in step S201), MMR decoding scheme is commanded to the decoder 2-E (in step S202). Next, the level of the bus line 2-2 falls so that the bus line 2-4 and the bus line 2-6 are connected to each other, and the printer 2-S is set in an activated state (in step S203). Thereafter, the image data corresponding to one page is transferred from the image memory 2-K to the decoder 2-E, by which a resultant decoded image signal is output from the decoder 2-E to the bus line 2-4 and then to the printer 2-S (in step S204). Thereafter, if it is determined that the communication control unit 2-J is receiving a subsequent page, the process returns to step S200 to print out the second page. If it is determined that the communication between the call originating machine and the communication control unit 2-J is completed, the process returns to wait state (in steps S205 and S206).

As stated above, in the processings undertaken in step S200 and subsequent steps, the image received and stored in the image memory 2-K is not stored in the hard disk 2-Q but is printed out for each page received.

Figure 17A:
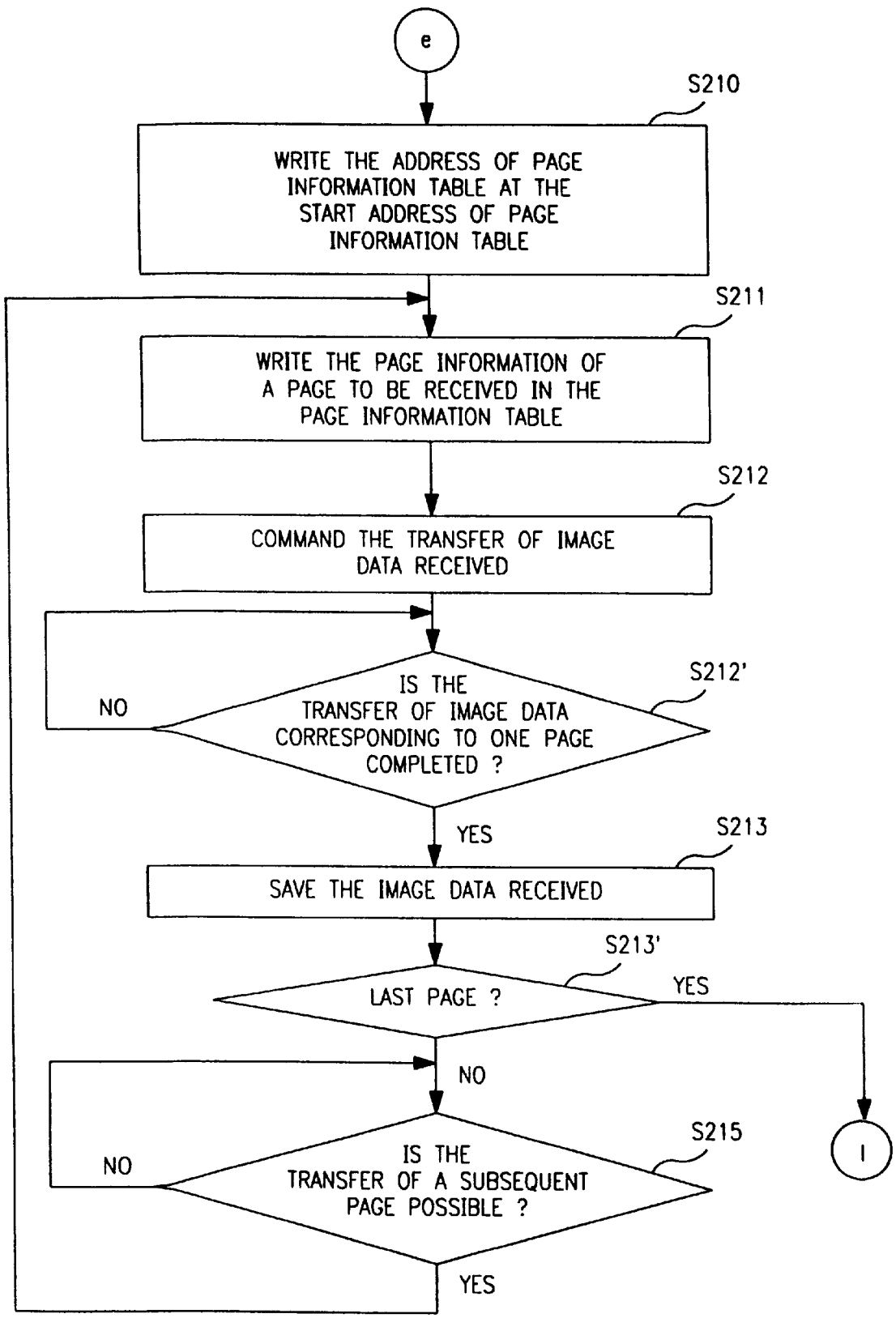
Figure 17B:
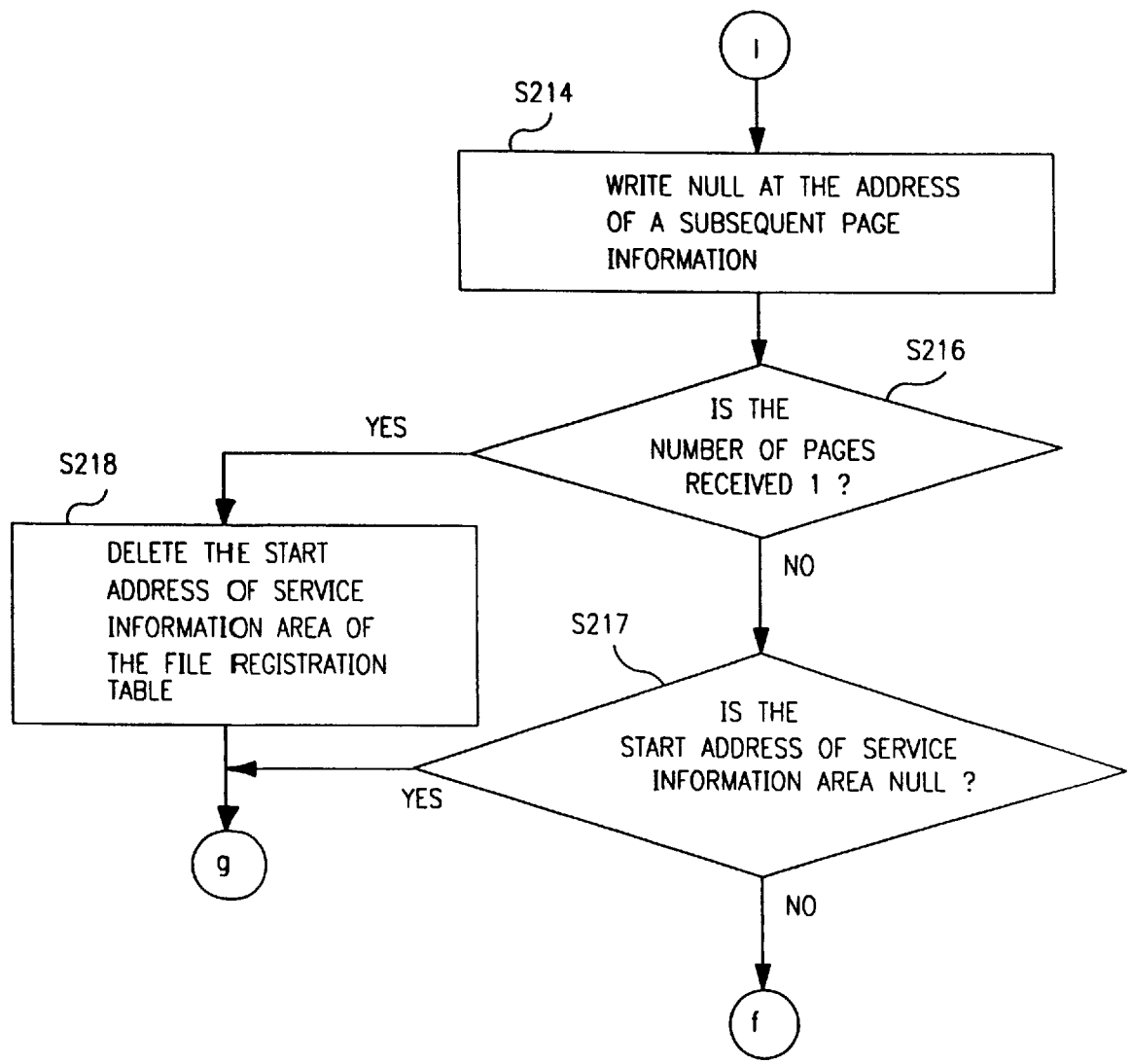

Once the process goes to step S210 shown in FIGS. 17A and 17B, the address of the page information table is written at the start address of the page information table 6-E of the new file, by which means the management of the received page is prepared. Next, page information on the page to be received is created in the page information table 6-E in the order in which it is received (starting with the first page). MMR coding scheme and the start address of the file in the hard disk 2-Q are respectively created as the coding scheme and the storage address of the hard disk 6-L for the first page (in step S211).

Next, the image data corresponding to one page received by the communication control unit 2-J is transferred to the image memory 2-K upon the command of the control unit 2-A (in steps S212 and S212'). The image data corresponding to one page in the image memory 2-K is then stored in the hard disk 2-Q (in step S213). Thereafter, if it is determined that the communication control unit 2-J is receiving a subsequent page in step S213', the process goes to step S215. If it is determined that the communication between the communication control unit 2-J and the call originating machine has been completed, the process goes to step S214.

In step S215, the communication control unit 2-J is commanded to assume the wait state until receipt of a subsequent page starts, and the process then returns to step S211. In step S211, the page information on a second page is created. MMR and a subsequent address of the end address of the first page are respectively written as the coding scheme and the storage address of the hard disk 6-Q. Thereafter, a sequence of processings which are the same as that for the first page are repeated.

After the last page has been saved in step S213', the process goes to step S214 in which the areas of the (n+1)th page and subsequent pages in the page information table are cleared. Thus, if n is written as the number of pages, it is determined that the nth page is the last page. Thereafter, it is determined whether or not the number of pages received is 1, or 2 or above (in step S216). If the answer is 1, no transit transmission is performed and the process goes to step S218. In step S218, the start address of the service information area in the file registration file is cleared and the service information is thereby deleted. Thus, if the number of pages received is 1, even if that page is the OCR sheet, no transit is performed because there are no pages to be transit transmitted. Thereafter, the process goes to step S310 as shown in FIG. 18.

Figure 15A:
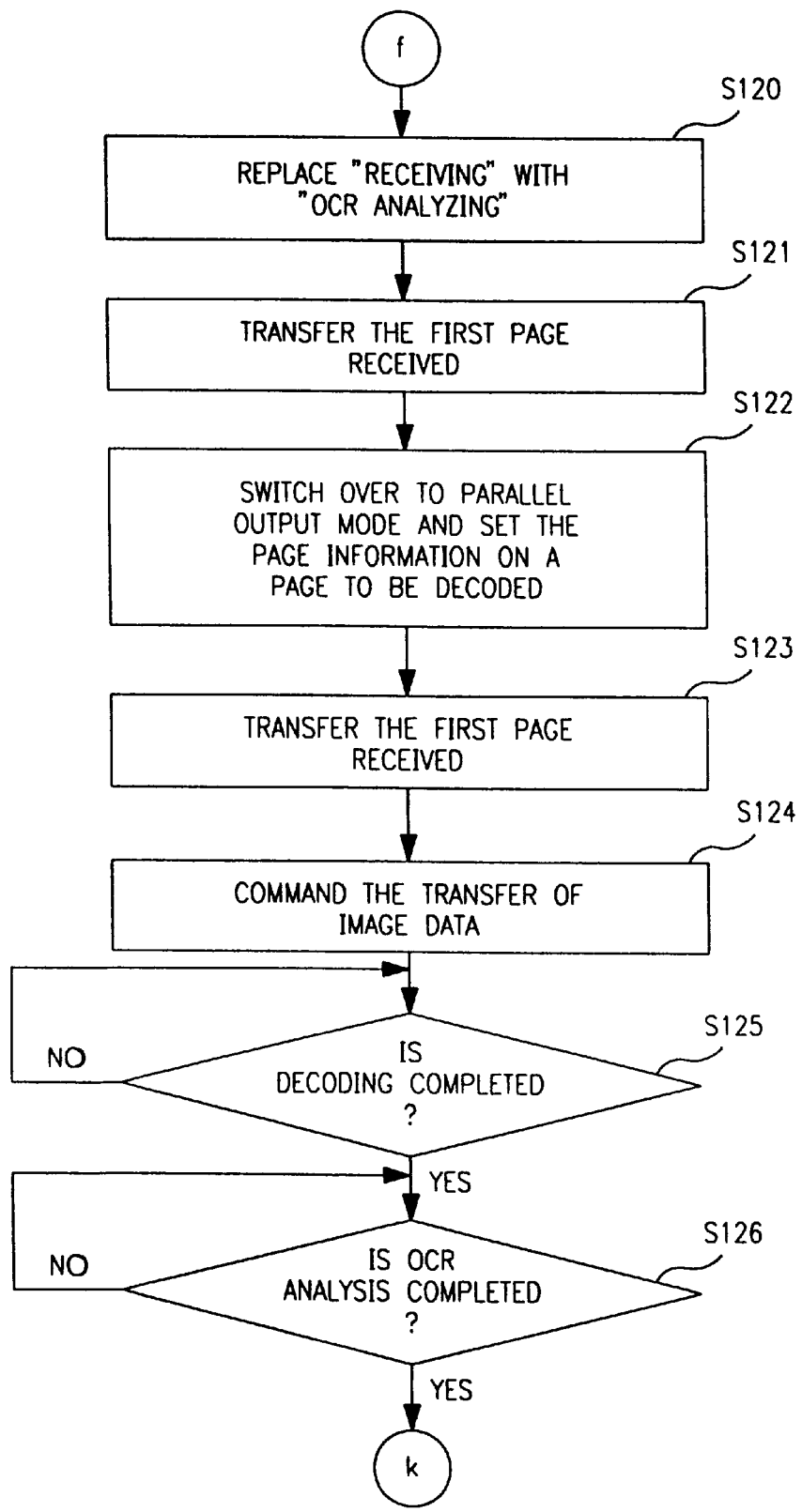
Figure 15B:
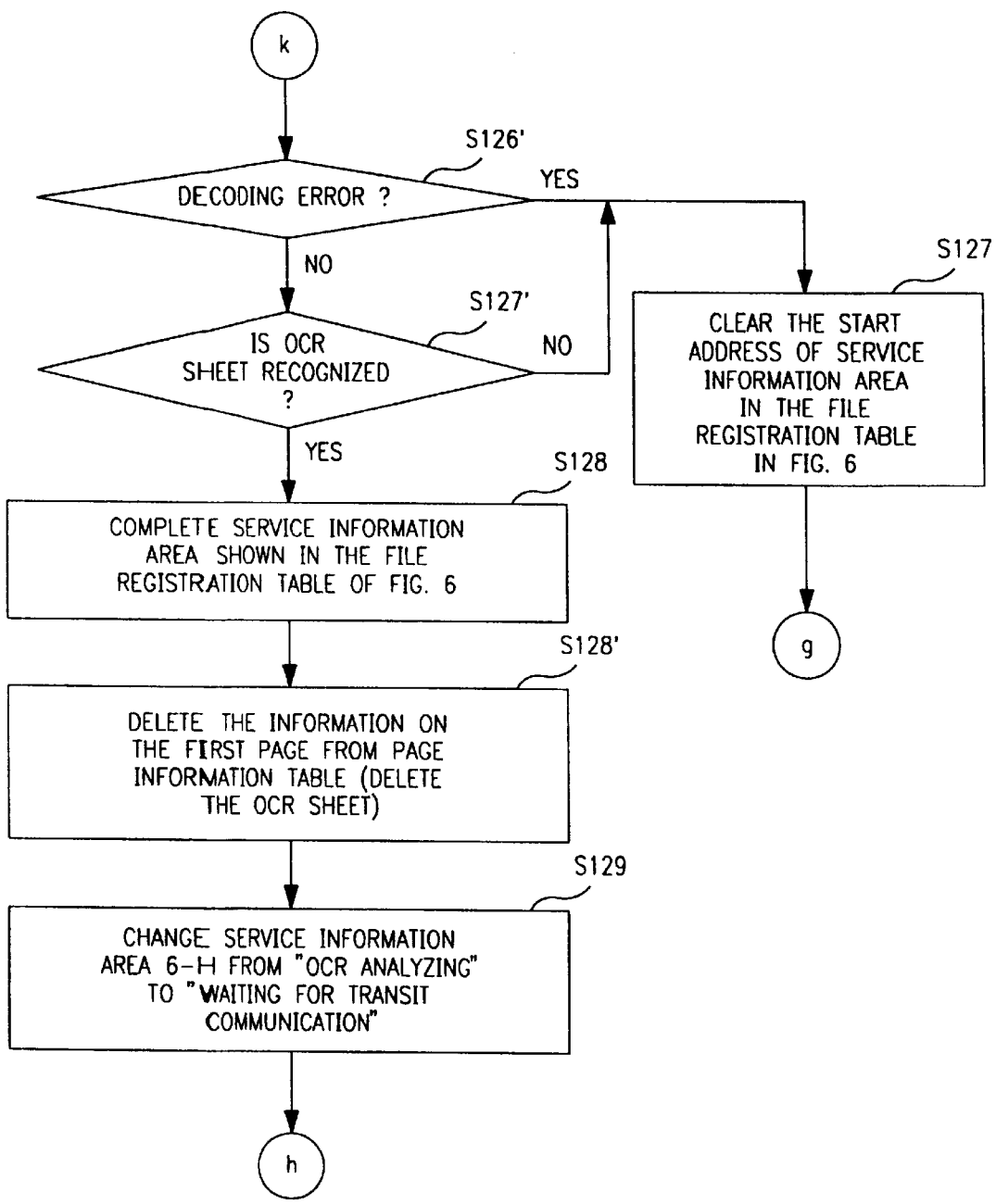
Figure 16:
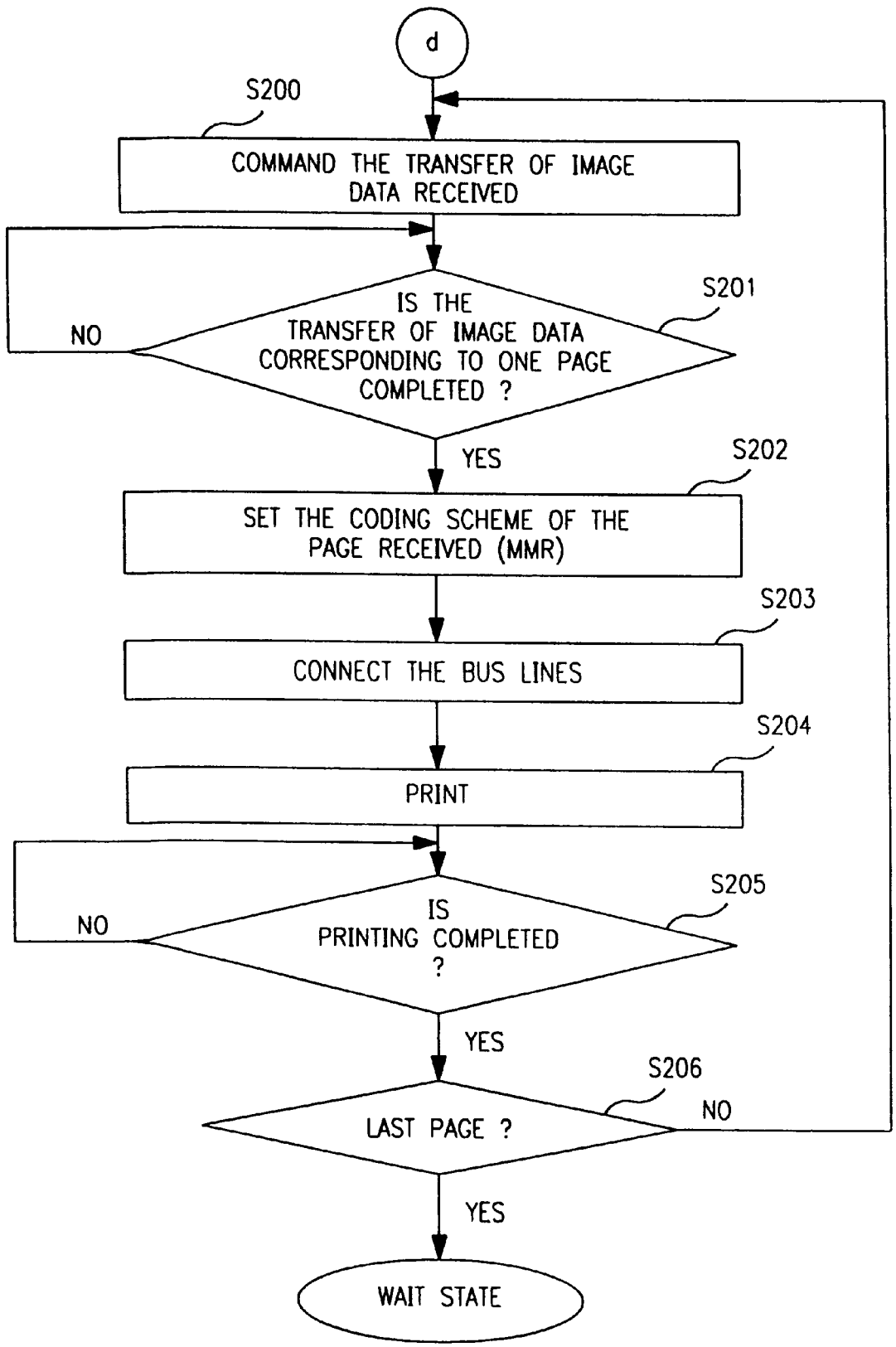

If it is determined in step S216 that the number of pages received is 2 or more, it determines whether or not the start address of the service information in the file registration table is "null". It the answer is yes, no transit transmission is performed and the process goes to step S310. If it is determined that the start address has been written, transit transmission is performed, so the process goes to step S120 as shown in FIGS. 15A and 15B (in step S217).

Figure 18:
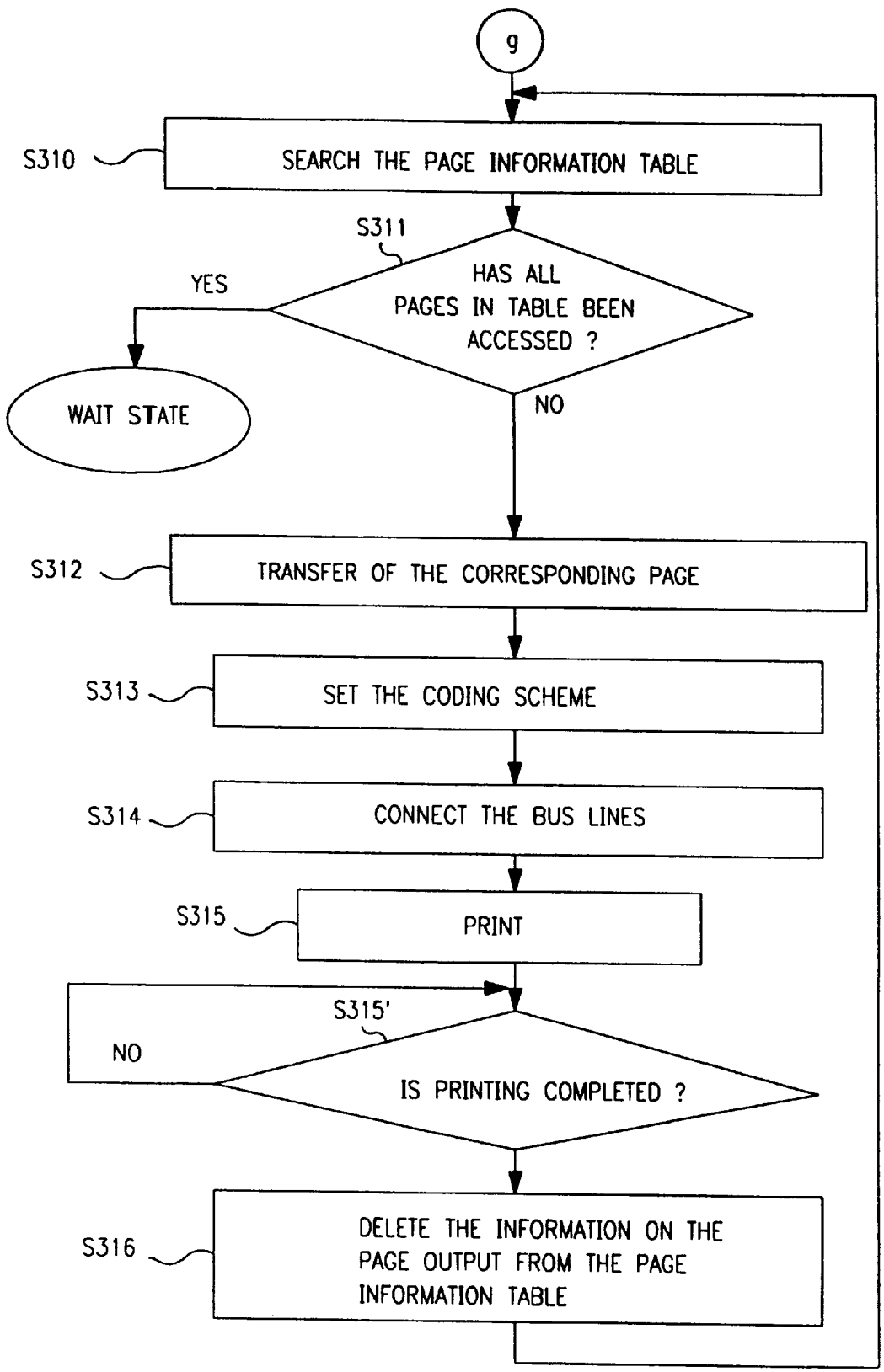

In step S310 and subsequent steps as shown in FIG. 18, page received is output from the hard disk 2-Q, and printing operation is started. In step S310, the page information table indicated by the file registration table is searched, and the area of the nth page (n=1, 2, 3 . . . ) is thereby referred to. The area referred to first is the first page (n=1). Next, in step S311, it is determined whether or not the area of the nth page is cleared. If the area of the nth page is cleared, it is considered that all the pages have been output, and the process returns to the wait state. If the area of the nth page is not cleared, the process goes to step S312.

In step S312, the image data on the nth page is transferred from the hard disk 2-Q to the image memory 2-K. Next, decoding scheme is set in the decoder 2-E by referring to the coding scheme 6-M of the nth page (in step S313). Subsequently, the level of the bus line 2-2 falls so that the bus line 2-4 and the bus line 2-6 are connected to each other, by which means the printer is activated (in step S314). The image data on the nth page is transferred from the image memory 2-K to the decoder 2-E (in step S315), whereupon the image on the nth page is printed out by the printer 2-S. After the transfer of the image data from the image memory 2-K to the decoder 2-E has been completed (in step S315'), the page data on the nth page output is deleted from the page information table in step S316 by virtue of the start address of the page information table being written at the start address of the page information on the (n+1)th page in the page information table. Thereafter, the process returns to step S310. Once all the pages in the table have been output, the process returns to the wait state.

Figure 21:
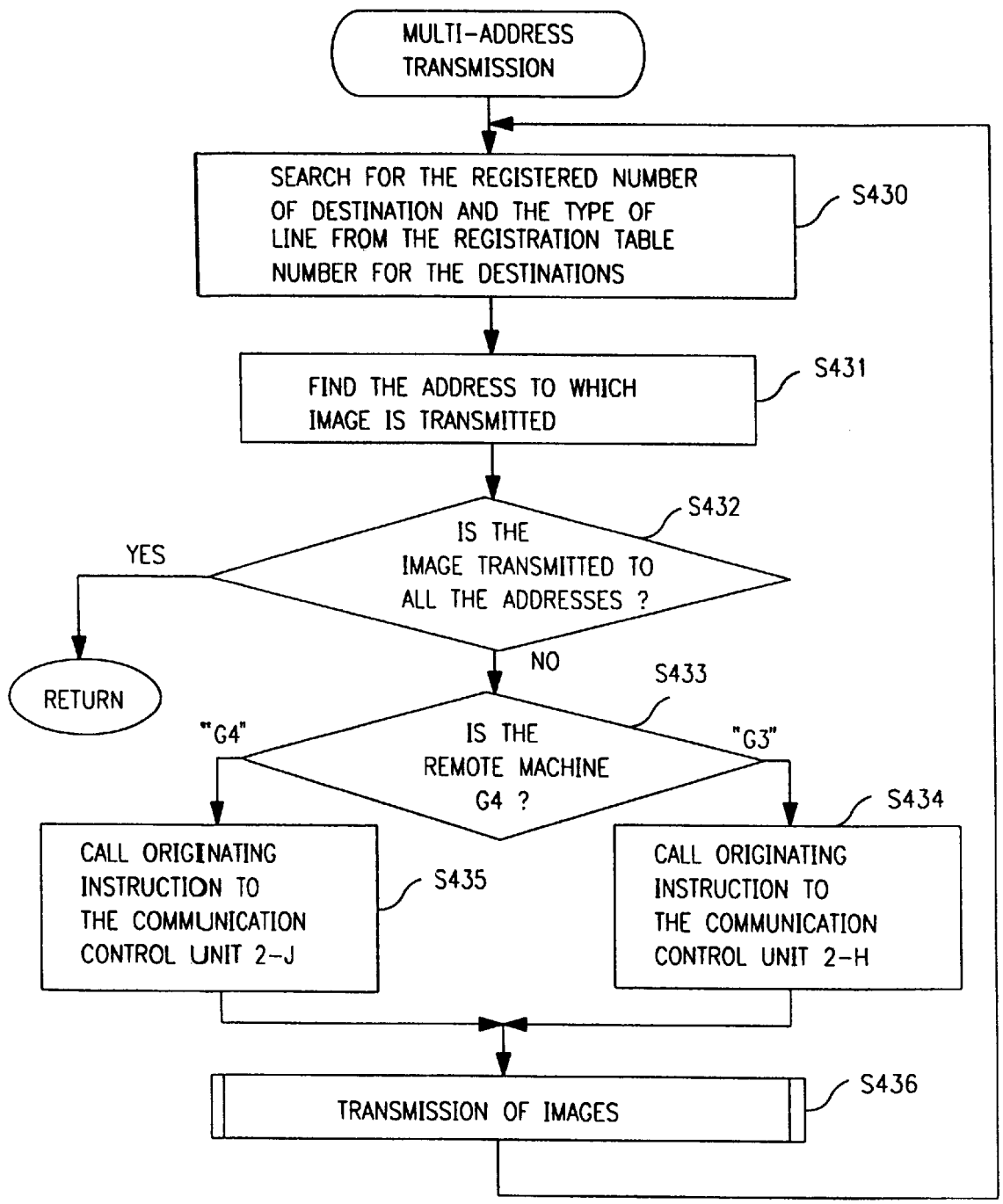
Figure 22A:
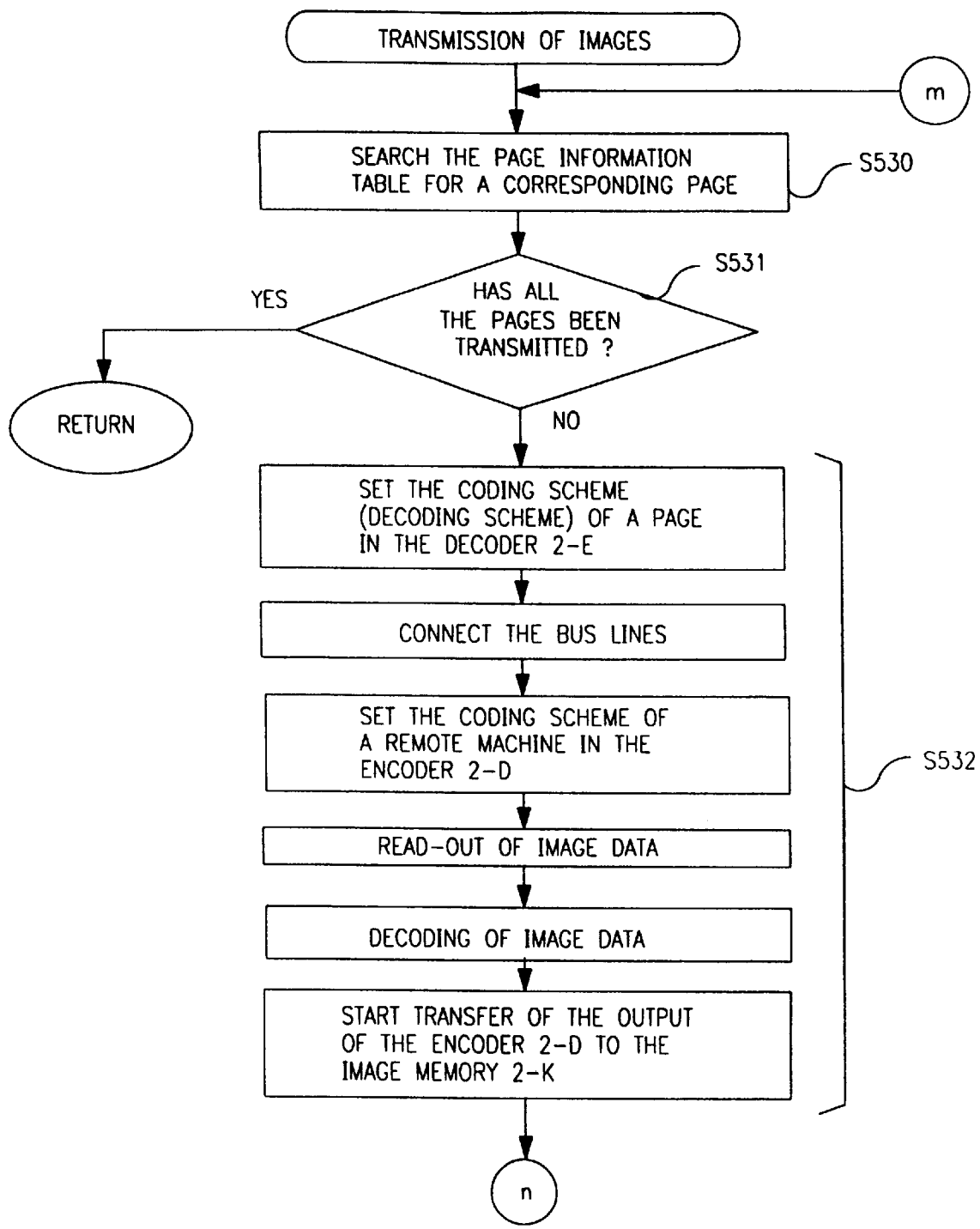
Figure 22B:
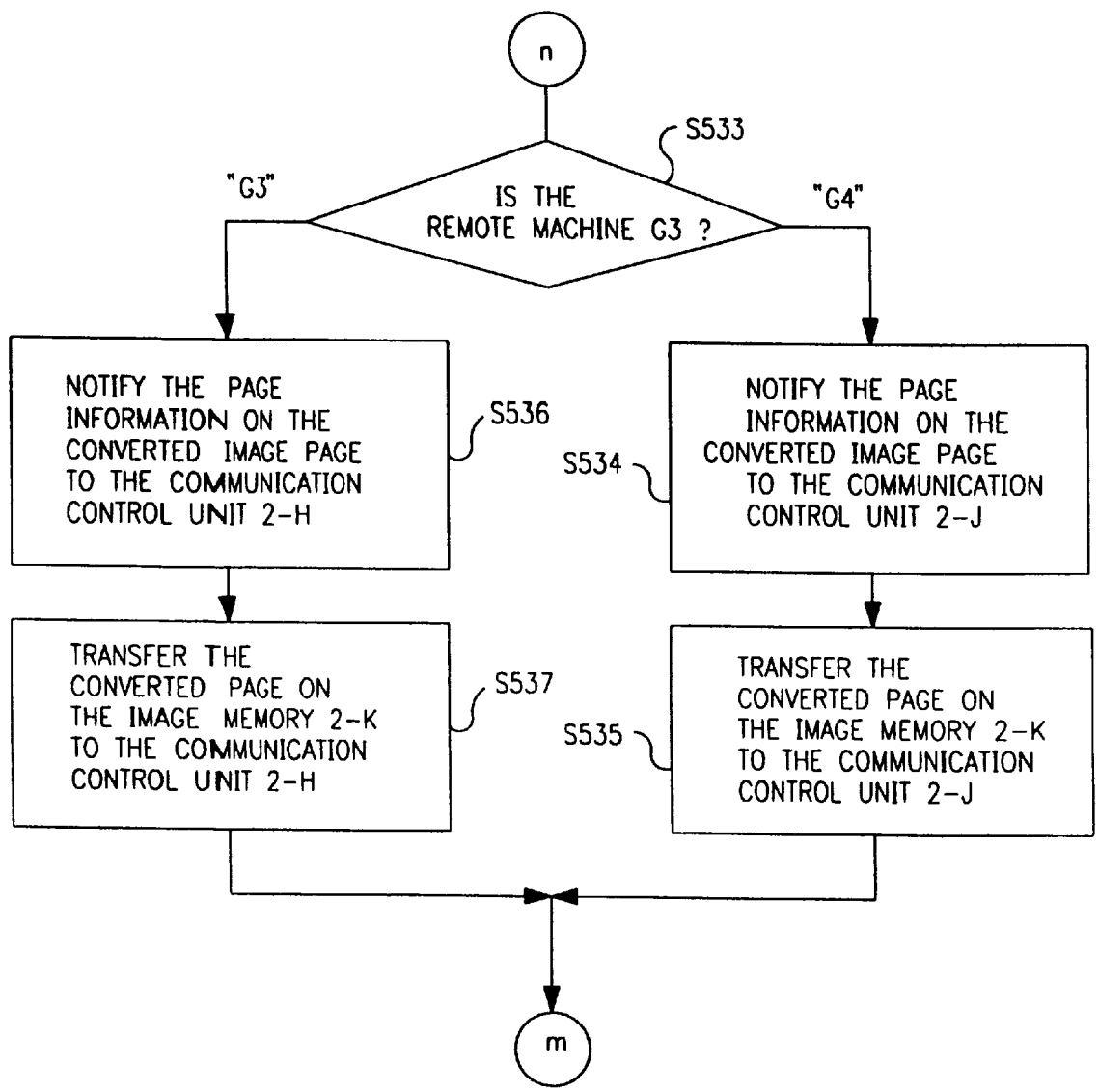

Next, a multi-address transmission performed through a transit will be described with reference to FIG. 21 is a flowchart of the control operation which is conducted when it relays the information sent thereto to the multiple destinations of control unit 2-A and FIGS. 22A and 22B are the flowcharts of the operation conducted when the contents of the page information table are transmitted to a destination.

Figure 5:
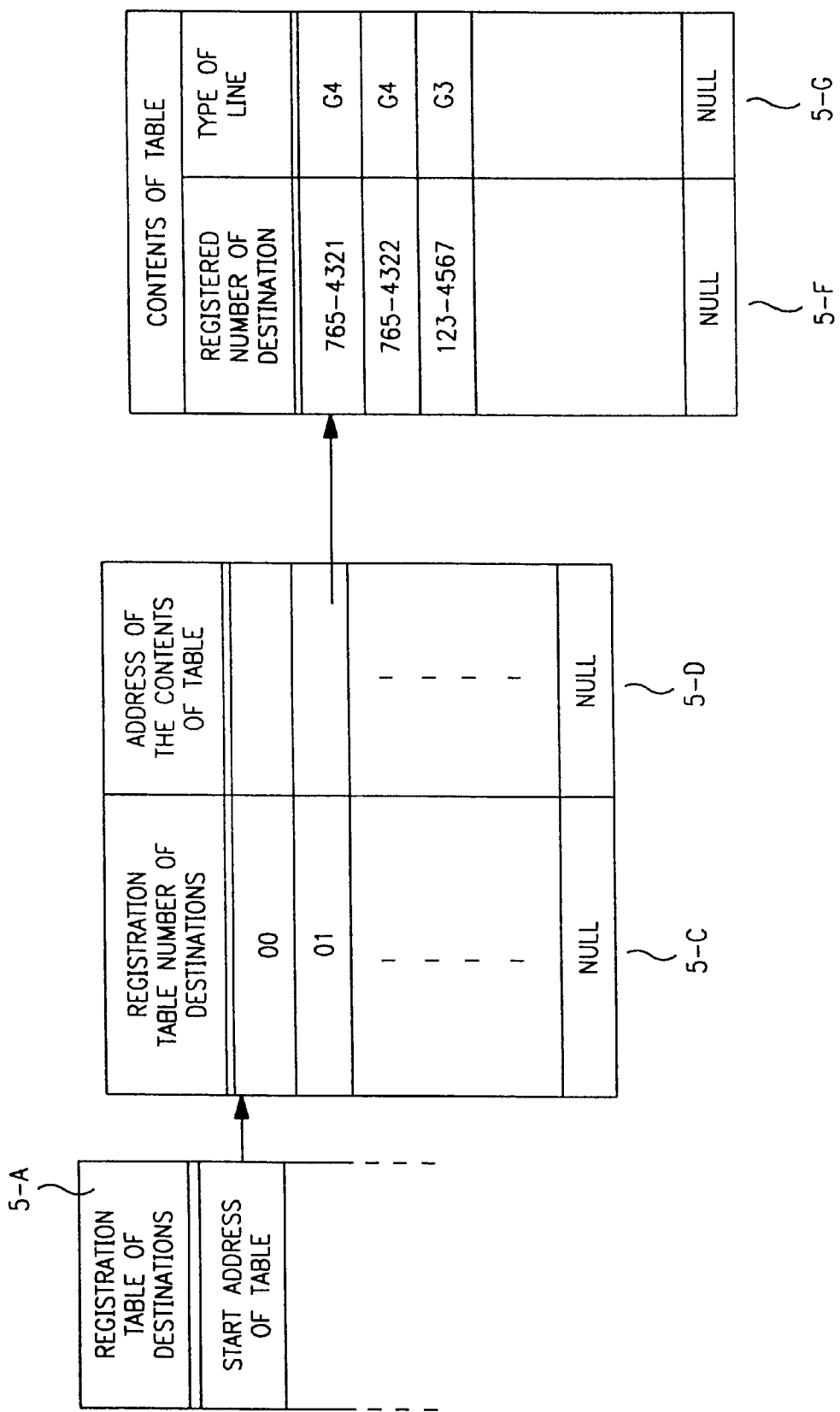
FIG. 5 illustrates a destination registration table for transit/multi-address transmission.
Figure 6A:
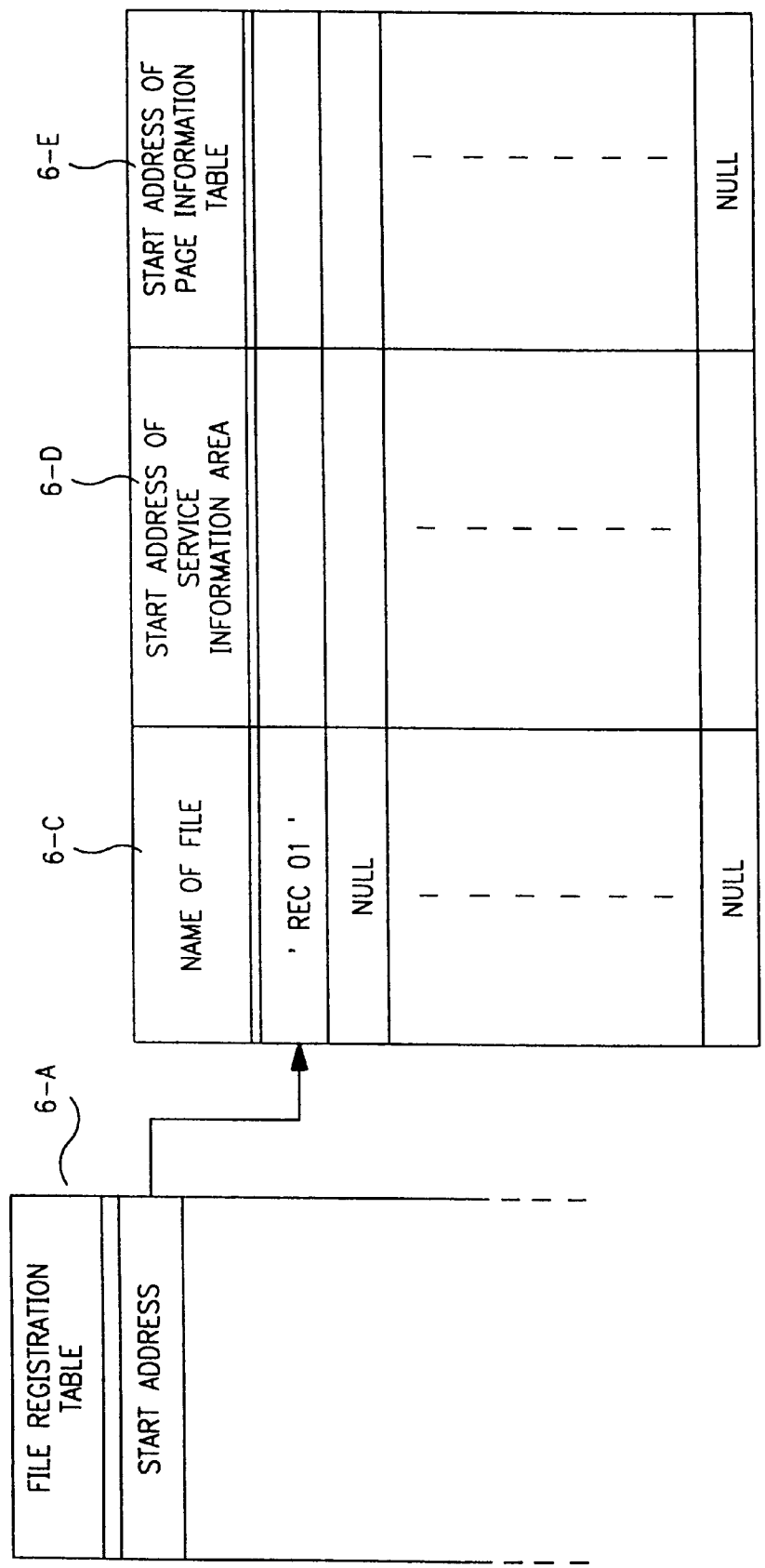

First, in step S430 shown in FIG. 21, the contents of the number of the registered destination 5-F and those of the type of line 5-G are read out from a registration table number 5-C for the destinations to which multi-address transmission is conducted through the transit by referring to the registration table number 6-S for the destination to which multi-address transmission is conducted through the transit (in FIG. 5).

Next, in step S431, a list of the destinations to which multi-address transmission is performed is created from the contents of the number of the destination 6-V and the type of line 6-W, as well as from the contents of the number of the registered destination 5-F and the type of line 5-G. Thereafter, in step S432 it is determined transmission to all the addresses listed in the above-described list is completed. If the answer is yes, multi-address transmission is completed. If the transmission is not completed, the process goes to step S433.

Step S433 determines whether or not the type of line of the destination to which image data is transmitted at this instant is G4. If the destination is a G4 machine, the process proceeds to step S435. If it is G3, the process goes to step S434.

In step S435, the number of the destination is given to the communication control unit 2-J for G4, and a call originating command is then issued by which the communication control unit 2-J is connected to the destination. In step S434, the number of the destination is given to the communication control unit 2-H for G3, and a call originating command is then output by which the connection of the communication control unit 2-H to the destination is performed.

After the connection has been performed in accordance with G3 or G4, the received information is relayed to the destination connected, and the process then returns to step S430. Once the received information is transmitted to all the destinations to which the multi-address transmission is to be performed is completed, the processing of this multi-address transmission is completed (in step S436).

In the image transmission shown in FIGS. 22A and 22B, the page information table is referred to, and the image data corresponding each page received is converted to a pixel signal by the decoder 2-E. The pixel signal is encoded using the coding scheme of the remote machine by the encoder 2-D, and the converted data, i.e., an image page, is then transmitted (in steps S530 and S531). For example, the image data, that is, an image page, received by G3 is an MR (or MH) code. When this image page is to be transmitted by G4, an MR (or MH) code is converted to an MMR code. In the first embodiment, when the image page is transmitted from G4, an MR (or MH) image page is converted to an MMR image page by the decoder 2-E and the encoder 2-D. First, the coding scheme of one page received is set in the decoder 2-E by referring to the page information table. Next, the level of the bus line 2-2 rises so that the bus line 2-2, which is an output bus of the decoder 2-E, and the bus line 2-4, which is an input bus of the encoder 2-D, are connected to each other. The coding scheme of the remote machine to which the information is to be transmitted is set in the encoder 2-D. The image data corresponding to one page is read out from the hard disk 2-Q to the image memory 2-K, and the image data read out to the image memory 2-K is transferred to the decoder 2-E where it is converted to a pixel signal. A resultant signal is then output to the encoder 2-D where it is encoded, and a resultant encoded data is transferred to the image memory 2-K. Thus, the converted image page is stored in the image memory 2-K by a sequence of the above-described processings (in step S532). Thereafter, the type of line of the remote machine is determined (in step S533). If the remote machine is G3, the converted image page is transferred to the communication control unit 2-H (in step S536), and the transmission of the image is executed (in step S537). If the remote machine is G4, the converted image page is transferred to the communication control unit 2-J (in step S534), and the transmission of the image is executed (in step S535). In this processing of image transmission, the data flows in the manner shown in FIG. 23.

Figure 23:
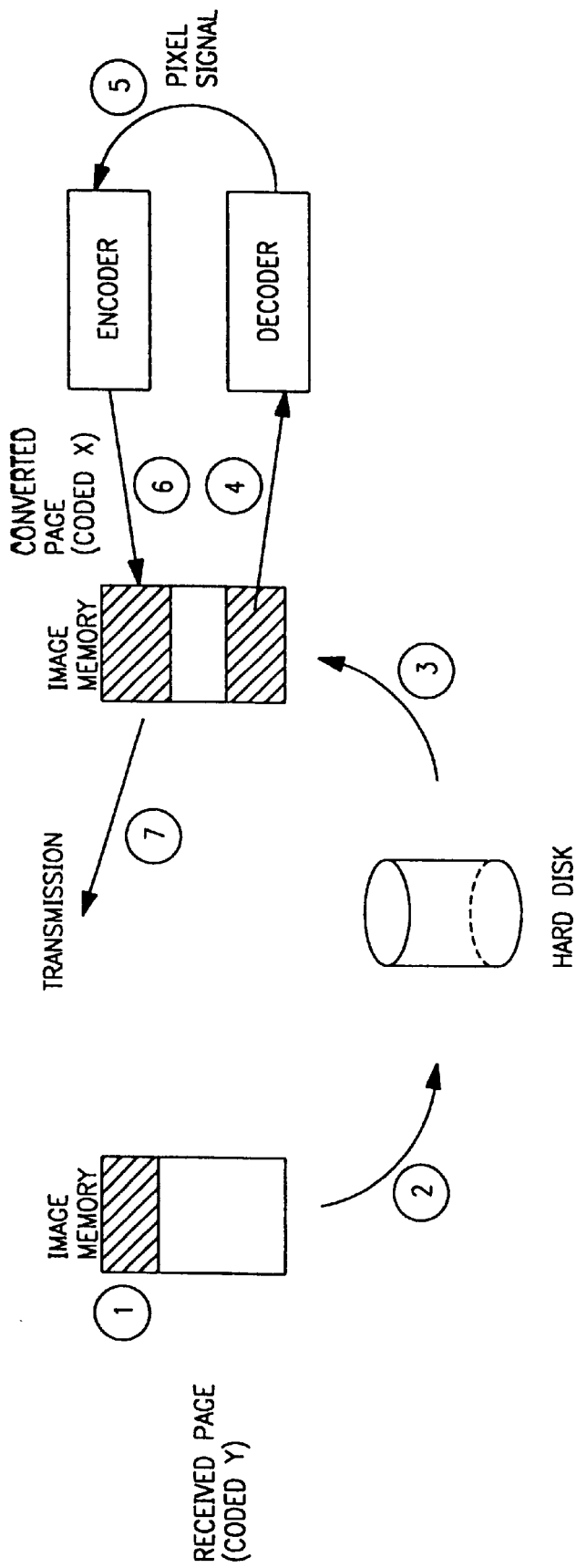
FIG. 23 illustrates the flow of data in the transit/multi-address transmission.
Figure 24:
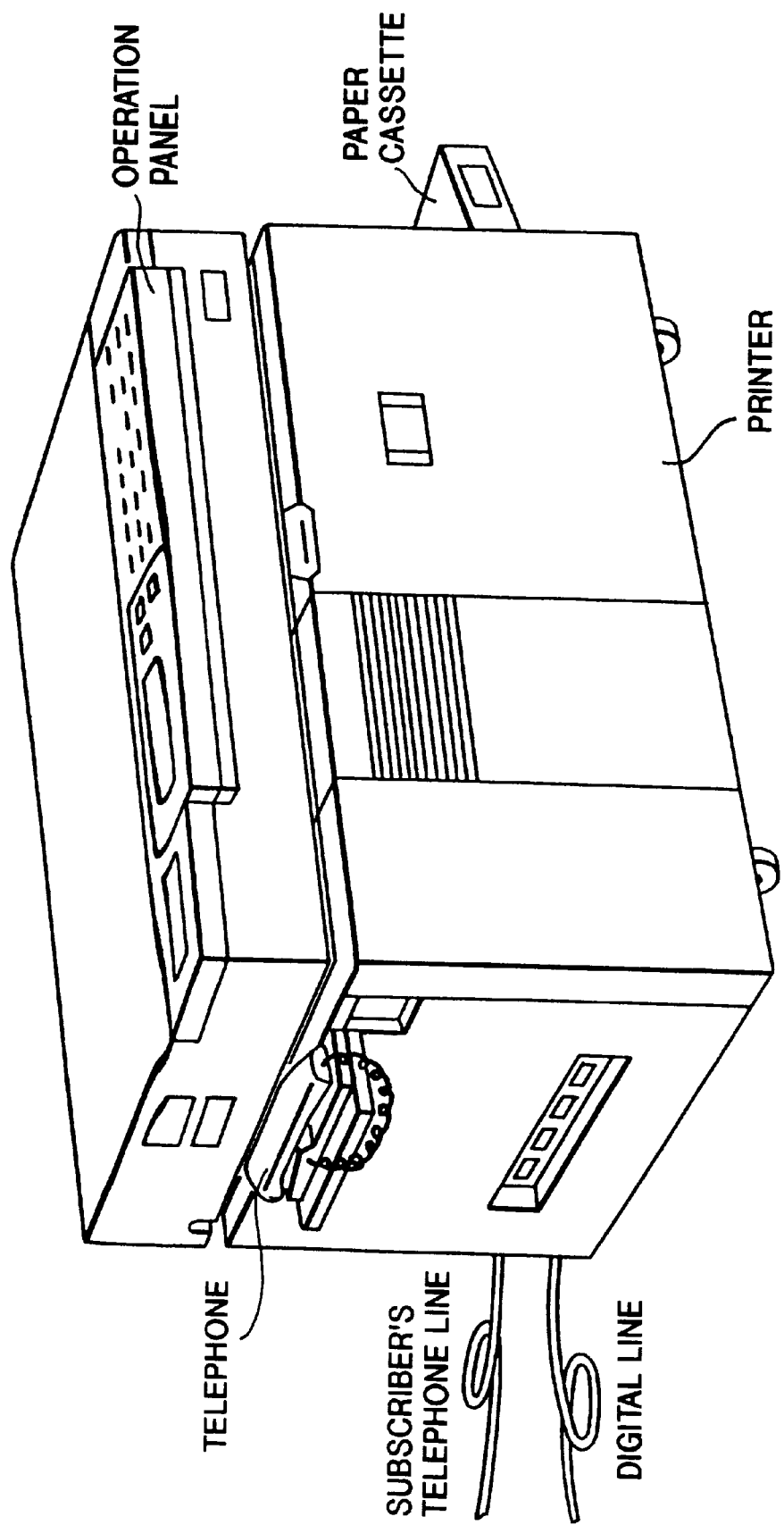
FIG. 24 is a perspective view of the facsimile apparatus of FIG. 2.
Figure 25:
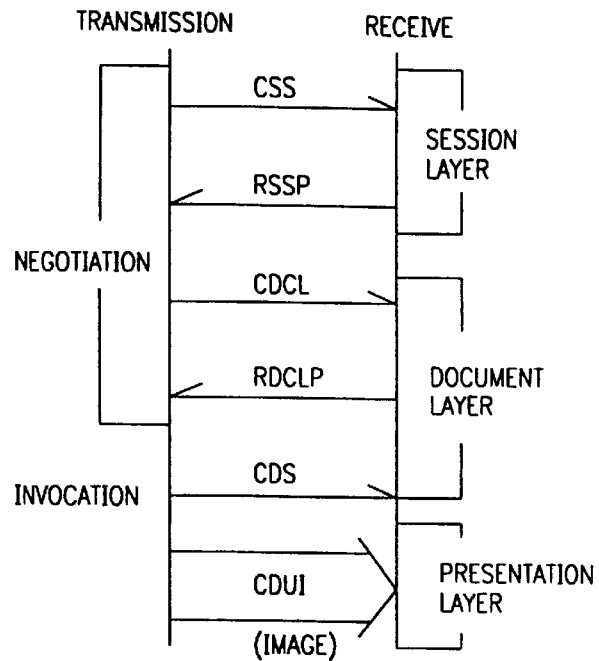
FIG. 25 illustrates the procedure for a G4 facsimile transmission.
Figure 26:
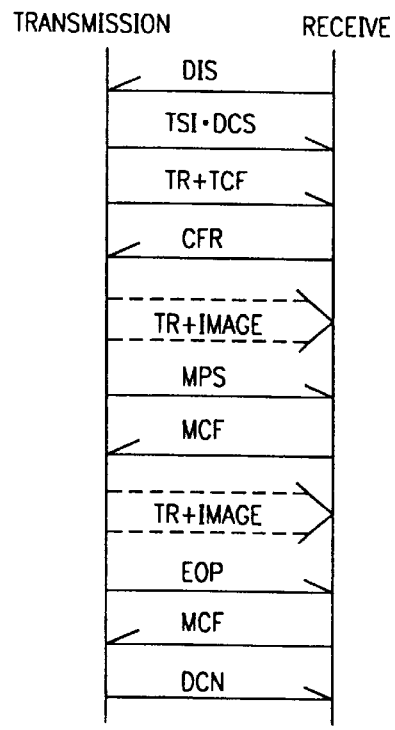
FIG. 26 illustrates the procedure for a G3 facsimile transmission.

FIG. 23 shows the flow of data in the transit/multi-address transmission. FIG. 24 shows an external view of a facsimile machine used in this first embodiment. FIG. 25 shows the procedure for G4 facsimile transmission, and FIG. 26 shows the procedure for G3 facsimile transmission.

The procedure for G4 facsimile transmission is executed by the communication control unit 2-J of the G4 facsimile. The dialing number (identifier) of a transmitting party is identified by CSS. Further, a resolution of, for example, 200 ppi and a size of, for example, A4 are declared in RDCLP. Further, CDS is notified from the communication control unit 2-J to the control unit 2-A as a reception command. In the procedure of G3 facsimile transmission shown in FIG. 26, which is executed by the communication control unit 2-H of the G3 facsimile, the dialing number of the transmitting party is identified by TSI. Further, a resolution of, for example, fine (equivalent to 200 ppi) and a size of, for example, A4 are declared in DIS. Further, DCS is notified from the communication control unit 2-H to the control unit 2-A as a reception command.

In the first embodiment, the facsimile machine that operates as a transit station has been described. However, the same facsimile machine may also be operated as a normal facsimile by providing it with a reader 2-T shown in FIG. 2.

As will be understood from the foregoing description, in the first embodiment, an OCR sheet is read, and this enables any type of facsimile machine (including G3 and G4) that can be used for communication to be utilized as a transit instructing station for the transit/multi-address transmission. Further, the contents of the transit instruction can be readily confirmed because a transit request is made using an OCR sheet.

Further, since a transit request is made using an OCR sheet, a special operation for the transit instruction is not required, thereby improving the operability and decreasing the possibility of erroneous operation.

Furthermore, a transit request is made by transmitting the OCR sheet on which the destinations are written, and this makes confirmation of the contents of the transit instruction easy.

The operation for the normal transmission is used to make a transit request. It is possible to use an OCR sheet many times. Since the OCR sheet is a handwritten sheet, destinations can be readily changed or added. When an operator transmits the documents to be relayed, all he has to do is to attach an OCR sheet to the documents, thus improving the operability and visibility. In the first embodiment, since the OCR sheet on which decoding error has occurred is not recognized by the control unit 2-A, erroneous identification of the OCR sheet due to the noise on the analog line can be avoided, improving the reliability of communication (preventing erroneous transit instruction from being output). Further, since the transit station does not transit an OCR sheet received to the destinations to which the documents are to be relayed, communication cost can be reduced. When the number of documents received is 1, no transit/multi-address transmission is performed, increasing the speed at which the documents received are processed. A transit request can be made only from the terminals which have been registered in advance, if a document is received from the terminal from which transit multi-address transmission cannot be instructed, receipt of the document can be processed at a high speed. This improves the efficiency of the use of the memory in the transit station. If the two facsimile machines have the function of error resend mode, the erroneous identification of an OCR sheet due to the noise on the analog line can be prevented by setting the operation mode of the machines in this error resend mode.

A second embodiment of the present invention which involves transit/multi-address transmission utilizing a DTMF signal will now be described below.

Figure 27:
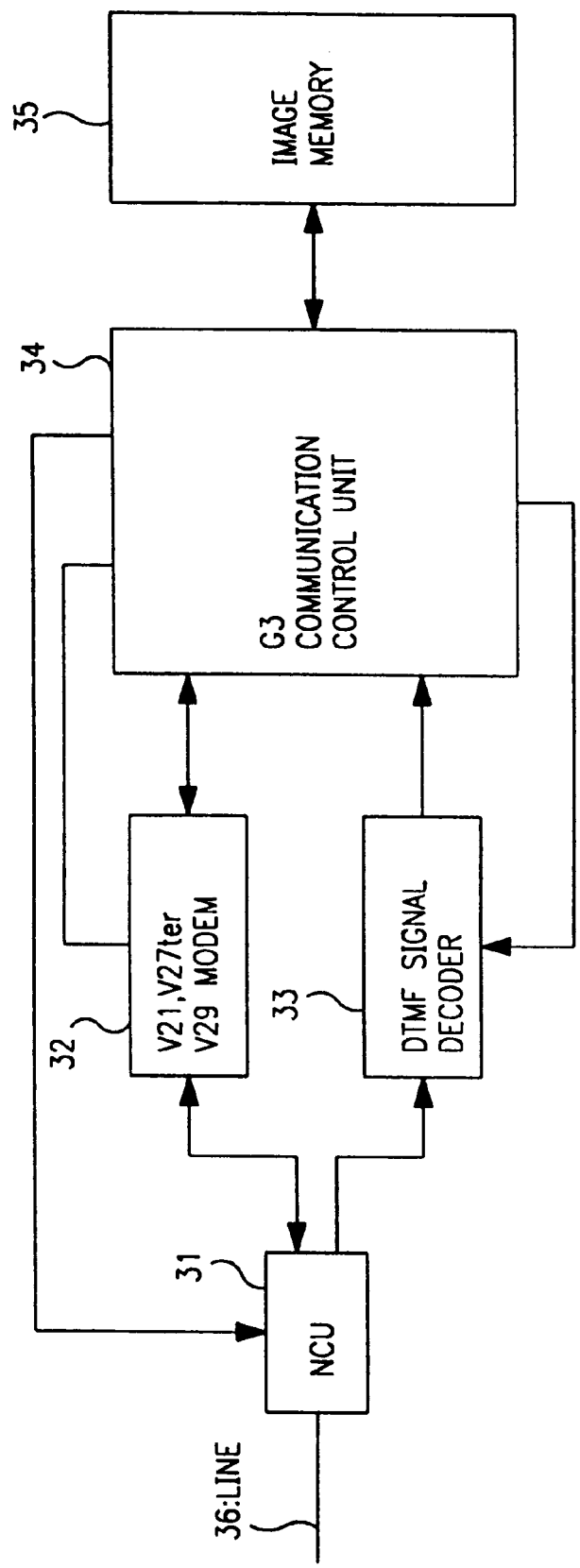
FIG. 27 is a block diagram of a facsimile apparatus in which transit/multi-address transmission is performed using a DTMF signal, showing a second embodiment of the present invention.

FIG. 27 is a block diagram of a facsimile apparatus which is used in transmit/multi-address transmission using a DTMF signal. This facsimile apparatus includes a known network control unit (NCU) 31 connected to a public telephone line 36, a MODEM 32 recommended by CCITT in which the operation mode can be switched over among V21 (300 bps), V29 (9600, 7200 bps), V27 (4800, 2400 bps) and tonal sending and tonal reception, a DTMF signal decoder 33 which is capable of discriminating DTMF tones including 0 to 9, # and a G3 communication control unit 34 and an image memory 35 constituted by a ROM, a RAM and so on.

In cases where the facsimile apparatus arranged in the above-described manner is a transit instructing station which commands the transit station to relay data, a DTMF signal which commands transit operation is transmitted from the G3 communication control unit 34 (hereinafter referred to as a "control unit") to the transit station. On the other hand, in cases where the facsimile apparatus is a transit station which receives a transit command from the transit instructing station, the control unit 34 analyzes the DTMF signal received from the transit instructing station, recognizes the fact that the transit instructing station is commanding transit operation, and transmits the image received from the transit instructing station to the destination.

Figure 28:
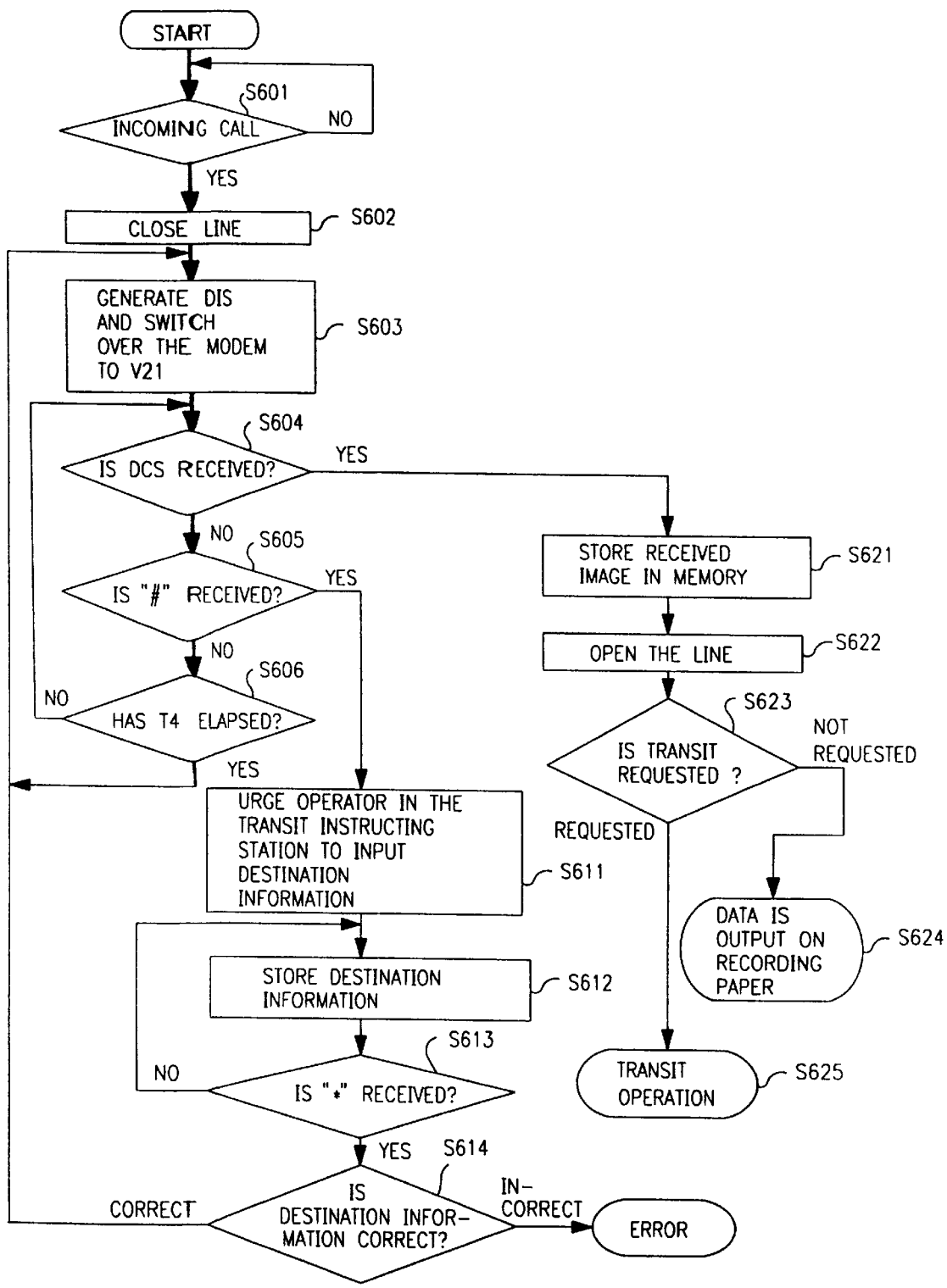
FIG. 28 is a flowchart of the transit operation of a control unit 34.

Now, an example of transit operation will be described with reference to FIG. 28 which is a flowchart of the transit operation of the control unit 34. In that case, the facsimile apparatus shown in FIG. 27 functions as a transit station.

First, in the wait state, the NCU 31 is monitored to detect an incoming call from the public telephone communication network 36. If an incoming call on the NCU 31 is detected (in step S601), the NCU 31 is controlled to close the line 36 (in step S602). Thereafter, a DIS (digital identification signal) is generated in accordance of the automatic receipt procedure defined in T30 of CCITT, the MODEM 32 is switched over to V21, and the DIS is sent out to the line 36 (in step S603).

After the sending out of the DIS, Command DCS (a digital command signal) defined by T30 of CCITT and a DTMF signal of "#" (which represents a transit commanding signal in this embodiment) are awaited. The DTMF signal is monitored by the DTMF signal decoder 33. Thereafter, it is determined whether or not a time T4 (3 seconds) defined in T30 of CCITT has elapsed (in step S606). If the answer is yes, the process returns to step S603.

Figure 29:
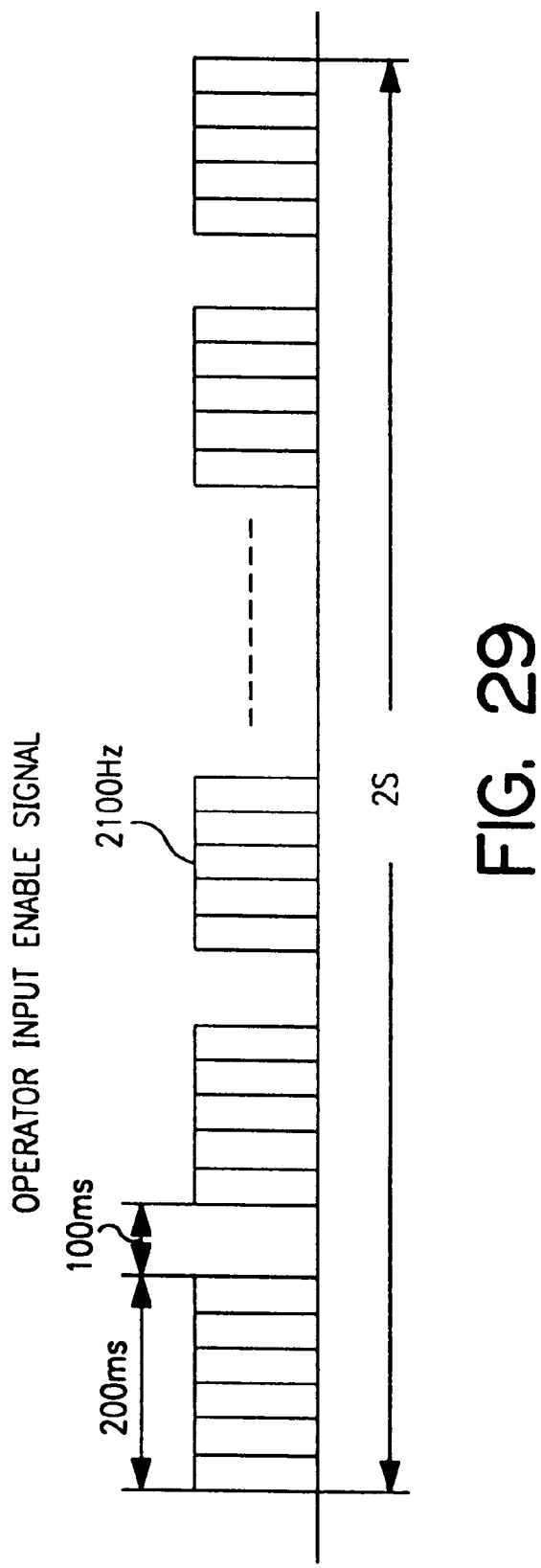
FIG. 29 shows an example of an operator input permitting signal.

Once the control unit 34 has received "#" (a transit commanding signal) from the transit instructing station in step S605, the MODEM 32 is switched over to the tonal sending. Thereafter, the control unit 34 sends out to the transit instructing station an operator input enable signal shown in FIG. 29 to enable an operator in the transit instructing station to send the information on the destinations (telephone numbers) to which data is to be relayed (in step S611). The information on the destinations sent from the transit instructing station is stored (in step S612), and "*" representing the completion of sending of the information on the destinations is then received (in step S614). Thereafter, it is determined whether or not the information on the destinations received is correct (in step S614). If it is correct, the process returns to step S603.

Once the DCS (digital command signal) has been received in step S604, the procedure for receiving data which is defined in T30 of CCITT is executed. That is, the image received is stored in the image memory (in step S621), and the NCU 31 is then controlled to open the line 36 (in step S622). If the information on the destinations to which the image received is transmitted exists in the memory (in step S623), it determines that the transit operation is requested, and the image data stored in the image memory 35 is therefore transmitted to the destinations (in step S625). That is, after the destination has been called, the image data received is transmitted to the destination in accordance with the procedure for sending data, which is defined in T30 of CCITT, the transit operation being completed when all the image data has been transmitted.

If it is determined in step S623 that no information on the destinations exists in the memory, it determines that the transit operation is not requested, and the image data received is printed out on recording paper in the same manner as the normal reception.

This completes the transit operation conducted by the facsimile apparatus which operates as a transit station.

Next, the operation of the facsimile apparatus which operates as a transit instructing station will be described.

First, an operator of the transit instructing station manually calls the transit station using a telephone. After DIS has been received from the transit station and no sound has been heard, the operator of the transit instructing station pushes "*" key of the pushbutton phone. When he hears the operator input enable signal (shown in FIG. 29) from the transit station, the operator in the transit instructing station inputs using the pushbutton phone the information (telephone numbers) on the destinations. He completes the input of the destinations by pushing the key. Thereafter, DIS is heard, and the operator then manually sends out the documents, thereby completing the operation conducted by an operator of the transit instructing station.

In this embodiment, the provision of the decoder 33 for DTMF signal in the transit station enables the transit station to automatically perform transit operation without an operator. Further, unlike a transit system in which transit is commanded using NSX (non-standard signal), any type of facsimile machine can be used as a transit instructing station in this embodiment so long as it is provided with a push-button phone.

Further, if "*" is used to divide the information on the destinations which is sent from the transit instructing station to the transit station, it is possible to transmit the same documents to a plurality of destinations. Further, various services may become possible if the format of the information is improved.

In a case where a transit of document to a G4 facsimile machine is requested from a G3 facsimile machine, the image received from the G3 machine can be relayed to the G4 machine by preparing information for the destinations which contains the type of machine.

Next, a third embodiment of the present invention which exemplifies a method of transmitting data to a destination terminal will be described.

Figure 30:
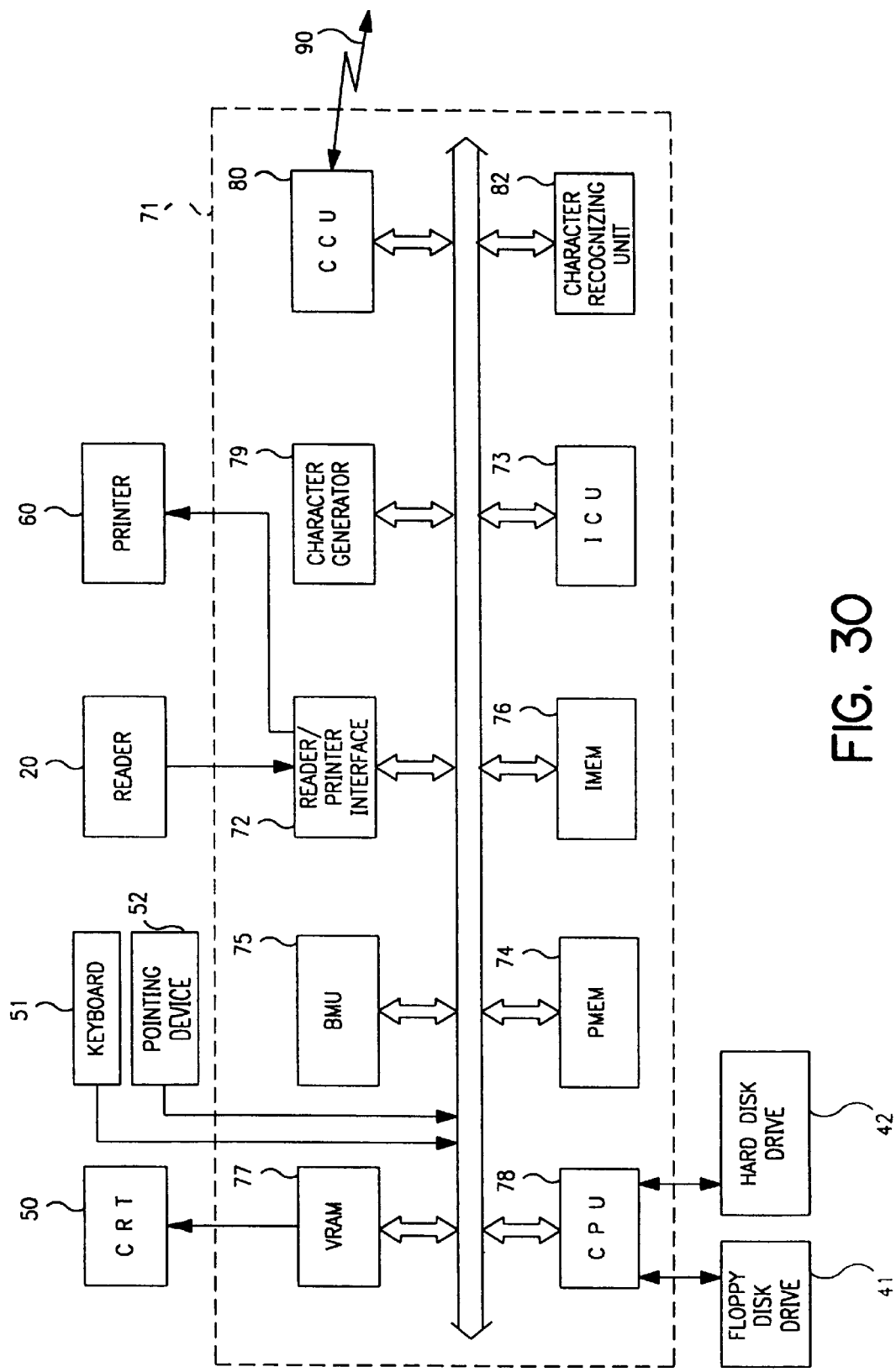
FIG. 30 is a block diagram of a third embodiment of the present invention.
Figure 31:
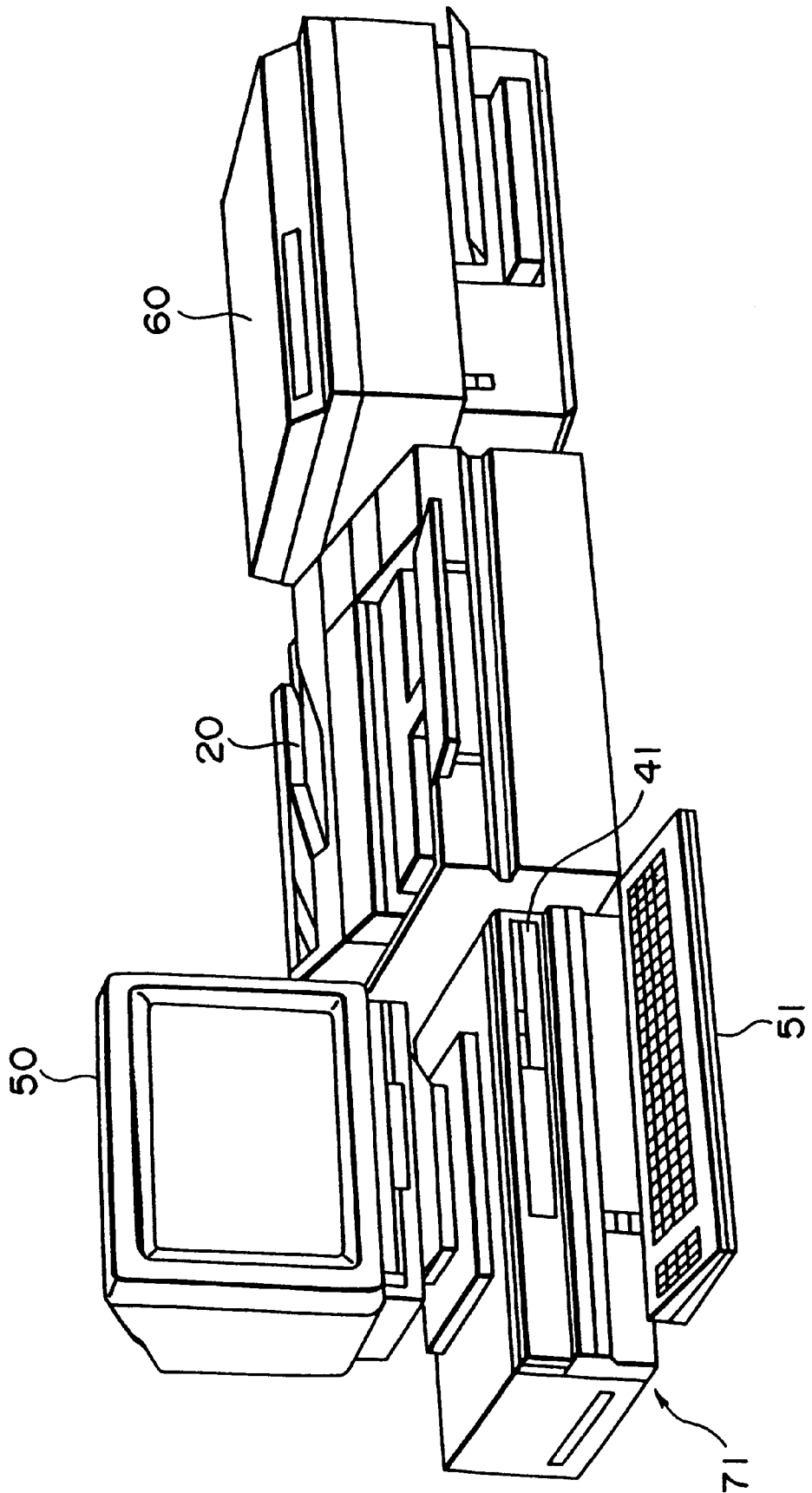
FIG. 31 is a perspective view of the facsimile apparatus of FIG. 30.

FIG. 30 is a block diagram of a third embodiment of a facsimile apparatus according to the present invention, and FIG. 31 is a perspective view of the apparatus of FIG. 30.

The facsimile apparatus shown in FIGS. 30 and 31 includes a reader 20 for reading a predetermined original on which document is recorded and for outputting an electrical signal, and a facsimile body 71. The facsimile body 71 includes a reader/printer interface 72 for connecting the reader 20 to a printer 60 to be described later, and an image compression unit 73 (hereinafter referred to as an ICU) for compressing or expanding data. Two dimensional compression (high compression) is adopted in the ICU 73 so as to allow a coding rate to be increased.

A program memory 74 (hereinafter referred to as a PMEM) is a memory in which various programs for controlling the I/O devices provided in the periphery of the facsimile body 71 and the various types of unit incorporated within the facsimile body 71 are stored. The PMEM 74 contains an OS program and application program memory area and a font memory area where character code data is converted into bit image data. The PMEM 74 also contains an area in which text code data (character data) input using keys or word processing is stored and edited. The PMEM 74 also contains a memory management unit, and a buffer used for data transmission when data stored in a hard disk 40 is transmitted through a CCU 80 or when data received by the CCU 80 is stored in the hard disk 40. The data transmission buffer is used to synchronize the speeds at which data is processed in a disk and on a line.

A bit move unit 75 (hereinafter referred to as a BMU) processes data in bit unit on a CRT 50. This BMU 75 is used to edit (process) an image, e.g., to expand, shrink, rotate, move and extract an image.

An image memory 76 (hereinafter referred to as an IMEM) has a memory capacity of 4 M bytes. The IMEM 76 stores the image data read by the reader 20, the image data processed by the BMU 75, the data expanded by the ICU 73, the character code data input using keys, the text code data input by the word processing, the mixed data, and the bit data (managed such that each pixel corresponds to one bit) converted from character code data. In this context, mixed data represents data in which bit image data and character code data coexist in one page. Mixed data is managed by the image memory 76 in a state where an identification code that indicates that that block is an image block or a character block is affixed to each block. Further, the IMEM 76 has the function of synchronizing the speeds at which data is processed in the reader 20, the printer 60 and on the line 90 by temporarily storing the above-described data.

A video RAM 77 (hereinafter referred to as a VRAM) stores the image data to be displayed on the CFRT 50 as a bit-mapped data (with each pixel corresponding to, for example, 1 bit).

The facsimile body 71 is provided with a hard disk device 40 and a floppy disk drive 41, which serve as external storage devices. A nonvolatile memory is used as the devices 40 and 41. A nonvolatile backup memory may also be used as the devices 40 and 41. The hard disk drive 40 and the floppy disk drive 41 each of which is made of a nonvolatile memory store data to be transmitted or data received.

A CPU 78 controls the overall facsimile body 71. The CPU 78 incorporates a ROM (not shown) which stores programs of the control operations described in the flowcharts of FIGS. 35, 37A, 37B, 39A and 39B, which are described later. Each of these programs is loaded in the PMEM 74 to make the CPU 78 ready for operation.

A communication control unit 80 (hereinafter referred to as a CCU) is connected to a line 90. The CCU 80 controls transmission and receipt of data. A system bus 81 consists of a data bus, an address bus and a bus for a control signal.

A keyboard 51 is used to input transmission and reception command data, command data for image or word processing, or character data for word processing. A pointing device 52 is used to specify the position by moving a cursor image on the CRT 50 in image processing. Mixed data is divided into blocks using this pointing device 52. The coordinate of the block position in the mixed data is stored in and managed by the PMEM 74 and is used as one data in a header (to be described later) during the transmission.

A line 90 may be a digital line which is capable of transmitting data at a rate of 64 K bit/sec (hereinafter referred to as a bps). This enables image data representing a large amount of information and having a high resolution (density) to be transmitted at a high speed and in an large amount.

A laser beam printer 60 (hereinafter referred to as a printer) is capable of printing data at a rate of 3 M bps. A character generator 79 converts the data stored in the disk drives 40 and 41 or coded data received into a character pattern.

A character recognizing unit 82 recognizes the bit image of a character read by the reader 20 as a character upon the command of the CPU 78.

Next, the mixed mode function of operation of the facsimile body 71 arranged in the above-described manner will be described with reference to FIGS. 32 and 33A to 33C.

Figure 32:
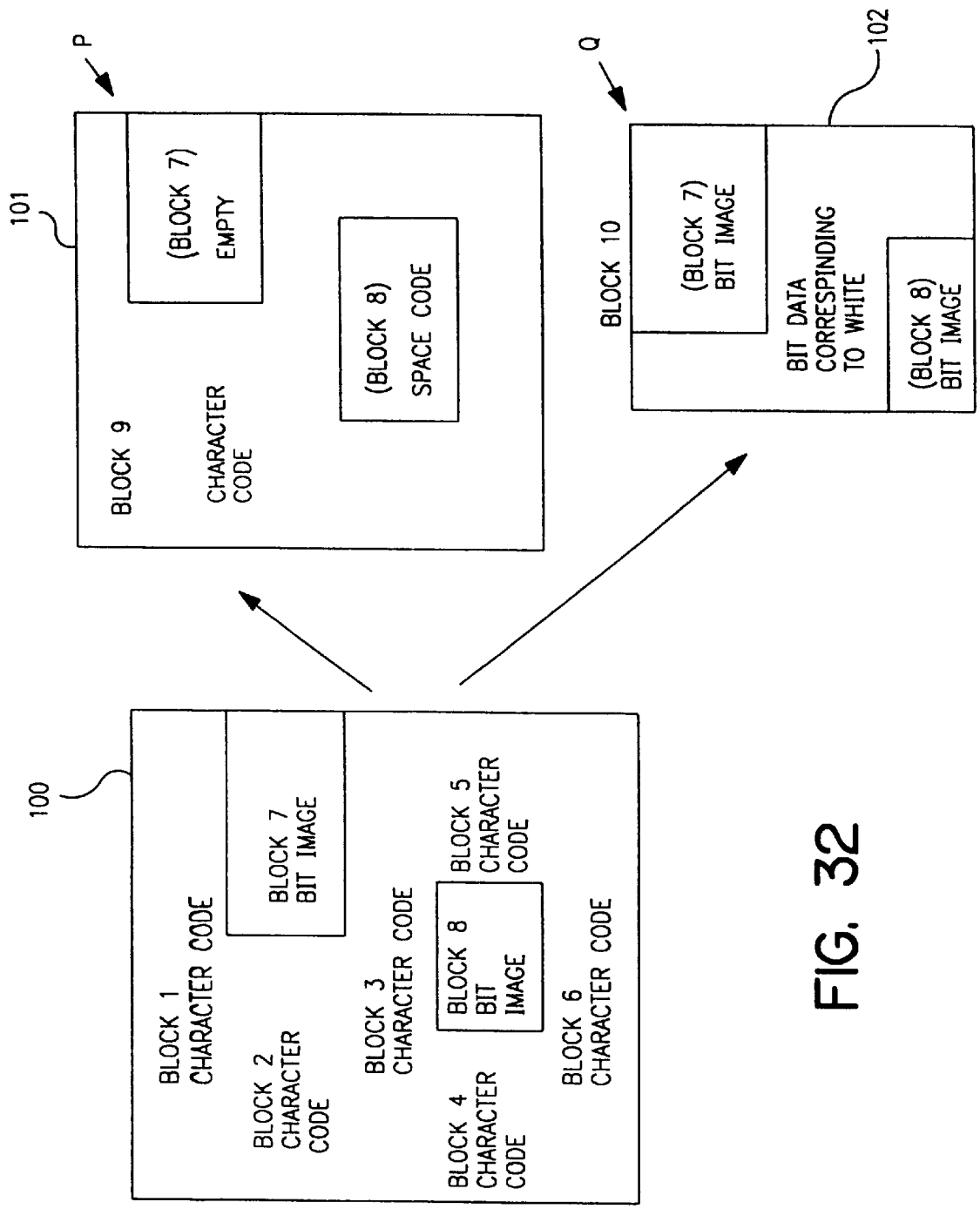
FIG. 32 illustrates a text corresponding to one page which is divided into areas in the mixed mode of operation.

FIG. 32 shows a document corresponding to one page which is divided into areas in the mixed mode, and FIGS. 33 A to 33C show the data formats for the blocks shown in FIG. 32.

In FIG. 32, a document 100 represents one page of mixed data corresponding to one page which has been edited. This page contains character code blocks 1 to 6 and bit image blocks 7 and 8.

A document such as the document 100 in which the character code blocks and the bit image blocks coexist on one page must be divided into a large number of blocks when it is transmitted. It may be divided into blocks as follows.

The document 100 shown in FIG. 32 is divided into a document 101 formed only by the character code blocks in the document 100, and a document 102 formed only by the bit image blocks of the document 100.

The document 101 consists of a block 9 exclusively used to transmit character code, and the document 102 consists of a block 10 exclusively used to transmit bit image. No code exists in the area in the document 101 which corresponds to the block 7 because of the end of lines. Null code representing space or tab exists in the area in the document 102 which corresponds to the block 8.

The document 102 containing the blocks 7 and 8 is made short in the longitudinal direction, as shown in FIG. 32, in order to make it a minimum rectangular block. The number of blocks exclusively used for bit image is not limited. Further, the size of the rectangular block is not limited. Bit data corresponding to white exists in the entirety of the area in the document 102 which corresponds to character code blocks so as to allow it to be transmitted as the document 101.

Figure 33A:
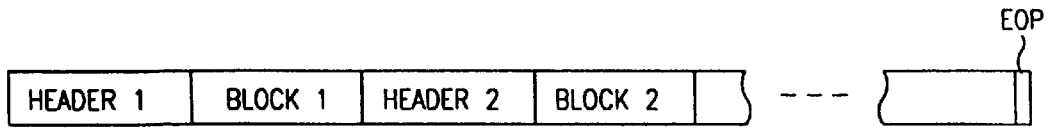
FIGS. 33A to 33C illustrate data formats of the blocks shown in FIG. 32.

The mixed data (data obtained in the mixed mode of operation) shown in FIGS. 32 and 33A to 33C, which corresponds to one page, is divided into blocks 1 to 8. This page data corresponds to one page of image displayed on the CRT 60, one page of data to be transmitted and one page of data received and printed out, respectively. A plurality of page data created is successively stored in the hard disk drive 40. In order to transmit a plurality of pages of page data in a single connection in the mixed mode of operation, the data to be transmitted is arranged such that an attribute code data (hereinafter referred to as a header) 1 to n precede block data 1 to n, respectively, as shown in FIG. 33A.

The header contains information about the block data that follows it, including an identification signal which identifies the block data as image data or character data, data representing the size of the block data (the amount of data in that block), and data representing the coordinate of the block data on that page. At the end of the page data is affixed an EOP (end of page) code.

The data corresponding to an original in one page read by the reader 20 is stored in the IMEM 76 and then in the VRAM 77 so that it can be displayed on the CRT 50. The image displayed on the CRT 50 can be processed using the keyboard 51 or the pointing device 52. The processed image is then reduced through the BMU 75, and the reduced image shown on CRT 50 is stored in IMEM 76 again.

Next, the code data representing a text input from the keyboard 51 is stored in the PMEM 74. Thereafter, the text code data is converted to a bit image, and the converted bit image is transferred to the VRAM 77 so that it can be displayed on the CRT 50 in dots. The same processing as that in the case of an image data can be performed on the data displayed on the CRT 50. The data displayed represents the text characters corresponding to the blocks 1 to 6 in FIG. 32. After the edition, the data displayed on the CRT 50 is stored in the PMEM 74 as code data.

The data representing the position of each block, together with the type of data (bit image or character code), is stored in the PMEM 74 as attribute code data. The image data and the positional data of the blocks 7 and 8 in the IMEM 76 are read out. When the areas on the CRT 50 corresponding to the blocks 7 and 8 are to be displayed through the VRAM 77, the image data is displayed in the form of the document 100 on the basis of the positional data read out.

The above-described mixed data is read out from both of the PMEM 74 and the IMEM 76 starting with block 1, the data read out being then stored in the hard disk drive 40 in the same order as that in which it is read out.

The document 102 is made short in the longitudinal direction, as shown in FIG. 32, in order to make it a minimum rectangular block. The number of blocks exclusively used for bit image is not limited. The size of a rectangular block is not limited. Bit data corresponding to white exists in the entirety of the area in the document 102 corresponding to the character code blocks so as to allow it to be transmitted as the document 101.

Next, the procedure for converting a text into blocks will be described.

Figure 34:
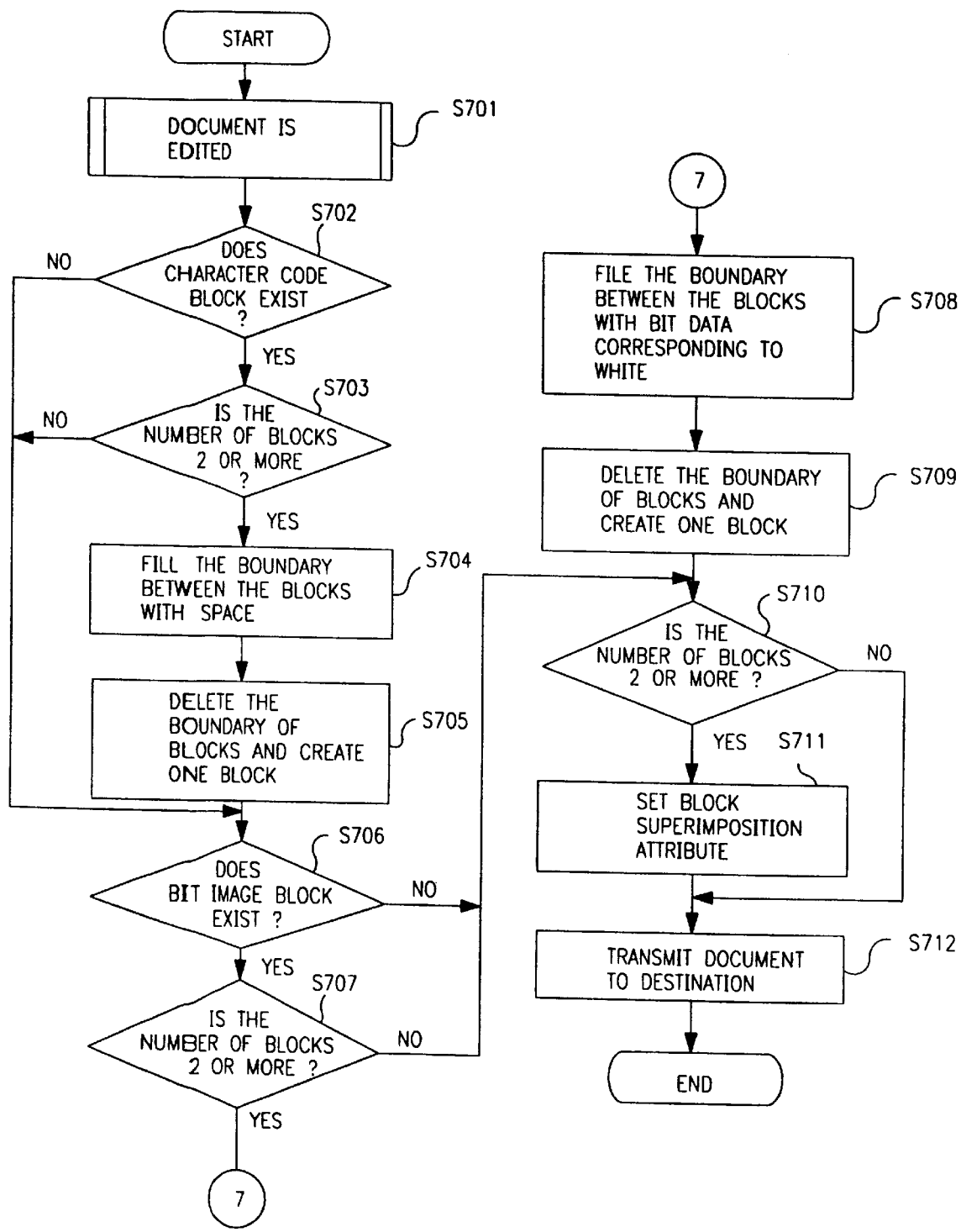
FIG. 34 is a flowchart of the procedure for converting a text into blocks.

FIG. 34 is a flowchart of the procedure for the above-described block conversion employed in the third embodiment.

First, edition is performed on the document 100 formed by combining the bit image data read from the reader 20 with the code data input from the keyboard 51 on the CRT 50. At this time, a code representing the boundary of blocks, e.g., the starting coordinate of a block, a code representing the size of a block, and a code representing the attribute of a block are determined (in step S701).

Next, determine whether or not there exists a character code block in the code representing the boundary of blocks using the attribute code data (in step S702). If a character code block exists, determine whether or not the number of blocks is 2 or more (in step S703). If there exist 2 character code blocks or more, the area of block 8 in the VRAM 77 is filled with space code, as shown in FIG. 32 (in step S704).

The area of block 7 is not filled with space code because a return code for the character line is entered on the boundary between block 2 and block 7. Thereafter, the codes representing the boundaries of blocks are deleted and the attributes of the blocks are changed. This allows one block (block 9) of character code data to be created on CRT 50. Thereafter, the character code data corresponding to block 9 is stored in the PMEM 74 (in step S705).

Subsequently, the document 100 is displayed on the CRT 50 again, and then determine whether or not a bit image block exits using the attribute code (in step S708). If there exists a bit image block, then determine whether or not the number of blocks is 2 or more (in step S707). If the number of blocks is 2 or more, the area other than the bit image blocks, i.e., the space between the bit image blocks, are filled with bit data corresponding to white, as in the document 102 (in step S708). Thereafter, the code representing the boundary of blocks is deleted, and attribute of the block is changed so as to allow one block (block 10) of bit image to be created on the CRT 50. Thereafter, the bit image data corresponding to block 10 is stored in the IMEM 76 (in step S709).

Subsequently, determine whether or not there exist a plurality of blocks (in step S710). In this context, a plurality of blocks is two blocks of character code block 9 and image block 10. If the answer is yes, a superimposition attribute code is set in the PMEM 74 (in step S711), the superimposition attribute code representing superimposing of block 10 on block 9 with the position indicated by an arrow Q in block 10 being registered with the position indicated by an arrow P in block 9. Once a transmission command has been received, the superimposition attribute code set in the PMEM 74 is sent to a receiving terminal, which is followed by the transmission of the code data and bit image data stored in the PMEM 74 and the IMEM 76 in that order (in step S712). The superimposition attribute code may also be sent after the transmission of the document data.

Upon receipt of the document data, the receiving terminal, which is constructed in the same manner as the transmitting terminal and which has the same function as that of the transmitting terminal, stores blocks 9 and 10 received in the hard disk. Thereafter, block 9 is transferred to the PMEM 74, while block 10 is transferred to the IMEM 76, and the block superimposition attribute code received prior to the data is detected. The character code data of block 9 is converted to bit image data by, for example, a character generator. Further, encoded data representing the bit image of block 10 is decoded by a decoder. Thereafter, the data representing the two blocks is registered with position P as a reference point, and a text such as the document 100 is reproduced on a CRT or by a printer in the receiving terminal.

Next, methods of transmitting a superimposed block will be described.

Figure 35A:
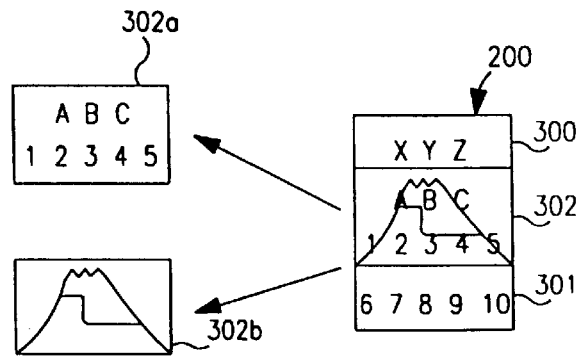
FIGS. 35A and 35B illustrate methods of transmitting a superimposed block in which character and image coexist.
Figure 35B:
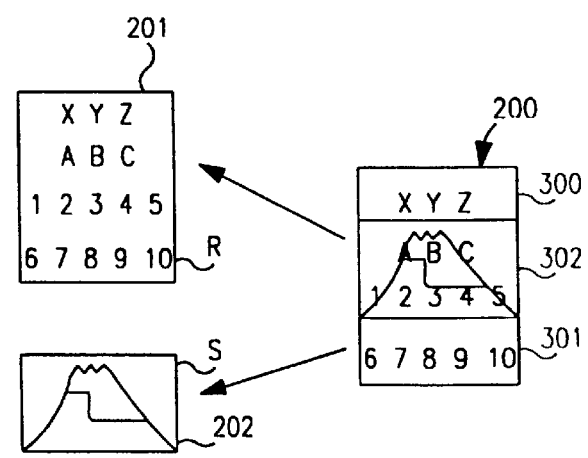

FIGS. 35A and 35B illustrate methods of transmitting a superimposed block in which character and image coexist. In FIGS. 35A and 35B, a document 200 consists of character code blocks 300 and 301 each of which contains only character codes, and a superimposed block 302 in which character code and bit image data are superimposed on top of the other.

The block 302 in the document 200 may be transmitted as two blocks of a character code block 302*a* having the same size as that of the block 302 and a bit image block 302*b*, as shown in FIG. 35A.

In that case, the document 200, which consists of four blocks including the character code blocks 300, 301 and 302*a* and the bit image block 302*b*, can be transmitted in a reduced number of blocks, when compared with a case in which the superimposed block 302 is divided into small blocks, i.e., in which it is divided into superimposed blocks and non-superimposed blocks. This enables the transmission efficiency of data to be improved. At this time, the superimposition attribute code is attached to each block in a state wherein the block boundary and attribute are not deleted. In a receiving terminal, the character code block 302a and the bit image block 302b of the superimposed block 302 are superimposed to reproduce the document 200.

Alternatively, the document 200, which is a text with a superimposed block contained therein and which corresponds to one page, may be transmitted as two parts including a document 201 which consists of a character code block and a document 202 which consists of a bit image block, as shown in FIG. 35B. In that case, the block boundary is deleted, and a superimposition attribute code is attached, the superimposition attribute code representing superimposition of the bit image block on the character code block with a position indicated by the arrow R serving as a reference point. Once the document 200 has been received by a receiving terminal, the position indicated by the arrow S in the bit image block in the document 202 is registered with the position R indicated by the arrow R in the character code block in the document 201 in accordance with the attribute code received so as to reproduce the document 200 on a different type of CRT 50 from that of the CRT at the transmitting side or by a different type of a printer 60.

Alternatively, the character code block 302a of the superimposed block 302 may be converted into bit image data by the character generator 79, the bit image data converted being overlaid on (the logical OR operation being implemented) the bit image data of the bit image block 302b. A resultant synthesized data may be able to be stored in the IMEM 76 in the form of an image pattern such as the block 302. In that case, since the boundary of the code block 302a and the attribute thereof are deleted, the document 200 are transmitted as three blocks 300 to 302, improving the transmission efficiency greatly in terms of the number of blocks to be transmitted. In this case, the boundary of the block 302 and the attribute thereof are the same as those of the bit image block 302b.

Figure 33B:
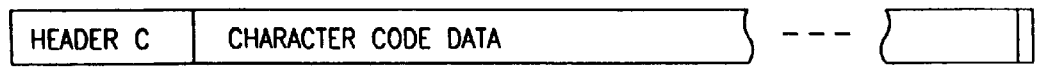
Figure 33C:
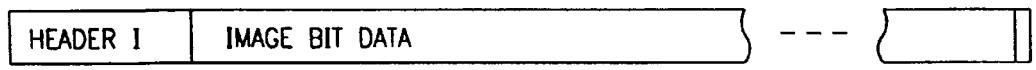

The boundary (position) of each of the blocks 300 to 302 and the attribute code thereof are contained in a corresponding header, as shown in FIGS. 33B and 33C. A header C precedes character code data, and a header I is followed by bit image data.

Next, methods of optimally dividing a text into transmission blocks will be described in detail.

Figure 36A:
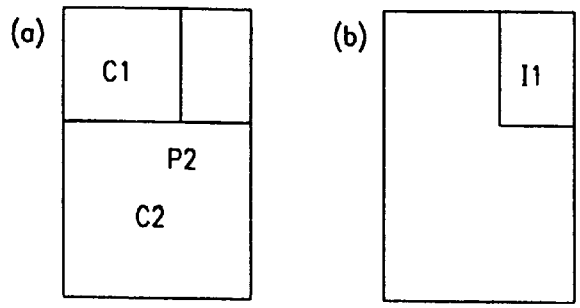
FIGS. 36A to 36E illustrate the procedures for dividing a text corresponding to one page into transmission blocks.

FIGS. 36A(a) and (b) to 36E respectively illustrate the procedures for dividing a text corresponding to one page into blocks. In FIGS. 36A(a) and (b) to 36E, reference symbols C1 to C3, C1' and CA denote a character area, and I1, I2 and IA designates an image area.F In the example shown in FIG. 36A, no superimposition is performed (logical OR operation is not implemented) on the data in the character areas C1 and C2 and the image area I1. In that case, a text is transmitted in the form of three blocks of the character areas C1 and C2 and the image area I1. The starting point and the size of each block are determined by inputting a coordinate thereof on the text.

Figure 36B:
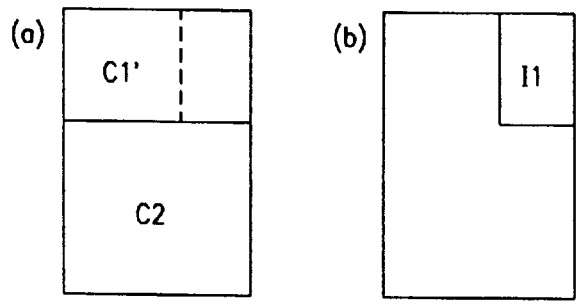

In the example shown in FIG. 36B, the image area I1 is superimposed on the character area C1'. In the character area C1', no character code data exists in an area other than the character area C1. However, a return code representing the end of a character line in the character area C1 is present on this area. In this case, the text is transmitted in the form of three blocks of character areas C1' and C2 and the image area I1.

Figure 36C:
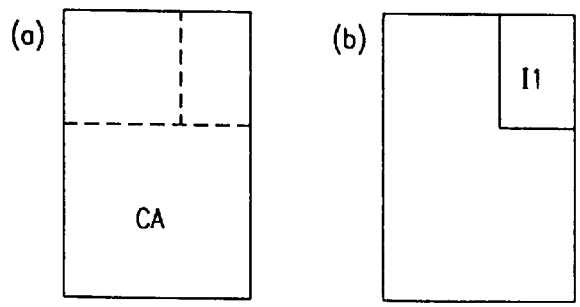

In the example shown in FIG. 36C, a character area C1 and a character area C2 are formed into a character area CA, the character area CA being transparently superimposed on the image area I1. In this case, the text is transmitted in the form of two blocks of the character are CA corresponding to one page and the image area I1.

Figure 36D:
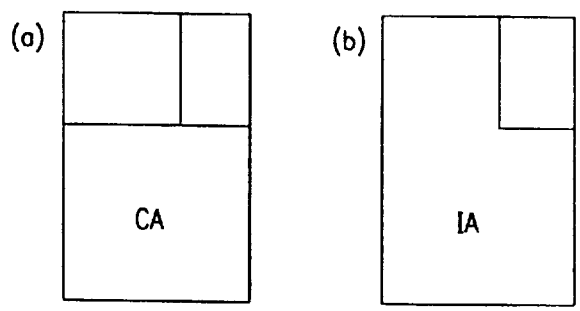

In FIGS. 36D(a) and (b), the character areas C1 and C2 are formed into a character area CA, and the image area I1 is formed into an image area IA, these two areas being transparently superimposed. In this case, the text is transmitted in the form of two blocks. Although it is not easy to decide which method is the most effective in terms of transmission efficiency, the example shown in FIGS. 36C(a) and (b) is considered to be the most effective because, since character code data corresponding to one page and image data corresponding to one block are transmitted in this example, no header codes for the character areas C1 and C2 are required. In the example shown in FIGS. 36D, most part of the area is occupied with character area, and transmission efficiency is not therefore improved.

Although the example of FIGS. 36D(a) and (b) requires no header codes for individual blocks, bit data corresponding to white or black is required as the image data to create the area in the image area IA other than the image area I1, greatly increasing the amount of information even if the bit data is compressively coded. The data transmission illustrated in FIGS. 36D(a) and (b) is therefore regarded as a disadvantageous data transmission method.

Figure 36E:
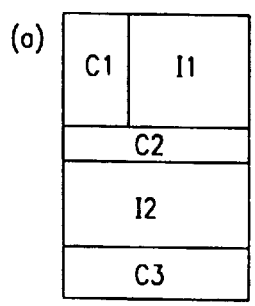

As shown in FIG. 36E, a text may also be transmitted effectively by forming one page with two blocks of the image areas I1 and I2 (in this case, the image areas I1 and I2 forms group 1, and the character area C1 to C3 constitutes group 2).

Thus, the optimal text division method varies, depending on the type of information handled or the distribution thereof. The optimal division method is determined in each case by calculating a total amount of data to be transmitted when the text is divided by each of the text division methods illustrated in FIGS. 36A(a) and (b) to 36E and then by comparing the amounts of data obtained by the individual division methods with each other. The division procedure in which the amount of data to be transmitted is the least is thus selected, and the data is then transmitted on the basis of the selected division procedure.

The text division procedure employed in this embodiment will be described with reference to FIGS. 37A and 37B, FIG. 37A being a flowchart of the control operation conducted during text division.

First, the number of divisions in one page of text, n is set to, for example, 4 (in step S820). The amount of data in the image area I1, I2 or IA is represented by I1m, I2m or IAm, and the amount of data in the character area C1, C1', C2 or C3 is indicated by C1m, C1'm, C2m or C3m.

When n=4, a text is divided into areas by the method shown in FIGS. 36A(a) and (b). To divide the text, the positional data on coordinates P1 and P2 which is input while the document is edited is used. The text stored in the PMEM 74 is divided into code data corresponding to character area C1 and code data corresponding to character area C2, and the amounts of data C1m and C2m are respectively calculated. The amounts of data C1m and C2m are calculated in the PMEM 74 which stores the address of the coordinate P2 in advance (in step S821).

The bit image data stored in the IMEM 76 which corresponds to the image area I1 is compressed by the ICU 73. Also, the amount of data I1m compressed is obtained by and used in the ICU 73. Next, a total amount of data C1m+ C2m+I1m to be transmitted is calculated, and a resultant value is stored in the PMEM 74 as total amount M1. The data compressed by the ICU 73 is temporarily stored in the hard disk drive 40 (in step S822).

Subsequently, the number of divisions n is decremented by 1, and the process returns to step S821 (in steps S823 and S824).

Next, the text is divided into areas, as shown in FIGS. 36B(*a*) and (*b*), and the amount of data corresponding to character area C1' is calculated. In this case, the amount of data is calculated in a similar manner to that in which the amount of data corresponding to character area C1 illustrated in FIGS. 36A(*a*) and (*b*) is processed. Total amount of data is set as M2. Thereafter, the number of divisions n is decremented to 2 (in steps S821 to S824).

Subsequently, the text is divided into areas, as shown in FIGS. 36C(*a*) and (*b*), and the amount of data corresponding to character area CA is calculated. The total amount of data is then calculated as M3 (in steps S821 to S824).

Next, the text is divided into areas, as shown in FIG. 36D, and the amount of data corresponding to image area IA is calculated. In this calculation, the amount of compressed white bit data corresponding to the area in the image area IA other than the image area I1 is added to M4 which represents the total amount of data in this text. Thereafter, the number of divisions n is decremented 0 (in steps S821 to S824).

In the above-described loop processing, the number, of divisions n is set to 4 first, so it is determined that the total amounts of data M1 to M4 for four types of division have been obtained when it is determined in step S824 that n has reached to 0 after n was decremented one by one in step S823 each time the total amount of data was obtained.

Next, the total amounts of M1 to M4 are compared with each other to determine the division mode which provides for the minimum amount of data.

Thereafter, data corresponding to one page of text is divided into areas in accordance with the selected division mode, and the divided areas are then stored in the hard disk, the divided blocks being successively transmitted upon a transmission command (in step S825).

In the above-described processing, the optimal division mode is determined using the total amounts of data. However, in the division modes as shown in FIGS. 36B(*a*) and (*b*) and 36C(*a*) and (*b*) in which the total amounts of data do not differ greatly, i.e., in the division modes in which the transmission efficiency can be improved more by transmitting data twice than by transmitting it three times, the optimal division mode is determined by the magnitude of the number of divided blocks. The number of blocks obtained in each of the division methods shown in FIGS. 36A(*a*), (*b*) to 36D(*a*), (*b*) is stored each time the text is divided into blocks.

One desired division mode by which the text is divided into blocks may be selected manually.

Determination of the optimal division mode may be conducted upon a transmission command, the divided text being transmitted upon completion of the division. Alternatively, determination of the optimal division mode may be conducted upon a preliminary command, transmission of the data being performed upon a transmission command issued after the preliminary command.

Normally, text division processing and data transmission such as those shown in FIGS. 36A(*a*), (*b*) are employed as standard mode. However, in a case where the number of divided blocks exceeds a maximum predetermined number (for example, 31), a division mode in which data is divided into a number of blocks which is less than the maximum number may be forcibly selected. In that case, determination is made as to whether or not the number of blocks is a maximum number or less (in step S830), as shown in FIG. 37B, which is a modified example of the processing shown in FIG. 37A. The processing shown in FIG. 37A is executed only when the number of blocks exceeds the maximum number, and the optimal division mode under the maximum number of blocks is determined using the amounts of data obtained in the individual division modes. This allows a time required for preliminary processing executed before transmission to be saved.

The character recognition function which is characteristic to the document processing apparatus of this embodiment will be described in detail.

When recognition operation, the reader 20 reads the data representing an original, and the read data is stored in the IMEM 76. Character recognition is performed on the data stored in the IMEM 76 by the CPU 78. In this character recognition, a code corresponding to the recognized character is allocated.

In a case where character recognition is performed on the character data representing an original, a character that cannot be recognized may exist. If such characters are each transmitted as separate blocks of image data, the original may be divided into a large number of blocks, increasing the number of divided blocks.

Hence, in the present embodiment, recognizable characters are transmitted as a code block and non-recognizable characters are transmitted as a bit image block, as in the example shown in FIG. 32.

The character recognition technique employed in the third embodiment will be now described in detail with reference to FIGS. 38A to 38C and FIGS. 39A and 39B.

Figure 38A:
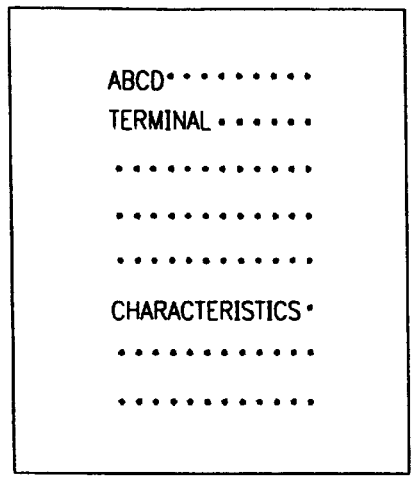
FIG. 38A shows the image of an original in which "terminal" and "characteristics" cannot be recognized.
Figure 38B:
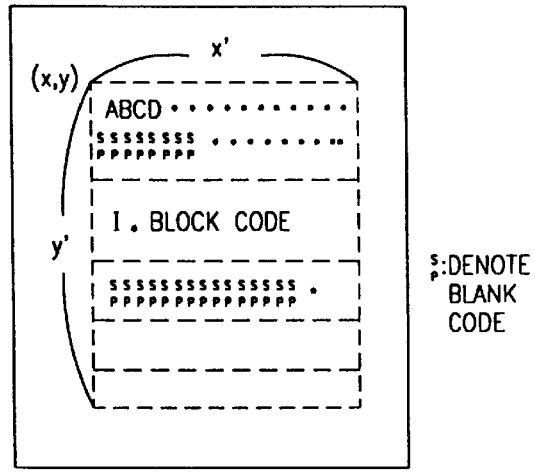
FIG. 38B shows blank codes allocated to the characters in the character code block which cannot be recognized.
Figure 38C:
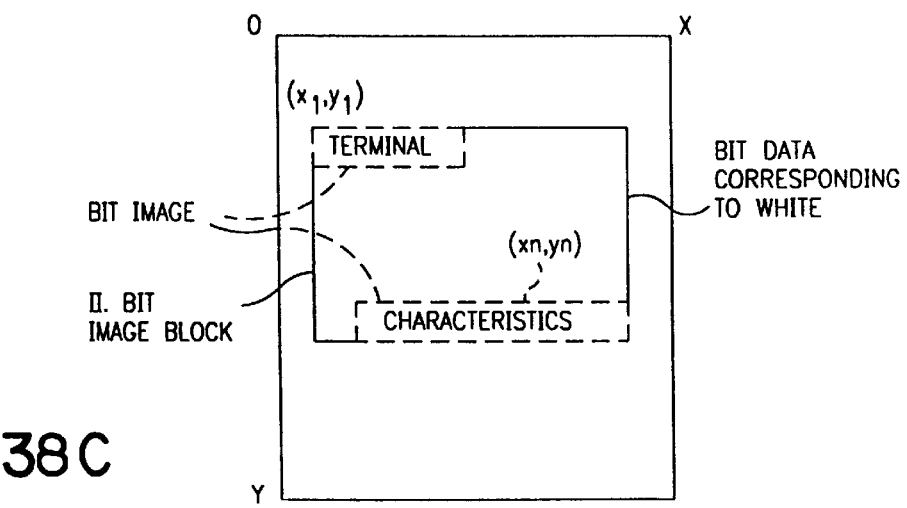
FIG. 38C shows a method of transmitting characters that cannot be recognized.

FIG. 38A shows the image of an original in which "terminal" and "characteristics" cannot be recognized, FIG. 38B shows blank codes allocated to the characters in the character code block which cannot be recognized, and FIG. 38C shows a method of transmitting characters that cannot be recognized.

Figure 39A:
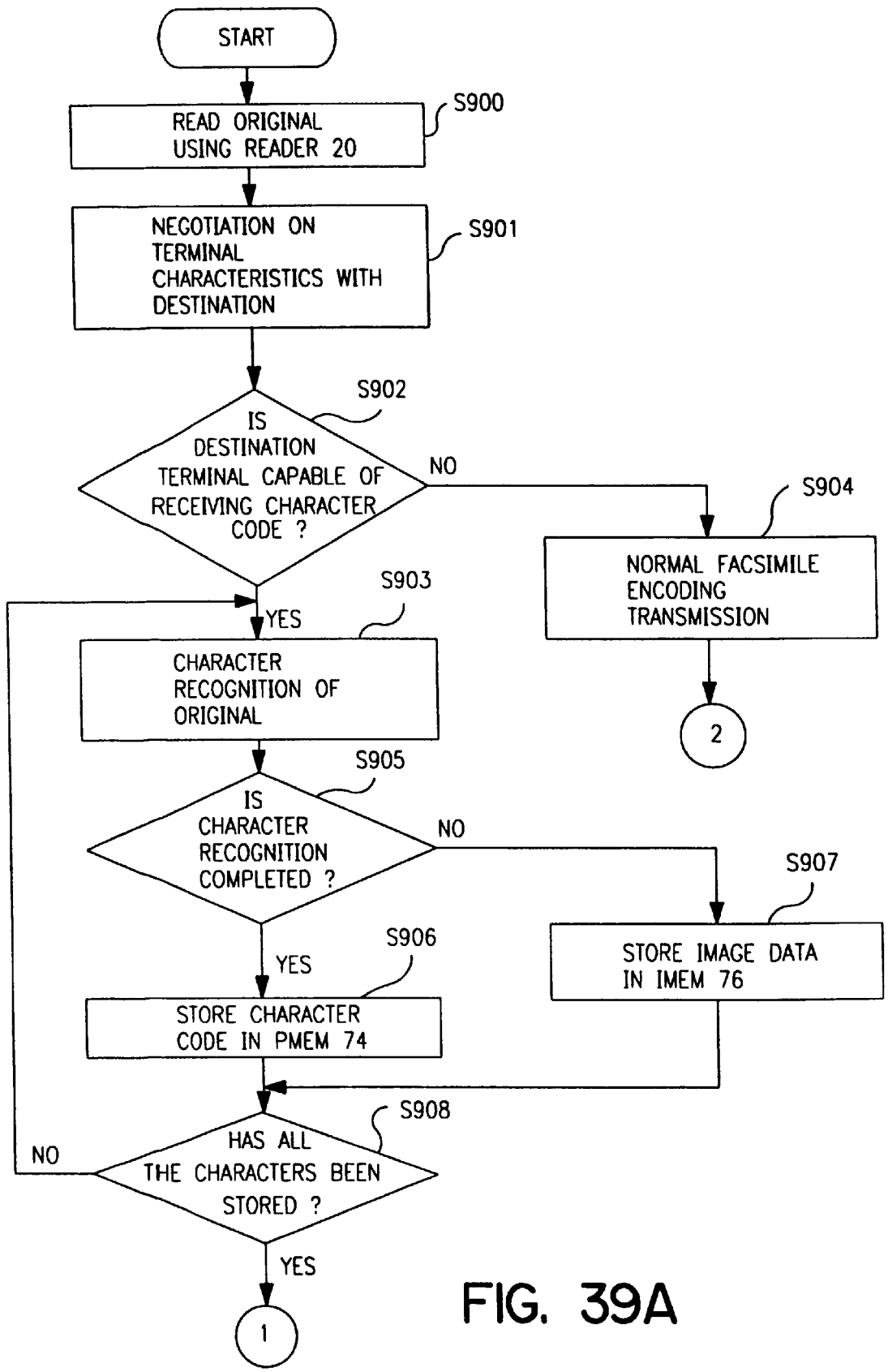
FIGS. 39A and 39B are flowcharts of the control operation of the CPU 78(FIG. 30).
Figure 39B:
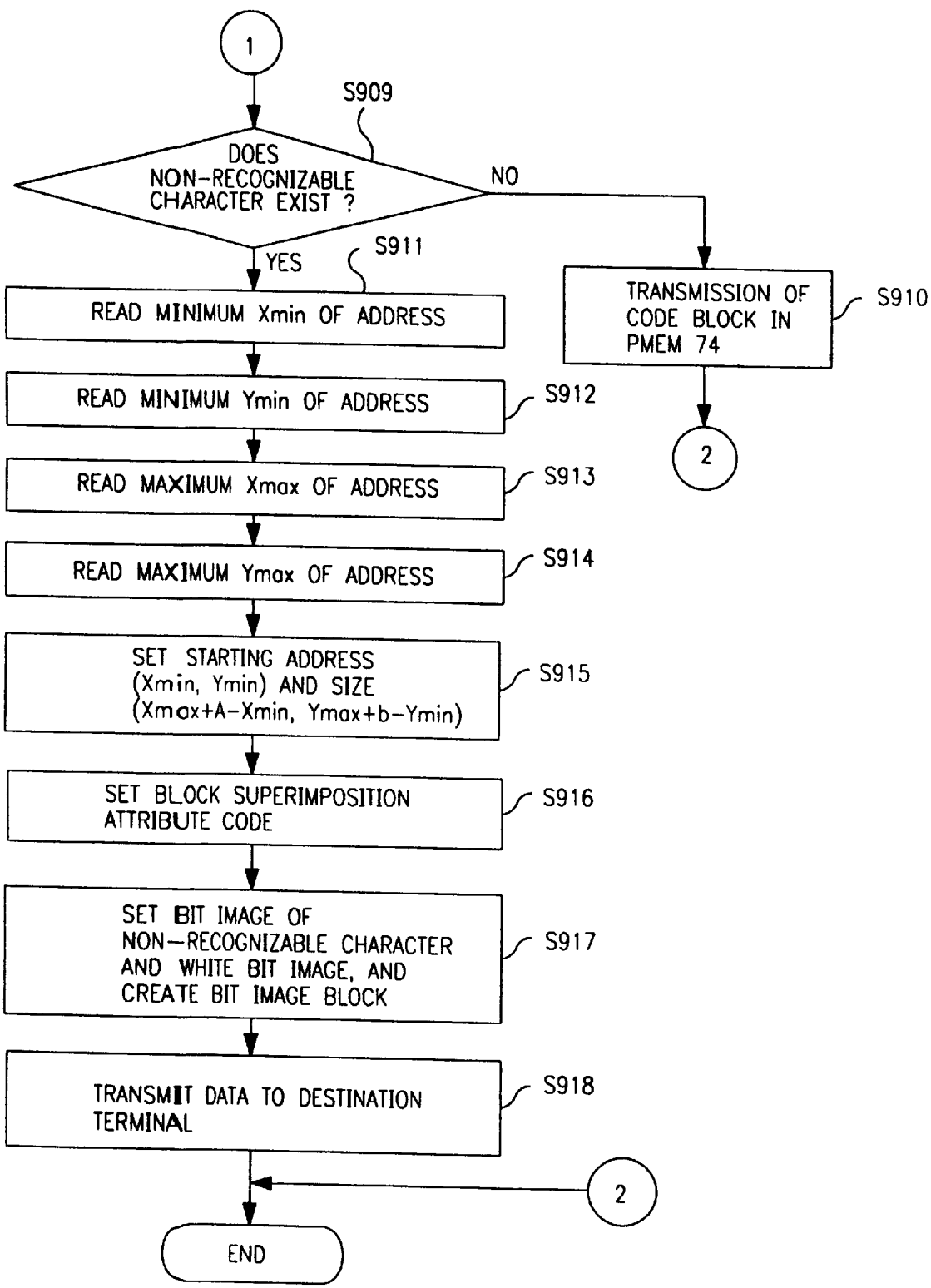

Further, FIGS. 39A and 39B are flowcharts of the control operation of the CPU 78.

First, the image of an original is read by the reader 20. At this time, the image data is stored in the IMEM 76 in the form of bit image (in step S900). Thereafter, a destination terminal is called, and the characteristics of the destination terminal are identified through negotiation (in step S901). If it is identified that the destination terminal is capable of receiving character code (e.g., Class 3 of G4 machine), character recognition of the image of the original starts (in step S904). On the other hand, if it is identified that the destination terminal is not capable of receiving character code (e.g., Class 1 of G4 machine), the image of the original is encoded by the normal facsimile coding scheme (in step S903). For example, if the machine is Class 1 of G4,the data is compressed by the MMR coding scheme, the compressed data being then transmitted.

Once the process has proceeded to step S904, character recognition is performed on the bit image data stored in the IMEM 76 which corresponds to the image of the original for each character.

This character recognition is performed by scanning the bit image data stored in the IMEM 76. First, character rows are recognized, and upon completion of these character rows, character columns are then recognized. Thus, the bit image data corresponding to the image of the original is divided into portions defined by predetermined numbers of character rows and character columns, character recognition being performed on the characters divided by the rows and columns one by one (in step S903). Various character recognition methods are known, and methods other than the above-described one may also be employed.

Once the character recognition has been completed, the character codes corresponding to the recognized characters are stored in the code block area in the PMEM 74 (in steps S905 and S906). In the case where characters that cannot be recognized exist, space codes are stored in the character code block area in the PMEM 74, and concurrently with this, the bit image data representing the characters that cannot be recognized is stored at the addresses for non-recognized characters in the bit image creating area in the PMEM 74 (in step S907). The PMEM 74 includes the code block area, the bit image creating area, and the bit image block area. To the code block area and the bit image creating area are given addresses equivalent to the number of divided portions (the number of character rows x the number of character columns) of the original for character recognition. Data (a, b) representing the size of the bit image block of one character is affixed to the bit image block corresponding to the character, as shown in FIG. 38C.

Next, it is determined that recognition of all the characters has been completed (in step S908, determine whether or not there exists a character that cannot be recognized (in step S909).

If it is determined that there are no characters that cannot be recognized, address information and size information, e.g., (x, y) (x', y') shown in FIG. 38B, on a code block are affixed to the data present in the code block area in the PMEM 74. Information representing the arrangement of the characters and identification data that represents a code block are also affixed to the data existing in the code block area, and resultant data is then transmitted to a destination terminal as code block data (in step S910).

On the other hand, if there exists a character that cannot be recognized, non-recognizable area transmission to be described below is performed.

First, from the bit image creating area in the PMEM 74 minimum Xmin=x1, minimum Ymin=y1, maximum Xmax=xn and maximum Ymax=yn (see FIG. 38C) of the address at which the bit image data representing the non-recognizable characters is stored are read out (in steps S911 to S914), and a bit image block is then created. At this time, start address information (Xmin, Ymin) and size information (Xmax+a−Xmin, Ymax+b−Ymin) on the bit image block are set (in step S915), and identification information identifying that this block is constituted by bit image data and superimposition attribute code representing the fact that this block should be superimposed on a code block are respectively set (in step S916).

Thereafter, the bit image data located at the bit image creating area is respectively stored at the areas in the bit image block area where the non-recognizable characters are to be located, resulting in the generation of bit image data located in the bit image block shown in FIG. 38C. The generated bit image data, together with the information set in steps S915 and S916, is stored in the PMEM 74 as bit image block data (in step S917). At this time, the bit image data may be encoded by the ICU 73.

Next, address information, size information, identification information and information representing the arrangement of the characters are respectively affixed to the code data located at the code block area in the same manner as that in step S910, the entire information being then stored in the PMEM 74 as code block data. Thereafter, the code block and the bit image block are transmitted to a destination (in step S918).

In the above-described third embodiment, character recognition is performed on the image of an original to convert the image into character codes. In consequence, character data can be input easily as compared with the input of characters from the keyboard 51. Further, data transmission time can be greatly shortened because of transmission of coded data. Furthermore, since the characters that cannot be recognized are transmitted as bit image data, the image data representing an original can be transmitted to a destination reliably.

Further, since the recognizable characters and non-recognizable characters are transmitted together as a combination of one code block and one bit image block, the number of blocks can be greatly reduced when compared with a case where the data which is divided into a plurality of blocks is transmitted as these blocks. This enables the data communication time to be shortened and makes data processing easy at both the transmitting and receiving sides. A code block that contains the above-described character code data representing the recognizable characters and the code data on a text created with a word processor may also be transmitted in the same way. The above-described character code block may also include graphic code data, character code data, bit data on a line image, data on a halftone image.

Furthermore, if a destination terminal is not capable of receiving the image data representing an original converted into character code, the bit image data stored in the IMEM is transmitted without being converted. Thus, data transmission method can be changed in accordance with the characteristics of the type of destination terminal.

In the above-described third embodiment, immediately after the original has been read by the reader 20, the destination terminal is called and negotiation with the destination terminal is executed. However, the present invention is not limited to this and various alterations may be made without departing from the spirit and scope of the invention as set forth in the appended claims. For example, assuming that the image of an original to be transmitted is stored in a memory such as a disk in advance in the form of bit image, and that the destination terminal has; been registered in advance which means that the characteristics of the terminal are known, the destination terminal may be called after character recognition has been processed on the image data stored. This enables the use time of the line to be shortened and makes a data transmission an economical one. Thus, the transmission efficiency can be improved and edition of a received document can be facilitated (which leads to the enhancement of function) because of the fact that priority is given to the character codes during transmission. Further, the number of destination terminals can be increased (which means that the function is enhanced) because the type of transmission can be selected.

What is claimed is:

1. An image communication apparatus comprising:
   reception means for receiving image data;
   storage means for storing the image data received by said reception means;
   decoding means for decoding the image data received by said reception means;

recognition means for recognizing an image pattern corresponding to the image data decoded by said decoding means; and transmission means for transmitting the image data stored in said storage means in accordance with a recognition result of said recognition means;

wherein said recognition means recognizes the image pattern corresponding to at least a first page of the image data and said transmission means transmits the image data exclusive of the page corresponding to the image pattern recognized by said recognition means.

2. The apparatus according to claim 1, wherein said transmission means transmits the image data to a destination corresponding to a recognition result by said recognition means.

3. The apparatus according to claim 2, further comprising a memory for storing the information of transmitting terminal corresponding to image data received in advance, the information stored in said memory being selected in accordance with a recognition result of said recognition means and the image data received being transmitted to a destination corresponding to the information selected.

4. The apparatus according to claim 2, wherein said recognition means recognizes and converts the image pattern into appropriate information to match the destination device.

5. An image communication apparatus comprising:

reception means for receiving an image data;

storage means for storing the image data received by said reception means;

decoding means for decoding the image data received by said reception means; and recognition means for performing recognition processing on an image pattern corresponding to the image data decoded by said decoding means;

wherein if a number of pages corresponding to the image data received does not exceed a predetermined number, the recognition processing is not executed on the image data received.

6. The apparatus according to claim 5, wherein if the image data received contains more than two pages, said recognition means executes the recognition processing.

7. An image communication apparatus having a relay transmission function for transmitting image data received from a transmitting terminal to multiple destinations, comprising:

memory means for storing information of a transmitting terminal in advance of receiving an instruction for relay transmission;

reception means for receiving image data;

recording means for recording the image data received by said reception means;

storage means for storing the image data received by said reception means;

decoding means for decoding the image data received by said reception means;

transmission means for transmitting the image data stored in said storage means in accordance with a recognition result after recognizing the image pattern corresponding to the image data decoded by said decoding means; and determining means for determining whether or not information of a transmitting terminal corresponding to the received image data is one of the information stored in said memory means;

wherein, if a determination result of said determining means is negative, the image data is recorded by said recording means without performing transmission of the image data received.

8. The apparatus according to claim 7, wherein said transmission means transmits the image data received to a destination recognized by a recognition processing.

9. An image communication method comprising the steps of:

receiving image data;

storing the received image data;

decoding the received image data;

recognizing, in the decoded image data, an image corresponding to at least a first page of the stored image data; and transmitting the stored image data exclusive of the page corresponding to the recognized image in accordance with a recognition result of said recognizing step.

10. An image communication method comprising the steps of:

receiving image data;

storing the received image data;

decoding the received image data;

recognizing, in the decoded image data, an image corresponding to the stored image data if a number of pages corresponding to the stored image data exceeds a predetermined number; and suppressing the recognizing step if the number of pages corresponding to the stored image data does not exceed the predetermined number.

11. An image communication method comprising the step of:

receiving image data;

storing the received image data;

recognizing, in the received image data, an image corresponding to at least a first page of the stored image data; and transmitting the stored image data exclusive of the page corresponding to the recognized image in accordance with a recognition result of said recognizing step.

12. The method according to claim 11, wherein said transmitting step transmits the image data to a destination obtained from the recognition result.

13. An image communication method comprising the steps of:

receiving image data;

storing the received image data;

recognizing, in the received image data, an image corresponding to the stored image data if a number of pages corresponding to the stored image data exceeds a predetermined number; and suppressing the recognizing step if the number of pages corresponding to the stored image data does not exceed the predetermined number.

14. The method according to claim 13, wherein said suppressing step suppresses the recognizing step if the number of pages does not exceed one.

15. An image communication apparatus comprising:

reception means for receiving image data in page units;

storage means for storing the image data received by said reception means;

recognition means for recognizing an image pattern, indicating a destination to which the image data is to be transmitted, included in the image data received by said reception means in a case where the received image data is more than one page;

transmission means for transmitting the image data stored in said storage means to the destination corresponding to a recognition result of said recognition means; and print means for printing the image data in a case where the received image data is one page.

16. The apparatus according to claim 15, wherein the image pattern is an OCR sheet image pattern.

17. The apparatus according to claim 15, wherein said recognition means recognizes a plurality of destinations, and said transmission means transmits the image data stored in said storage means to the plurality of destinations corresponding to recognition results of said recognition means.

18. An image communication apparatus comprising:

reception means for receiving image data in page units;

storage means for storing the image data received by said reception means;

discrimination means for discriminating whether or not the image data includes an image pattern indicating a destination to which the image data is to be transmitted;

recognition means, responsive to a discrimination that an image pattern is included in the image data, for recognizing the image pattern included in the image data received by said reception means;

transmission means for transmitting the image data stored in said storage means to the destination corresponding to a recognition result of said recognition means; and print means for printing images in accordance with the image data stored in said storage means in a case where it is discriminated that an image pattern is not included in the image data.

19. The apparatus according to claim 18, wherein the image pattern is an OCR sheet image pattern.

20. The apparatus according to claim 18, wherein said recognition means recognizes a plurality of destinations, and said transmission means transmits the received image data stored in said storage means to the plurality of destinations corresponding to recognition results of said recognition means.

21. The apparatus according to claim 18, wherein the image data transmitted by said transmission means excludes the image pattern.

22. The apparatus according to claim 18, wherein said printing means prints images for all pages represented by the image data stored in said storage means in a case where the image data does not include the image pattern.

23. A communication method operative in an image communication apparatus comprising the steps of:

receiving image data in page units;

storing the received image data into a storage medium;

recognizing an image pattern, indicating a destination to which the image data is to be transmitted, included in the received image data in a case where the received image data is more than one page;

transmitting the image data stored in the storage medium to the destination corresponding to a recognition result in said recognizing step; and printing the image data in a case where the received image data is one page.

24. The method according to claim 23, wherein the image pattern is an OCR sheet image pattern.

25. The method according to claim 23, wherein a plurality of destinations are recognized in said recognizing step, and the image data stored in the storage medium is transmitted in said transmitting step to the plurality of destinations corresponding to recognition results of said recognizing step.

26. A communication method operative in an image communication apparatus comprising the steps of:

receiving image data in page units;

storing the received image data into a storage medium;

discriminating whether or not the received image data includes an image pattern indicating a destination to which the image data is to be transmitted;

when it is discriminated that an image pattern is included in the image data, recognizing the image pattern included in the received image data;

transmitting the image data stored in the storage medium to the destination corresponding to a recognition result in said recognizing step; and printing images in accordance with the image data stored in the storage medium in a case where it is discriminated that an image pattern is not included in the image data.

27. The method according to claim 26 wherein the image pattern is an OCR sheet image pattern.

28. The method according to claim 26, wherein a plurality of destinations are recognized in said recognizing step, and image data stored in the storage medium is transmitted in said transmitting step to the plurality of destinations corresponding to results recognized in said recognizing step.

29. The method according to claim 26, wherein said printing step prints images for all pages represented by the image data stored in the storage medium in a case where the image data does not include the image pattern.

30. The method according to claim 26, wherein the transmitted image data excludes the image pattern.

31. An image communication method comprising the steps of:

inputting image data;

storing the input image data;

recognizing an image corresponding to the stored image data in a case where a number of pages corresponding to the stored image data exceeds a predetermined number;

transmitting the input image data in accordance with the recognition result in said recognizing step; and suppressing the recognizing step in a case where the number of pages corresponding to the stored image data does not exceed the predetermined number.

32. The method according to claim 31, wherein the predetermined number is one.

33. An image communication apparatus comprising:

input means for inputting image data;

storage means for storing the image data input by said input means;

recognition means for recognizing an image corresponding to the image data stored in said storage means in a case where a number of pages corresponding to the image data stored in said storage means exceeds a predetermined number;

transmission means for transmitting the image data input by said input means in accordance with the recognition result by said recognition means; and suppression means for suppressing an operation of said recognition means in a case where the number of pages corresponding to the image data stored in said storage means does not exceed the predetermined number.

34. The apparatus according to claim 33, wherein the predetermined number is one.

35. An image communication method comprising the steps of:

receiving image data;

storing the received image data;

recognizing, in the received image data, a specified image corresponding to at least one page of the stored image data; and transmitting the stored image data exclusive of the page corresponding to the recognized image in accordance with a recognition result of said recognizing step.

36. An image communication apparatus comprising:

reception means for receiving image data;

storage means for storing the image data received by said reception means;

recognition means for recognizing, in the image data received by said reception means, a specified image corresponding to at least one page of the image data stored by said storage means; and transmission means for transmitting the image data, stored by said storage means, exclusive of the page corresponding to the recognized image in accordance with a recognition result by said recognition means.

37. An image communication apparatus comprising:

reception means for receiving image data;

storage means for storing the image data received by said reception means;

recognition means for recognizing, in the image data received by said reception means, an image corresponding to at least a first page of the image data stored by said storage means; and transmitting the image data, stored by said storage means, exclusive of the page corresponding to the recognized image in accordance with a recognition result by said recognition means.

* * * * *

UNITED STATES PATENT AND TRADEMARK OFFICE
CERTIFICATE OF CORRECTION

PATENT NO.     : 6,057,938
DATED          : May 2, 2000
INVENTOR(S)    : Shintaro Abe et al.

It is certified that error appears in the above-identified patent and that said Letters Patent is hereby corrected as shown below:

Column 6,
Line 5, "scheme,e.g," should read -- scheme, e.g., --.
Line 32, "constitute" should read -- is constituted --.
Line 54, "constitute of" should read -- is constituted --.
Line 58, "interface. (SCSI)" should read -- interface (SCSI) --.

Column 9,
Line 62, "transit;" should read -- transit --.

Column 10,
Line 39, "no" should read -- not --.

Column 18,
Line 10, "an" should read -- a --.

Column 21,
Line 54, "area.F In" should read -- area. In --.

Column 23,
Line 31, "number," should read -- number --.

Column 24,
Line 21, "operation" should read -- operation is performed --.

Column 26,
Line 47, "has;" should read -- has --.

UNITED STATES PATENT AND TRADEMARK OFFICE
CERTIFICATE OF CORRECTION

PATENT NO. : 6,057,938
DATED : May 2, 2000
INVENTOR(S) : Shintaro Abe et al.

It is certified that error appears in the above-identified patent and that said Letters Patent is hereby corrected as shown below:

Column 28,
Line 35, "step" should read -- steps --.

Column 30,
Line 26, "claim 26" should read -- claim 26, --.

Signed and Sealed this

Ninth Day of October, 2001

*Attest:*

NICHOLAS P. GODICI
*Attesting Officer*   Acting Director of the United States Patent and Trademark Office